United States Patent
Kimura

(10) Patent No.: US 6,927,923 B2
(45) Date of Patent: Aug. 9, 2005

(54) OBJECTIVE LENS, CONVERGING OPTICAL SYSTEM, OPTICAL PICKUP APPARATUS AND RECORDING AND/OR REPRODUCING APPARATUS

(75) Inventor: Tohru Kimura, Hachioji (JP)

(73) Assignee: Konica Corporation, Tokyo (JP)

(*) Notice: Subject to any disclaimer, the term of this patent is extended or adjusted under 35 U.S.C. 154(b) by 55 days.

(21) Appl. No.: 10/121,655

(22) Filed: Apr. 15, 2002

(65) Prior Publication Data

US 2003/0067861 A1 Apr. 10, 2003

(30) Foreign Application Priority Data

Apr. 18, 2001 (JP) ........................................ 2001-119774

(51) Int. Cl.⁷ .......................... G02B 13/18; G02B 9/06; G11B 11/00; G11B 7/00
(52) U.S. Cl. .................... 359/719; 359/794; 369/44.23; 369/112.26
(58) Field of Search ................................ 359/650–661, 359/719, 793, 794; 369/112.11, 112.12, 112.13, 112.23, 112.25, 112.26, 44.23

(56) References Cited

U.S. PATENT DOCUMENTS

| | | | | |
|---|---|---|---|---|
| 5,161,040 A | * | 11/1992 | Yokoyama et al. ........... 359/19 |
| 6,049,430 A | * | 4/2000 | Heanue et al. ............... 359/642 |
| 6,058,095 A | * | 5/2000 | Yamamoto et al. ......... 369/112 |
| 6,097,688 A | * | 8/2000 | Ichimura et al. ............ 369/112 |
| 2001/0008513 A1 | * | 7/2001 | Arai et al. ............. 369/112.08 |
| 2001/0019528 A1 | * | 9/2001 | Shiono et al. ......... 369/112.08 |
| 2003/0021216 A1 | * | 1/2003 | Hendriks et al. ...... 369/112.28 |

* cited by examiner

*Primary Examiner*—Georgia Epps
*Assistant Examiner*—William Choi
(74) *Attorney, Agent, or Firm*—Finnegan, Henderson, Farabow, Garrett & Dunner, L.L.P.

(57) ABSTRACT

An objective lens for recording and/or reproducing information of an optical information recording medium, comprises a first lens group having a positive refractive power and a second lens group having a positive refractive power. The first lens group and the second lens group are arranged in this order from a light source side. The objective lens is a finite conjugate type to converge a divergent light flux from a light source onto an information recording plane of the optical information recording medium and satisfies the following formula:

$$NA \geq 0.65$$

where NA is an image-side numerical aperture necessary for conducting recording and/or reproducing information of the optical information recording medium.

62 Claims, 32 Drawing Sheets

SECTION A

ENLARGED VIEW OF SECTION A

Δ

OBJECTIVE LENS, CONVERGING OPTICAL SYSTEM, OPTICAL PICKUP APPARATUS AND RECORDING AND/OR REPRODUCING APPARATUS

BACKGROUND OF THE INVENTION

The present invention relates to an objective lens for recording and/or reproducing of information for an optical information recording medium, a light-converging optical system, an optical pickup device, and a recording/reproducing apparatus.

With practical application of a red semiconductor laser, there has been developed and commercialized, in recent years, a DVD (digital versatile disc) that is a high density optical disc which is mostly the same as a CD (compact disc) representing a conventional optical disk (hereinafter referred to also as "optical information recording medium") in size and has a large capacity. It is presumed that an advanced optical disc of a higher density type will appear in the near future. In an optical system of an optical information recording/reproducing apparatus wherein this advanced optical disc serves as a medium, a diameter of a spot converged on the information recording surface through an objective lens is required to be small, for achieving high density of recording signals or for reproducing high density recording signals. For that purpose, a shorter wavelength is requested for a laser representing a light source, and a greater numerical aperture is requested for an objective lens. What is expected as a short wavelength laser light source in terms of practical application is a violet semiconductor laser having an oscillation wavelength of about 400 nm.

Further, as an objective lens with high NA of NA 0.65 or more, there has been proposed a lens which is composed of two positive lenses to allot refracting power to four surfaces so that a radius of curvature of each surface may be large and sensitivity for error in injection molding and in lens forming may be eased accordingly. However, when NA is large like this, and when an objective lens with a small diameter is composed of two positive lenses, a working distance tends to be small, and there is a high possibility that the objective lens is brought into contact with an optical information recording medium by its warp, which is a problem.

Incidentally, when a shorter wavelength is attained for a laser light source and a greater numerical aperture is attained for an objective lens, it is presumed that there will be actualized problems which have been ignored in an optical pickup apparatus which conducts recording or reproducing of information for a conventional optical disc such as a CD and a DVD and is composed of a combination of a laser light source with a relatively long wavelength and an objective lens with a low numerical aperture.

One of the problems is a problem of longitudinal chromatic aberration caused on an objective lens by fluctuations of a fine oscillation wavelength of the laser light source. Since a wavelength of a light flux emitted from a semiconductor laser used as a light source in an optical pickup apparatus is monochromatic in general, the longitudinal chromatic aberration is considered not to be caused on an objective lens. However, there sometimes are occasions where there are caused mode hop phenomena in which a wavelength is changed instantly by several nanometers by a change of output. When the longitudinal chromatic aberration on the objective lens is not corrected, there is a possibility that a light-converging position is changed by the mode hop phenomenon and an error is caused on recording and/or reproducing of information. Since an amount of a change in light-converging position turns out to be greater as a wavelength of a light source becomes shorter, it is necessary to correct longitudinal chromatic aberration caused on the objective lens, when a short wavelength semiconductor laser with oscillation wavelength of 600 nm or less is used, and when a violet semiconductor laser with oscillation wavelength of about 400 nm is used in particular, as a light source of an optical pickup device.

Further, compared with a glass lens, a plastic lens shows greater changes for a refractive index and a form caused by a temperature change, and thereby, deterioration in power of the plastic lens caused by the changes in a refractive index and a form tends to be a problem. Since this deterioration in power, that is, an increase of spherical aberration is greater when NA is greater (deterioration in power is increased in proportion to fourth power of NA in general), there is a possibility that recording and/or reproducing of information may be interfered, if an objective lens made of plastic material of NA 0.65 or more is subjected to temperature changes of about ±30° C.

Further, another problem actualized in a shorter wavelength of a laser light source and a greater numerical aperture of an objective lens is a fluctuation of spherical aberration caused on an objective lens by fine fluctuations of oscillation wavelength of the light source. A semiconductor laser used as a light source in an optical pickup device has, on its oscillation wavelength, the scatter of about ±10 nm between individual bodies. When a semiconductor laser having an oscillation wavelength deviated from the standard wavelength is used as a light source, spherical aberration caused on an objective lens turns out to be greater as the numerical aperture becomes greater. Therefore, a semiconductor laser having an oscillation wavelength deviated from the standard wavelength cannot be used, and semiconductor lasers to be used as a light source need to be selected.

Further, another problem actualized in a shorter wavelength of a laser light source and a greater numerical aperture of an objective lens is a fluctuation of spherical aberration of an optical system caused by an error in a thickness of a protective layer (hereinafter referred to also as "transparent base board") of an optical disc. Spherical aberration caused by an error of a thickness of a protective layer is generated in proportion to fourth power of the numerical aperture of an objective lens, and thereby, an influence of an error of a thickness of the protective layer grows greater as the numerical aperture of the objective lens becomes greater, and it is feared that stable recording or reproducing of information may not be carried out.

SUMMARY OF THE INVENTION

An object of the invention is to provide an objective lens for recording and/or reproducing of information for an optical information recording medium which has a small diameter and a large working distance in spite of its high NA and its structure of two positive lenses.

An object of the invention is to provide an objective lens for recording and/or reproducing of information for an optical information recording medium wherein a diameter is small, a working distance is large, and longitudinal chromatic aberration becoming a problem when a short wavelength light source is used is corrected, in spite of its high NA and its structure of two positive lenses.

Further, an object of the invention is to provide a light-converging optical system for recording and/or reproducing of information for an optical information recording medium wherein fluctuations of spherical aberration caused on each optical surface of the light-converging optical system by oscillation wavelength fluctuations of a laser light source, changes of temperature and humidity and thickness errors in a transparent base board of an optical information recording medium, can be corrected effectively.

It is another object to provide a light-converging optical system wherein longitudinal chromatic aberration becoming a problem when a short wavelength light source is used is corrected.

It is still another object to provide an optical pickup device equipped with the objective lens stated above and/or the light-converging optical system, and a recording/reproducing apparatus equipped with the optical pickup device.

The above objects can be attained by the following structures.

(1) An objective lens for recording and/or reproducing information of an optical information recording medium, comprises:

a first lens group having a positive refractive power and a second lens group having a positive refractive power; wherein the first lens group and the second lens group are arranged in this order from a light source side, and wherein the objective lens is a finite conjugate type to converge a divergent light flux from a light source onto an information recording plane of the optical information recording medium and satisfies the following formula:

$$NA \geq 0.65$$

where NA is an image-side numerical aperture necessary for conducting recording and/or reproducing information of the optical information recording medium.

(2) The objective lens of (1), wherein the following formula is satisfied:

$$NA \geq 0.75$$

(3) The objective lens of (1) or (2), wherein the following formula is satisfied:

$$0.10 \leq NA \cdot WD/f \leq 0.35$$

where WD is a working distance (mm) of the objective lens, and f is a focal length (mm) of the total system of the objective lens.

(4) The objective lens of any one of (1) to (3), wherein the following formula is satisfied:

$$0.01 \leq |m| \leq 0.30$$

where m is a lateral magnification of the objective lens defined with the formula of $NA_{OBJ}/NA_{IMG}$, when $NA_{OBJ}$ is an object-side numerical aperture of the objective lens and $NA_{IMG}$ is an image-side numerical aperture.

(5) The objective lens of any one of (1) to (4), wherein the objective lens is made of an optical material having an internal transmittance of 85% or more in the thickness of 3 mm in a used wavelength region of 600 nm or less.

(6) An objective lens for recording and/or reproducing information of an optical information recording medium, comprising:

a first lens group having a positive refractive power and a second lens group having a positive refractive power; wherein the first lens group and the second lens group are arranged in this order from a light source side, and wherein the objective lens is a finite conjugate type to converge a divergent light flux from a light source onto an information recording plane of the optical information recording medium and satisfies the following formula:

$$0.10 \leq NA \cdot WD/f \leq 0.35$$

where NA is an image-side numerical aperture necessary for conducting recording and/or reproducing information of the optical information recording medium, WD is a working distance (mm) of the objective lens, and f is a focal length (mm) of the total system of the objective lens.

(7) The objective lens of (6), wherein the following formula is satisfied:

$$0.01 \leq |m| \leq 0.30$$

where m is a lateral magnification of the objective lens defined with the formula of $NA_{OBJ}/NA_{IMG}$, when $NA_{OBJ}$ is an object-side numerical aperture of the objective lens and $NA_{IMG}$ is an image-side numerical aperture.

(8) The objective lens of (6) or (7), wherein the objective lens is made of an optical material having an internal transmittance of 85% or more in the thickness of 3 mm in a used wavelength region of 600 nm or less.

(9) An objective lens for recording and/or reproducing information of an optical information recording medium, comprising:

a first lens group having a positive refractive power and a second lens group having a positive refractive power; wherein the first lens group and the second lens group are arranged in this order from a light source side, and wherein the objective lens is a finite conjugate type to converge a divergent light flux from a light source onto an information recording plane of the optical information recording medium and satisfies the following formula:

$$0.01 \leq |m| \leq 0.30$$

where m is a lateral magnification of the objective lens defined with the formula of $NA_{OBJ}/NA_{IMG}$, when $NA_{OBJ}$ is an object-side numerical aperture of the objective lens and $NA_{IMG}$ is an image-side numerical aperture.

(10) The objective lens of (9), wherein the objective lens is made of an optical material having an internal transmittance of 85% or more in a thickness of 3 mm in a used wavelength region of 600 nm or less.

(11) An objective lens for recording and/or reproducing information of an optical information recording medium, comprising:

a first lens group having a positive refractive power; and a second lens group having a positive refractive power; wherein the first lens group and the second lens group are arranged in this order from a light source side, wherein the objective lens is a finite conjugate type to converge a divergent light flux from a light source onto an information recording plane of the optical information recording medium and a used wavelength is 600 nm or less, and wherein the objective lens comprises a ring-shaped diffractive structure on at least one surface.

(12) The objective lens of (11), wherein when the light source generates a wavelength fluctuation within ±10 nm, the diffractive structure has a function to suppress a longitudinal chromatic aberration caused by a refractive index dispersion of an optical material of the objective lens due to the wavelength fluctuation of the light source.

(13) The objective lens of (11) or (12), wherein the following formulas are satisfied:

$$NA \geq 0.65$$

$$0.10 \leq NA \cdot WD/f \leq 0.35$$

$$0.01 \leq |m| \leq 0.30$$

where NA is an image-side numerical aperture necessary for conducting recording and/or reproducing information of the optical information recording medium, WD is a working distance (mm) of the objective lens, f is a focal length (mm) of the total system of the objective lens, and m is a lateral magnification of the objective lens defined with the formula of $NA_{OBJ}/NA_{IMG}$ when $NA_{OBJ}$ is an object-side numerical aperture of the objective lens and $NA_{IMG}$ is an image-side numerical aperture.

(14) The objective lens of any one of (11) to (13), wherein the following formula is satisfied:

$$0.01 \leq PD/PT \leq 0.15$$

where PD is a power ($mm^{-1}$) of only a diffractive structure defined by the formula of $PD=\Sigma(-2 \cdot b_{2i})$ when the diffractive structure formed on $i^{th}$ surface is represented by an optical path difference function defined by the formula of $\Phi b = b_{2i}h^2 + b_{4i}h^4 + b_{6i}h^6 + \ldots$ (here, h is a height (mm) from an optical axis and $b_{2i}$, $b_{4i}$, $b_{6i}$, ... are 2nd order, $4^{th}$ order, $6^{th}$ order, ... optical path difference function coefficients respectively), and PT is a power ($mm^{-1}$) of the total system of the objective lens including a power as a refractive lens and a power of the diffractive structure.

(15) The objective lens of any one of (11) to (14), wherein the first lens group has a meniscus shape in which a convex surface faces toward the light source side and comprises a ring-shaped diffractive structure on a lens surface placed closest to the optical information recording medium side in the first lens group, and the following formula is satisfied:

$$0.05 \leq PD/PT \leq 0.25$$

where PD is a power ($mm^{-1}$) of only a diffractive structure defined by the formula of $PD=\Sigma(-2 \cdot b_{2i})$ when the diffractive structure formed on $i^{th}$ surface is represented by an optical path difference function defined by the formula of $\Phi b = b_{2i}h^2 + b_{4i}h^4 + b_{6i}h^6 + \ldots$ (here, h is a height (mm) from an optical axis and $b_{2i}$, $b_{4i}$, $b_{6i}$, ... are 2nd order, $4^{th}$ order, $6^{th}$ order, ... optical path difference function coefficients respectively), and PT is a power ($mm^{-1}$) of the total system of the objective lens including a power as a refractive lens and a power of the diffractive structure.

(16) The objective lens of any one of (11) to (15), wherein the following formula is satisfied:

$$0.04 \leq f \cdot \lambda \cdot \Sigma(ni/(Mi \cdot Pi^2)) \leq 0.50$$

where $\lambda$ is a standard wavelength (mm), f is a focal length (mm) of the total system of the objective lens, ni is an order of a diffracted light ray having the maximum diffracted light amount among diffracted light rays generated by the diffractive structure formed on the $i^{th}$ surface, Mi is the number of ring-shaped zones of diffractive structure with in an effective diameter of the $i^{th}$ surface and Pi is the minimum value (mm) of the distance between adjoining ring-shaped zones of the diffractive structure with in an effective diameter of the $i^{th}$ surface.

(17) The objective lens of any one of (11) to (16), wherein the following formula is satisfied:

$$0.2 \leq |(Ph/Pf)-2| \leq 3.0$$

where Pf is a distance (mm) between adjoining ring-shaped diffractive zones at an image-side numerical aperture necessary for conducting recording and/or reproducing for an optical information recording medium, and Ph is a distance (mm) between adjoining ring-shaped diffractive zones at a numerical aperture half of the image-side numerical aperture necessary for conducting recording and/or reproducing for an optical information recording medium.

(18) The objective lens of any one of (11) to (17), wherein in the case of combining a diffractive action as the diffractive lens and a refractive action as a refractive lens, the objective lens has a longitudinal chromatic aberration characteristic in which a back focal distance changes so as to become shorter when the wavelength of the light source changes toward a longer wavelength side and the following formula is satisfied:

$$-1 < \Delta CA/\Delta SA < 0$$

where $\Delta CA$ represents an amount of a change (mm) of a longitudinal chromatic aberration for a change of a wavelength, and $\Delta SA$ represents an amount of a change (mm) of a spherical aberration of a marginal ray for a change of a wavelength.

(19) The objective lens of any one of (1) to (18), wherein an amount of a $ni^{th}$ ordered diffracted light ray generated by the diffractive structure formed at the $i^{th}$ surface is largest among any other ordered diffracted light rays and the objective lens converges the $ni^{th}$ ordered diffracted light ray generated by the diffractive structure onto an information recording plane of the optical information recording medium, where n is an integer other than 0 and ±1.

(20) The objective lens of any one of (1) to (19), wherein the objective lens comprise at least two aspherical surfaces among surfaces located between a surface of the first lens group positioned closest to the light source and a surface of the second lens group positioned closest to the light source.

(21) The objective lens of any one of (1) to (20), wherein each of the first lens and the second lens group is made of a plastic lens and the following formula is satisfied:

$$NA \geq 0.75$$

$$0.06 > \Delta SAG > -0.08$$

$$\Delta SAG = (X1'-X2')/(NA^4 \cdot f \cdot (1+|m|))$$

$$X1' = X1 \cdot (N1-1)^3/f1$$

$$X2' = X2 \cdot (N2-1)^3/f2$$

where NA is an image-side numerical aperture necessary for conducting recording and/or reproducing information of the optical information recording medium, Xi is a difference in the direction of an optical axis between a plane that is perpendicular to the optical axis and is tangent to the vertex of the surface of the $i^{th}$ lens group closest to the light source and a surface of the $i^{th}$ lens group closest to the light source in the outermost periphery in the effective diameter (the position on the surface of the $i^{th}$ lens group closest to the light source where the marginal ray at the above NA enters), and it is assumed that Xi takes a positive sign when it is measured in the direction toward the optical information recording medium from the tangent plane that serves as a reference point, and it takes a negative sign when it is measured in the direction toward the light source (i=1 or 2), f is a focal length (mm) of the total system of the objective lens, m is a lateral magnification of the objective lens defined by the formula of $NA_{OBJ}/NA_{IMG}$ when $NA_{OBJ}$ is an object-side numerical aperture of the objective lens and $NA_{IMG}$ is an image-side numerical aperture, N1 is a refractive index of the first lens group for a used wavelength, and N2 is a refractive index of the second lens group for a used wavelength.

(22) The objective lens of any one of (1) to (21), wherein the following formula is satisfied:

$$3 \leq \sqrt{(f1/f2)}/|m| \leq 50$$

where fi is a focal length (mm) of an $i^{th}$ lens group (i=1 or 2) (provided that if the $i^{th}$ lens group comprises a diffractive structure, fi is a focal length (mm) of the total system of the $i^{th}$ lens group in which a focal length as a refractive lens and a focal length of a diffractive structure are combined), and m is a lateral magnification of the objective lens defined by the formula of $NA_{OBJ}/NA_{IMG}$ when $NA_{OBJ}$ is an object-side numerical aperture of the objective lens and $NA_{IMG}$ is an image-side numerical aperture.

(23) The objective lens of any one of (1) to (22), wherein the following formula is satisfied:

$$0.5 \leq (r2+r1)/(r2-r1) \leq 4.0$$

where r1 is a paraxial radius of curvature (mm) of a surface of the first lens group closest to the light source, and r2 is a paraxial radius of curvature (mm) of the surface of the first lens group closest to an optical information recording medium.

(24) The objective lens of any one of (1) to (23), wherein the following formula is satisfied:

$$-0.02 \leq NA \cdot (X2-X1)/f \leq 0.30$$

where NA is an image-side numerical aperture necessary for conducting recording and/or reproducing for an optical information recording medium, Xi is a difference in the direction of an optical axis between a plane that is perpendicular to the optical axis and is tangent to the vertex of the surface of the $i^{th}$ lens group closest to the light source and a surface of the $i^{th}$ lens group closest to the light source in the outermost periphery in the effective diameter (the position on the surface of the $i^{th}$ lens group closest to the light source where the marginal ray at the above NA enters), and it is assumed that Xi takes a positive sign when it is measured in the direction toward the optical information recording medium from the tangent plane that serves as a reference point, and it takes a negative sign when it is measured in the direction toward the light source (i=1 or 2), f is a focal length (mm) of the total system of the objective lens.

(25) The objective lens of any one of (1) to (24), wherein the objective lens comprises a lens group made of an optical plastic material.

26. The objective lens of any one of (1) to (25), wherein the objective lens comprises a lens group made of an optical glass material.

(27) The objective lens of any one of (1) to (26), wherein the objective lens comprises a diaphragm to regulate the light flux and the diaphragm is provided between a plane that is perpendicular to the optical axis and is tangent to the vertex of the surface of the $i^{th}$ lens group closest to the light source and a surface of the $i^{th}$ lens group closest to the light source.

(28) The objective lens of any one of (1) to (27), wherein the objective lens regulates a converged light flux diameter by providing a section changing discontinuously in a vertical direction of the surface on at least one surface at a position corresponding to an image-side numerical aperture necessary for conducting recording and/or reproducing information of an optical information recording medium.

(29) A converging optical system for recording and/or reproducing information of an optical information recording medium, comprising:

a finite conjugate type objective lens to converge a divergent light flux from a light source onto an information recording plane of the optical information recording medium; the objective lens comprising a first lens group having a positive refractive power and a second lens group having a positive refractive power; wherein the first lens group and the second lens group are arranged in this order from a light source side, and a correcting structure provided between the light source and the information recording plane and to correct a spherical aberration generated in the converging optical system;

wherein the following formula is satisfied:

$$NA \geq 0.65$$

where NA is an image-side numerical aperture of the objective lens necessary for conducting recording and/or reproducing information of the optical information recording medium.

(30) A converging optical system for recording and/or reproducing information of an optical information recording medium, comprising:

an optical element including a finite conjugate type objective lens to converge a divergent light flux having a wavelength of 600 nm or less from a light source onto an information recording plane of the optical information recording medium; the objective lens comprising a first lens group having a positive refractive power and a second lens group having a positive refractive power; wherein the first lens group and the second lens group are arranged in this order from a light source side, and a ring-shaped diffractive structure provided at least one surface of the optical element.

(31) The converging optical system of (30), wherein when the light source generates a wavelength fluctuation within ±10 nm, the diffractive structure has a function to suppress a longitudinal chromatic aberration caused by a refractive index dispersion of an optical material of the optical element due to the wavelength fluctuation of the light source.

(32) The converging optical system of (30) or (31), wherein in the case of combining a diffractive action as the diffractive lens and a refractive action as a refractive lens, the objective lens has a longitudinal chromatic aberration characteristic in which a back focal distance changes so as to become shorter when the wavelength of the light source changes toward a longer wavelength side and the following formula is satisfied:

$$-1 < \Delta CA/\Delta SA < 0$$

where $\Delta CA$ represents an amount of a change (mm) of a longitudinal chromatic aberration for a change of a wavelength, and $\Delta SA$ represents an amount of a change (mm) of a spherical aberration of a marginal ray for a change of a wavelength.

(33) The converging optical system of any one of (30) to (32), wherein an amount of a $n^{th}$ ordered diffracted light ray generated by the diffractive structure is largest among any other ordered diffracted light rays and the converging optical system converges the $n^{th}$ ordered diffracted light ray generated by the diffractive structure onto an information recording plane of the optical information recording medium, where n is an integer other than 0 and ±1.

(34) The converging optical system of any one of (30) to (33), wherein the converging optical system comprises a correcting structure provided between the light source and the information recording plane and to correct a spherical aberration generated in the converging optical system;

wherein the following formula is satisfied:

$$NA \geq 0.654$$

where NA is an image-side numerical aperture of the objective lens necessary for conducting recording and/or reproducing information of the optical information recording medium.

(35) The converging optical system of (29) or (34), wherein the correcting structure comprises at least one optical element displaceable along the optical axis so as to change a degree of divergence of the outgoing light flux.

(36) The converging optical system of (35), wherein the optical element displaceable along the optical axis is one of the first and second lens groups of the objective lens.

(37) The converging optical system of (36), wherein the optical element displaceable along the optical axis is provided between the light source and the objective lens.

(38) The converging optical system of any one of (35) to (37), wherein the optical element displaceable along the optical axis is made of an optical plastic material.

(39) The converging optical system of (29) or (34), wherein the correcting structure is an element provided between the light source and the information recording plane and capable of changing a refractive index distribution in the direction perpendicular to the optical axis.

(40) The converging optical system of (29) or (34), wherein the correcting structure is an element provided between the objective lens and the optical information recording medium and capable of changing a refractive index.

(41) The converging optical system of any one of (29) to (40), wherein the converging optical system comprises the objective lens described in any one of (29) to (40).

(42) The converging optical system of any one of (29), (34) to (41), wherein the converging optical system conducts recording and/or reproducing information of an information recording medium which has a plurality of information recording layers on the same light flux incident side, and the correcting structure corrects a fluctuation of a spherical aberration caused by differences in thickness of transparent base boards from the light flux incident surface to respective information recording layers at the time of focus jump among the plurality of information recording layers.

(43) An optical pickup apparatus for recording and/or reproducing information of an optical information recording medium, comprising:

a light source;

a converging optical system having a finite conjugate type objective lens to converge a divergent light flux from the light source onto an information recording plane of the optical information recording medium; the objective lens comprising a first lens group having a positive refractive power and a second lens group having a positive refractive power; wherein the first lens group and the second lens group are arranged in this order from a light source side, the light source structured to be displaceable along the direction of the optical axis so as to change the degree of divergence of the light flux going to be incident to the objective lens;

a detector to detect a fluctuation of a spherical aberration generated in the converging optical axis; and a driver to displace the light source along the direction of the optical axis so as to reduce the fluctuation of the spherical aberration in accordance with a detection result of the detector.

(44) The optical pickup apparatus of (43), wherein the optical pickup apparatus comprises the objective lens described in any one of (1) to (28).

(45) An optical pickup apparatus for recording and/or reproducing information of an optical information recording medium, comprising:

a light source;

a converging optical system having a finite conjugate type objective lens to converge a divergent light flux from the light source onto an information recording plane of the optical information recording medium and a correcting structure to correct a fluctuation of a spherical aberration; the objective lens comprising a first lens group having a positive refractive power and a second lens group having a positive refractive power; wherein the first lens group and the second lens group are arranged in this order from a light source side, the converging optical system having the converging optical system described in any one of (29) and (34) to (42), a detector to detect a fluctuation of a spherical aberration generated in the converging optical axis; and a driver to drive the correcting structure so as to reduce the fluctuation of the spherical aberration in accordance with a detection result of the detector.

(46) A voice and/or image recording and/or voice and/or image reproducing apparatus, comprising:

the optical pickup apparatus described in any one of (43) to (45).

To attain the objects mentioned above, the first objective lens of the invention is an objective lens for recording and/or reproducing of information for an optical information recording medium, and it is composed of the first lens group with a positive refracting power and the second lens group with a positive refracting power both arranged in this order from the light source side to be of a finite conjugated type for converging a divergent light flux emitted from a light source on the information recording surface of the optical information recording medium, and satisfies the following expression.

$$NA \geq 0.65 \tag{1}$$

NA: Prescribed numerical aperture on the image side necessary for conducting recording and/or reproducing for an optical information recording medium.

In the objective lens stated above, it is possible to make a size of a spot converged on the information recording surface to be small, by enhancing a numerical aperture on the image side (NA) up to 0.65 or more (0.45 for CD and 0.60 for DVD both representing a conventional optical information recording medium) for the prescribed objective lens necessary for conducting recording and/or reproducing for an optical information recording medium. Therefore, recording that is higher in terms of density than that for the conventional optical information recording medium and/or reproducing of information recorded at high density can be conducted for an optical information recording medium.

Further, by constructing this lens having high NA with two positive lens groups, it is possible to allot refracting power for a ray of light to four surfaces to make an amount of generated aberration on each surface to be small, and thereby, various aberrations including spherical aberration can be corrected properly even in the case of a light flux with high NA, thus, deterioration of various aberrations caused by errors including eccentricity of each surface is less, which makes an objective lens to be easy for manufacturing.

Since it is possible to secure a working distance to be large by making an objective lens to be of a finite conjugated type which converges a divergent light flux emitted from a light source on the information recording surface of the optical information recording medium, it is possible to prevent contact between the objective lens and an optical information recording medium, the contact being caused by a warp of the optical information recording medium which becomes a problem when an objective lens with large NA is made of two positive lens group. In general, when a single-lens-structured objective lens is made to be of a finite conjugated type, an angle of incidence of a ray of light on the surface on the light source side tends to be large, and thereby, deterioration in aberration caused by eccentricity error on the surface on the light source side is great. However, in the objective lens of the invention, aberration deterioration caused by eccentricity error does not become too large even in the case of a finite conjugated type, because the objective lens is made to be of the structure of two groups which has room for correction of aberrations.

Incidentally, an objective lens of a finite conjugated type is generally an objective lens wherein an object point and an image point conjugate each other are not in infinite positions but are in limited positions, and it includes an objective lens wherein a divergent light flux coming from a real object point located at the limited position is converged on an information recording medium of an optical information recording medium, and an objective lens wherein a convergent light flux advancing toward a virtual object point located at a limited position is converged on an information recording surface of an optical information recording medium, but, an objective lens of a finite conjugated type of the invention is one wherein a divergent light flux coming from a real object point located at a limited position is converged on an information recording surface of an optical information recording medium.

It is preferable that the first objective lens stated above satisfies the following expression (2).

$$NA \geq 0.75 \tag{2}$$

It is further preferable that the following expression (3) is satisfied.

$$0.10 \leq NA \cdot WD/f \leq 0.35 \tag{3}$$

NA: Prescribed image-side numerical aperture necessary for conducting recording and/or reproducing for an optical information recording medium.

WD: Working distance (mm) of the objective lens f: Focal length (mm) of the total system of the objective lens For securing a working distance to be large, it is effective to make a focal length of an objective lens to be large. In this case, however, an optical pickup device is made to be large in size, which is not preferable for practical use. To secure a small-sized optical pickup device, a working distance and efficiency of an objective lens so that they may be balanced, it is preferable to satisfy the expression (3). If the upper limit of the expression (3) is made not to be exceeded, an angle formed between a contact surface on the light source side of the second lens and a plane perpendicular to an optical axis is not too large, which makes it possible to machine a metal mold with a diamond tool more accurately. It is also possible to make a lens to be one in which the sine condition is corrected properly. If the lower limit of the expression (3) is made not to be exceeded, it is possible to secure a working distance to be large even when a diameter is small, and thereby to prevent contact between the objective lens and an optical information recording medium caused by a warp of the optical information recording medium.

Further, it is preferable that the first objective lens satisfies the following expression (4), and it is more preferable that the first objective lens satisfies the following expression (4') to obtain the effect described later.

$$0.01 \leq |m| \leq 0.30 \tag{4}$$

$$0.03 \leq |m| \leq 0.20 \tag{4'}$$

In the above expression, m represents a lateral magnification of the objective lens defined with $NA_{OBJ}/NA_{IMG}$, when $NA_{OBJ}$ represents an object-side numerical aperture of the objective lens and $NA_{IMG}$ represents an image-side numerical aperture.

It is preferable that a lateral magnification of the first objective lens satisfies the expression (4). When the upper limit of the expression (4) is not exceeded, aberration deterioration caused by decentering errors of the first lens group such as surface decentering and group decentering can be kept to be small, because an angle of incidence of a ray of light for the plane on the light source side of the first lens group does not become too large. Further, it becomes easy to arrange optical elements such as a polarized beam splitter and a wave plate, because a distance between the objective lens and the light source does not become too small. When the lower limit of the expression (4) is not exceeded, it is possible to make an optical pickup device housing therein the first objective lens to be small, because an object-image distance of the objective lens does not become too small.

It is preferable that a wavelength to be used for the first objective lens stated above is 600 nm or less, and the first objective lens is made of optical material whose internal transmission factor for the thickness of 3 mm in the area of the wavelength used is 85% or more. Since a size of a spot that is converged on the information recording surface can be made smaller by making the used wavelength to be 600 nm or less, recording at higher density than a conventional optical recording medium and reproducing of information recorded at high density are made possible for the optical information recording medium. Further, when the first objective lens is made of optical material whose internal transmission factor for the thickness of 3 mm in the area of the wavelength used is 85% or more, for keeping the light absorption by optical material caused by short wavelength to be used to be small, an output of a light source in the case of recording information to an optical information recording medium can be small, thereby, a life of the light source can be extended, and an S/N ratio of reading signals in the case of reproduction of information can be improved.

Further, the second objective lens of the invention is one for recording and/or reproducing of information for an optical information recording medium, and it is composed of the first lens group and the second lens group both arranged in this order from the light source side to be of a finite conjugated type that converges a divergent light flux emitted from the light source on the information recording surface of the optical information recording medium, and it satisfies the following expression (5).

$$0.10 \leq NA \cdot WD/f \leq 0.35 \tag{5}$$

In the above expression, NA represents a prescribed image-side numerical aperture necessary for conducting recording and/or reproducing for an optical information recording medium, WD represents a working distance (mm) of the objective lens and f represents a focal length (mm) of the total system of the objective lens.

In the case of this objective lens, by constructing the objective lens with two positive lens groups, it is possible to allot refracting power for a ray of light to four surfaces to make an amount of generated aberration on each surface to be small, and thereby, various aberrations including spherical aberration can be corrected properly even in the case of a light flux with high NA, thus, deterioration of various aberrations caused by errors including eccentricity of each surface is less, which makes an objective lens to be easy for manufacturing. Since it is possible to secure a working distance to be large by making an objective lens to be of a finite conjugated type which converges a divergent light flux emitted from a light source on the information recording surface of the optical information recording medium, it is possible to prevent contact between the objective lens and an optical information recording medium, the contact being caused by a warp of the optical information recording medium which becomes a problem when an objective lens with large NA is made of two positive lens group. In general, when a single-lens-structured objective lens is made to be of a finite conjugated type, an angle of incidence of a ray of light on the surface on the light source side tends to be large, and thereby, deterioration in aberration caused by eccentricity error on the surface on the light source side is great. However, in the second objective lens, aberration deterioration caused by eccentricity error does not become too large even in the case of a finite conjugated type, because the objective lens is made to be of the structure of two groups which has room for correction of aberrations.

For securing a working distance to be large, it is effective to make a focal length of an objective lens to be large. In this case, however, an optical pickup device is made to be large in size, which is not preferable for practical use. To secure a small-sized optical pickup device, a working distance and efficiency of an objective lens so that they may be balanced, it is preferable to satisfy the expression (5). If the upper limit of the expression (5) is made not to be exceeded, an angle formed between a contact surface on the light source side of the second lens and a plane perpendicular to an optical axis is not too large, which makes it possible to machine a metal mold with a diamond tool more accurately. It is also possible to make a lens to be one in which the sine condition is corrected properly. If the lower limit of the expression (5) is made not to be exceeded, it is possible to secure a working distance to be large even when a diameter is small, and thereby to prevent contact between the objective lens and an optical information recording medium caused by a warp of the optical information recording medium.

Further, it is preferable that the second objective lens satisfies the following expression (6), and it is more preferable that the second objective lens satisfies the following expression (6') to obtain the effect described later.

$$0.01 \leq |m| \leq 0.30 \quad (6)$$

$$0.03 \leq |m| \leq 0.20 \quad (6')$$

In the above expression, m represents a lateral magnification of the objective lens defined with $NA_{OBJ}/NA_{IMG}$, when $NA_{OBJ}$ represents an object-side numerical aperture of the objective lens and $NA_{IMG}$ represents an image-side numerical aperture.

When the upper limit of the expression (6) is not exceeded, aberration deterioration caused by decentering errors of the first lens group such as surface decentering and group decentering can be kept to be small, because an angle of incidence of a ray of light for the plane on the light source side of the first lens group does not become too large. Further, it becomes easy to arrange optical elements such as a polarized beam splitter and a wave plate, because a distance between the objective lens and the light source does not become too small. When the lower limit of the expression (6) is not exceeded, it is possible to make an optical pickup device housing therein the second objective lens to be small, because an object-image distance of the objective lens does not become too small.

It is preferable that a wavelength to be used for the second objective lens stated above is 600 nm or less, and the second objective lens is made of optical material whose internal transmission factor for the thickness of 3 mm in the area of the wavelength used is 85% or more. Since a size of a spot that is converged on the information recording surface can be made smaller by making the used wavelength to be 600 nm or less, recording at higher density than a conventional optical recording medium and reproducing of information recorded at high density are made possible for the optical information recording medium. Further, when the second objective lens is made of optical material whose internal transmission factor for the thickness of 3 mm in the area of the wavelength used is 85% or more, for keeping the light absorption by optical material caused by short wavelength to be used to be small, an output of a light source in the case of recording information to an optical information recording medium can be small, thereby, a life of the light source can be extended, and an S/N ratio of reading signals in the case of reproduction of information can be improved.

Further, the third objective lens of the invention is one for recording and/or reproducing of information for an optical information recording medium, and it is composed of the first lens group and the second lens group both arranged in this order from the light source side to be of a finite conjugated type that converges a divergent light flux emitted from the light source on the information recording surface of the optical information recording medium, and it satisfies the following expression (7).

$$0.01 \leq |m| \leq 0.30 \quad (7)$$

In the above expression, m represents a lateral magnification of the objective lens defined with $NA_{OBJ}/NA_{IMG}$, when $NA_{OBJ}$ represents an object-side numerical aperture of the objective lens and $NA_{IMG}$ represents an image-side numerical aperture.

In the case of this objective lens, by constructing the objective lens with two positive lens groups, it is possible to allot refracting power for a ray of light to four surfaces to make an amount of generated aberration on each surface to be small, and thereby, various aberrations including spherical aberration can be corrected properly even in the case of a light flux with high NA, thus, deterioration of various aberrations caused by errors including eccentricity of each surface is less, which makes an objective lens to be easy for manufacturing. Since it is possible to secure a working distance to be large by making an objective lens to be of a finite conjugated type which converges a divergent light flux emitted from a light source on the information recording surface of the optical information recording medium, it is possible to prevent contact between the objective lens and an optical information recording medium, the contact being caused by a warp of the optical information recording medium which becomes a problem when an objective lens with large NA is made of two positive lens group. In general, when a single-lens-structured objective lens is made to be of a finite conjugated type, an angle of incidence of a ray of light on the surface on the light source side tends to be large, and thereby, deterioration in aberration caused by eccentricity error on the surface on the light source side is great. However, in the second objective lens, aberration deterioration caused by eccentricity error does not become too large even in the case of a finite conjugated type, because the objective lens is made to be of the structure of two groups which has room for correction of aberrations.

When the upper limit of the expression (7) is not exceeded, aberration deterioration caused by decentering errors of the first lens group such as surface decentering and group decentering can be kept to be small, because an angle of incidence of a ray of light for the plane on the light source side of the first lens group does not become too large. Further, it becomes easy to arrange optical elements such as a polarized beam splitter and a wave plate, because a distance between the objective lens and the light source does not become too small. When the lower limit of the expression (7) is not exceeded, it is possible to make an optical pickup device housing therein the second objective lens to be small, because an object-image distance of the objective lens does not become too small. Incidentally, To obtain the effect mentioned above, it is preferable that an range of the expression (7) is in the range of the following expression (7').

$$0.03 \leq |m| \leq 0.20 \qquad (7')$$

It is preferable that a wavelength to be used for the third objective lens stated above is 600 nm or less, and the second objective lens is made of optical material whose internal transmission factor for the thickness of 3 mm in the area of the wavelength used is 85% or more. Since a size of a spot that is converged on the information recording surface can be made smaller by making the used wavelength to be 600 nm or less, recording at higher density than a conventional optical recording medium and reproducing of information recorded at high density are made possible for the optical information recording medium. Further, when the third objective lens is made of optical material whose internal transmission factor for the thickness of 3 mm in the area of the wavelength used is 85% or more, for keeping the light absorption by optical material caused by short wavelength to be used to be small, an output of a light source in the case of recording information to an optical information recording medium can be small, thereby, a life of the light source can be extended, and an S/N ratio of reading signals in the case of reproduction of information can be improved.

Further, the fourth objective lens of the invention is one for recording and/or reproducing of information for an optical information recording medium, and it is composed of the first lens group and the second lens group both arranged in this order from the light source side to be of a finite conjugated type that converges a divergent light flux emitted from the light source on the information recording surface of the optical information recording medium, and the wavelength to be used is 600 nm or less and a ring-shaped diffractive structure is provided on at least one surface of the lens.

Since a size of a spot that is converged on the information recording surface can be made smaller by making the wavelength used to be 600 nm or less in this objective lens, recording at higher density than a conventional optical recording medium and/or reproducing of information recorded at high density are made possible for the optical information recording medium. In the case of this objective lens, by constructing the objective lens with two positive lens groups, it is possible to allot refracting power for a ray of light to four surfaces to make an amount of generated aberration on each surface to be small, and thereby, various aberrations including spherical aberration can be corrected properly even in the case of a light flux with high NA, thus, deterioration of various aberrations caused by errors including eccentricity of each surface is less, which makes an objective lens to be easy for manufacturing.

Since it is possible to secure a working distance to be large by making the fourth objective lens to be of a finite conjugated type which converges a divergent light flux emitted from a light source on the information recording surface of the optical information recording medium, it is possible to prevent contact between the objective lens and an optical information recording medium, the contact being caused by a warp of the optical information recording medium which becomes a problem when an objective lens with large NA is made of two positive lens group. In general, when a single-lens-structured objective lens is made to be of a finite conjugated type, an angle of incidence of a ray of light on the surface on the light source side tends to be large, and thereby, deterioration in aberration caused by eccentricity error on the surface on the light source side is great. However, in the objective lens in the invention, aberration deterioration caused by eccentricity error does not become too large even in the case of a finite conjugated type, because the objective lens is made to be of the structure of two groups which has room for correction of aberrations.

In addition, longitudinal chromatic aberration caused on an objective lens by a short wavelength used can be corrected properly by a combination of a diffracting function of a ring-shaped diffractive structure provided on at least one surface and a refracting function as a refracting lens, and therefore, even when instantaneous wavelength fluctuations are caused by a mode hop phenomenon of a laser light source, deterioration of aberration can be controlled to be small in an objective lens.

In the fourth objective lens described above, it is preferable that a wavelength fluctuation generated by the light source is not more than ±10 nm, and the diffractive structure has a function to control longitudinal chromatic aberration caused by the dispersion of the refractive index of optical material of the objective lens resulting from the wavelength fluctuations of the light source. This diffractive structure has longitudinal chromatic aberration characteristics for generating the longitudinal chromatic aberration whose polarity is opposite to that of the longitudinal chromatic aberration caused by the dispersion of the refractive index of optical material of the objective lens resulting from the wavelength fluctuations of about ±10 nm of the light source. Namely, with regard to the longitudinal chromatic aberration caused by dispersion of refractive index of an optical material in the case of wavelength fluctuation of the light source to the long wavelength side, a back focus of the objective lens is in the direction to be longer compared with a back focus before the wavelength fluctuation, however, with regard to the longitudinal chromatic aberration caused by diffractive structure in the case of wavelength fluctuation of the light source to the long wavelength side, a back focus of the objective lens is in the direction to be longer compared with a back focus before the wavelength fluctuation. For the purpose of obtaining the state wherein the longitudinal chromatic aberration of a wave surface transmitted through the objective lens and converged on the information recording surface is corrected properly, a size of longitudinal chromatic aberration caused by the diffractive structure is made to be almost the same as longitudinal chromatic aberration caused by dispersion of refractive index of an optical material.

In the fourth objective lens, it is preferable to satisfy the following expressions (8), (9) and (10).

$$NA \geq 0.65 \quad (8)$$

$$0.10 \leq NA \cdot WD/f \leq 0.35 \quad (9)$$

$$0.01 \leq |m| \leq 0.30 \quad (10)$$

$$0.03 \leq |m| \leq 0.20 \quad (10')$$

In the above expression, NA represents a prescribed image-side numerical aperture necessary for conducting recording and/or reproducing for an optical information recording medium, f represents a focal length (mm) of the total system of the objective lens and m represents lateral magnification of the objective lens that is defined by $NA_{OBJ}/NA_{IMG}$ when $NA_{OBJ}$ represents an object-side numerical aperture and $NA_{IMG}$ represents an image-side numerical aperture.

It is possible to make a size of a spot converged on the information recording surface to be small, by enhancing a numerical aperture on the image side (NA) up to 0.65 or more (0.45 for CD and 0.60 for DVD both representing a conventional optical information recording medium) for the prescribed objective lens necessary for conducting recording and/or reproducing for an optical information recording medium, as in the expression (8). Therefore, recording that is higher in terms of density than that for the conventional optical information recording medium and/or reproducing of information recorded at high density can be conducted for an optical information recording medium.

For securing a working distance to be large, it is effective to make a focal length of an objective lens to be large. In this case, however, an optical pickup device is made to be large in size, which is not preferable for practical use. To secure a small-sized optical pickup device, a working distance and efficiency of an objective lens so that they may be balanced, it is preferable to satisfy the expression (9). If the upper limit of the expression (9) is made not to be exceeded, an angle formed between a contact surface on the light source side of the second lens and a plane perpendicular to an optical axis is not too large, which makes it possible to machine a metal mold with a diamond tool more accurately. It is also possible to make a lens to be one in which the sine condition is corrected properly. If the lower limit of the expression (9) is made not to be exceeded, it is possible to secure a working distance to be large even when a diameter is small, and thereby to prevent contact between the objective lens and an optical information recording medium caused by a warp of the optical information recording medium.

With regard to the lateral magnification of the fourth objective lens, when the upper limit of the expression (10) is not exceeded, aberration deterioration caused by decentering errors of the first lens group such as surface decentering and group decentering can be kept to be small, because an angle of incidence of a ray of light for the plane on the light source side of the first lens group does not become too large. Further, it becomes easy to arrange optical elements such as a polarized beam splitter and a wave plate, because a distance between the objective lens and the light source does not become too small. When the lower limit of the expression (10) is not exceeded, it is possible to make an optical pickup device housing therein the fourth objective lens to be small, because an object-image distance of the objective lens does not become too small. Incidentally, with regard to the expression (10), a range of expression (10') is more preferable for obtaining the effect mentioned above.

Further, it is preferable that the fourth objective lens satisfies the following expression (11).

$$0.01 \leq PD/PT \leq 0.15 \quad (11)$$

In the above expression, PD represents power ($mm^{-1}$) of a diffractive structure alone defined by $PD=\Sigma(-2 \cdot b_{2i})$ when the diffractive structure formed on $i^{th}$ surface is represented by the optical path difference function defined by the following expression (here, h represents a height (mm) from an optical axis and $b_{2i}$, $b_{4i}$, $b_{6i}$, ... are respectively 2nd order, $4^{th}$ order, $6^{th}$ order, ... optical path difference functions), $$\Phi b = b_2 h^2 + b_4 h^4 + b_6 h^6 + \quad (A)$$

and PT represents power ($mm^{-1}$) of the total system of the objective lens including power as a refracting lens and power of the diffractive structure.

By determining a diffractive structure of the objective lens so that expression (11) may be satisfied, longitudinal chromatic aberration caused on an objective lens for a wavelength of 600 nm or less can be corrected properly. Longitudinal chromatic aberration of a wave surface in the case of spot forming on an information recording surface of an optical information recording medium for the lower limit or more of the expression (11) is not corrected insufficiently, and longitudinal chromatic aberration of a wave surface in the case of spot forming on an information recording surface of the optical information recording medium for the lower limit is not corrected excessively.

As is shown in Structure (15), when a ring-shaped zonal diffractive structure is formed on the surface (concaved surface in shape) closest to an optical information recording medium on the first lens group that is in a meniscus lens shape wherein a convex surface faces a light source, an angle of a tip of each diffractive ring-shaped zone having a sawtoothed shape is not sharp compared with an occasion of forming a diffractive structure on a convex surface. Therefore, transferability of the diffractive ring-shaped zones becomes excellent when the diffractive structure and the first lens group are formed integrally through molding. As a result, it is possible to prevent a decline of diffraction efficiency caused by errors of a shape of the diffractive ring-shaped zones, and thereby, to obtain high efficiency for light utilization. In this case, it is possible to correct satisfactorily the longitudinal chromatic aberration generated on an objective lens for a wavelength of not more than 600 nm, by determining the diffractive structure formed on the surface closest to the optical information recording medium on the first lens group so that the diffractive structure satisfies the following expression.

$$0.05 \leq PD/PT \leq 0.25$$

It is possible to arrange so that insufficient correction of the longitudinal chromatic aberration of wave front generated when a spot is formed on an information recording surface of the optical information recording medium may be avoided for the range equal to or higher than the lower limit of the above-mentioned expression, and excessive correction of the longitudinal chromatic aberration of wave front generated when a spot is formed on an information recording surface of the optical information recording medium may be avoided for the range equal to or lower than the upper limit.

On the fourth objective lens, it is preferable that the following expression (12) is satisfied when λ (mm) is a reference wavelength, a focal length of the total system of the objective lens is f (mm), an order of diffracted light having the maximum amount of diffracted light among those generated by the diffractive structure formed on $i^{th}$ surface is ni, the number of rings of diffractive structure with in an effective diameter on the $i^{th}$ surface is Mi and the minimum value of the distance between adjoining rings of the diffractive structure within an effective diameter on the $i^{th}$ surface is Pi (mm).

$$0.04 \leq f\lambda\Sigma(ni/(Mi \cdot Pi^2)) \leq 0.50 \tag{12}$$

By determining a diffractive structure of the objective lens so that expression (12) may be satisfied, longitudinal chromatic aberration caused on an objective lens for a wavelength of 600 nm or less can be corrected properly. Longitudinal chromatic aberration of a wave surface in the case of spot forming on an information recording surface of an optical information recording medium for the lower limit or more of the expression (12) is not corrected insufficiently, and longitudinal chromatic aberration of a wave surface in the case of spot forming on an information recording surface of the optical information recording medium for the lower limit is not corrected excessively.

Further, it is preferable that the fourth objective lens satisfies the following expression (13).

$$0.2 \leq |(Ph/Pf)-2| \leq 3.0 \tag{13}$$

In the above expression, Pf is a diffractive ring-shaped zonal interval (mm) in prescribed image-side numerical aperture necessary for conducting recording and/or reproducing for an optical information recording medium, and Ph is a diffractive ring-shaped zonal interval (mm) in a half numerical aperture of prescribed image-side numerical aperture necessary for conducting recording and/or reproducing for an optical information recording medium.

As stated above, when the ring interval of the diffractive structure, namely the interval of the rings in the direction perpendicular to an optical axis satisfies the expression (13), spherical aberration in wavelength fluctuations can be corrected properly. Therefore, positional adjustment in the optical axis direction for a coupling lens, an objective lens or a light source in the course of incorporating a laser light source having oscillation wavelength deviated from reference wavelength in the optical pickup device is not needed, thus, substantial reduction of man-hour for assembly of an optical pickup device can be achieved. Further, if the optical path difference function has nothing but a second order optical path difference function coefficient (which is also called diffractive surface coefficient), a high order coefficient of optical path difference function among optical path difference functions is used, because (PD/Pf)-2=0 and the fourth objective lens correct properly, with effect of diffraction, the changes of spherical aberration caused by delicate wavelength changes from reference wavelength. In this case, it is preferable that (Ph/Pf)-2 takes a value that is away from 0 to a certain extent, and if the expression (13) is satisfied, the change of spherical aberration caused by the change of wavelength can be canceled with an effect of diffraction properly. Spherical aberration in the case of the change of wavelength from the reference wavelength for the lower limit or more of the expression (13) is not corrected excessively, and spherical aberration in the case of the change of wavelength from the reference wavelength for the upper limit or less is not corrected insufficiently.

When a diffracting function as a diffracting lens and a refracting function as a refracting lens are combined in the fourth objective lens, it is preferable that the objective lens has longitudinal chromatic aberration characteristics which change in the direction for a shorter back focus when a wavelength of the light source fluctuates to the longer wavelength side, and the objective lens satisfies the following expression (14).

$$-1 < \Delta CA/\Delta SA < 0 \tag{14}$$

In the aforesaid expression, $\Delta CA$ represents an amount of a change (mm) of longitudinal chromatic aberration for a change of a wavelength, and $\Delta SA$ represents an amount of a change (mm) of a spherical aberration of a marginal ray of light for a change of a wavelength.

When a diffracting function as a diffracting lens and a refracting function as a refracting lens are combined as stated above, it is preferable to have the longitudinal chromatic aberration characteristics in which a back focus in the case of fluctuation of a wavelength of a light source to the longer wavelength side changes in the direction for the shorter back focus before the aforesaid fluctuation and to satisfy the expression (14). When making the spherical aberration curve for the reference wavelength and the spherical aberration curve on the long/short wavelength side (which is also called spherical aberration of a color) to cross, by over-correcting longitudinal chromatic aberration on the objective lens with diffracting function, it is possible to control a positional dispersion for the optimum writing position for the fluctuation of a wavelength of the light source to be small, and thereby to achieve the objective lens wherein deterioration of wavefront aberration in the case of a mode hop phenomenon of a light source or of high frequency superposition is small. Further, when correcting chromatic aberration with a diffracting function as mentioned above, an interval of diffractive ring-shaped zones can be made greater than that in the case of correcting both longitudinal chromatic aberration and spherical aberration of a color, and thereby, it is possible to attain reduction of machining time for a metal mold and prevention of a fall of diffraction efficiency caused by manufacturing errors for a ring shape.

In the fourth objective lens, it is preferable that an amount of $n^{th}$ order diffracted light generated by the diffractive structure formed on the $i^{th}$ surface is greater than an amount of diffracted light of any other order, and $ni^{th}$ diffracted light that is generated by the aforesaid diffractive structure for recording and/reproducing information for the optical information recording medium can be converged on an information recording surface of the optical information recording medium. The symbol n, in this case, represents integers other than 0 and ±1.

This structure relates to an objective lens that conducts recording and/or reproducing of information for an optical information recording medium by utilizing high order diffracted light such as the second order diffracted light or the diffracted light of the higher order. If the ring-shaped diffractive structure is formed so that the diffraction efficiency of high order diffracted light such as the second order diffracted light or the diffracted light of the higher order may be the maximum, a step between rings and an interval between rings turn out to be large, which prevents required accuracy for the form of the diffractive structure from being too severe. When the diffracted light of the second order or higher is used, a fall of the diffraction efficiency caused by wavelength changes is greater generally, compared with an occasion to use the first order diffracted light. However, when using a light source closer to a single wavelength, an amount of a fall of diffraction efficiency caused by wavelength changes is so small that it can almost be ignored, which makes it possible to obtain an objective lens having a diffractive structure that is easily manufactured and has sufficient diffraction efficiency.

In the first objective lens through the fourth objective lens stated above, it is preferable that at least two surfaces among surfaces located between the surface of the first lens group closest to the light source and the surface of the second lens group closest to the light source are represented by an aspherical surface. Incidentally, let it be assumed that "the surface of the first lens group closest to the light source and the surface of the second lens group closest to the light source" include also a surface of the first lens group closest to the light source and a surface of the second lens group closest to the light source.

If at least two surfaces among surfaces located between the surface of the first lens group closest to the light source and the surface of the second lens group closest to the light source are made to be an aspherical surface, coma and astigmatism can also be corrected in addition to spherical aberration. If at least two surfaces of the surface of the first lens group closest to the light source and the surface of the second lens group closest to the light source are made to be an aspherical surface, in this case, aberration can be corrected more precisely, which is preferable. Further, by making the surface of the first lens group closest to the optical information recording medium to be an aspherical surface too, it is possible to control aberration caused by deviation between an optical axis of the first lens group and that of the second lens group to be small, which is preferable.

In the plastic objective lens with high NA as sated in the structure (21), an amount of change in spherical aberration caused by a change of refractive index arising from temperature changes is great, which causes a fear of problems in practical use. In the objective lens with high NA in which the first lens group and the second lens group are plastic lenses, it is possible to suppress an amount of change of spherical aberration caused by temperature changes, by satisfying the following expression.

$$0.06 > \Delta SAG > -0.08$$

$$\Delta SAG = (X1' - X2')/(NA^4 \cdot f \cdot (1+|m|))$$

$$X1' = X1 \cdot (N1-1)^3/f1$$

$$X2' = X2 \cdot (N2-1)^3/f2$$

When a value of ΔSAG that is a difference between amount of sag X1 on the surface closest to the light source on the first lens group and amount of sag X2 on the surface closest to the light source on the second lens group is greater than −0.08, it is possible to make a change of spherical aberration caused by temperature changes to be small. On the other hand, when a value of ΔSAG is 0,06 or more, an operating distance becomes too small although it is advantageous for making a change of spherical aberration caused by temperature changes to be small, which results in a sudden increase in possibility of collision of an objective lens and an optical information recording medium. In addition, a production tolerance for each lens group becomes too small, which worsens a production efficiency of each lens group. Furthermore, an amount of astigmatism caused by shifting of an optical axis between the first lens group and the second lens group becomes too large, which worsens an efficiency of incorporating the first lens group and the second lens group. Therefore, the following conditional expression has been established as a condition relating to ΔSAG for creating an objective lens wherein a change of spherical aberration caused by temperature changes is suppressed to be small, production is made to be easy, and an operation distance is secured sufficiently.

$$0.06 > \Delta SAG > -0.08$$

When a value of ΔSAG is greater than the lower limit of the expression above, the distance on an optical axis between the surface closest to the optical information recording medium on the second lens group and the surface of the optical information recording medium where the light flux enters does not become too small, which reduces a possibility of collision of the objective lens and the optical information recording medium. Further, an amount of astigmatism generated by optical axis shifting between the first lens group and the second lens group does not become too great, which improves the efficiency of incorporating the first lens group and the second lens group. Further, the degree of meniscus of the second lens group does not become too great, which can reduce an amount of coma caused by optical axis shifting of the surface of the second lens group and can improve production efficiency of the second lens group. Furthermore, a radius of curvature of the optical surface of the first lens group on the light source side does not become too small, which can reduce an amount of coma caused by optical axis shifting of the optical surface of the first lens group, and can improve the efficiency of production of the first lens group.

On the other hand, when a value of ΔSAG is smaller than the upper limit of the expression above, it is possible to make a lens to be one wherein a change of spherical aberration caused by temperature changes is small. Further, since a lens thickness of the first lens group on its optical axis does not become too great, it is possible to make a lens to be compact, which is advantageous from the viewpoint of a small-sized optical pickup device. In addition, a radius of curvature of the surface of the second lens group does not become too small, thereby, an apparent angle representing an angle formed by a normal line on the aspheric surface and the optical axis does not become too large, and a metal mold can be processed accurately.

Further, in the first objective lens through the fourth objective lens stated above, it is preferable that the following expression (15) is satisfied.

$$3 \leq \sqrt{(f1/f2)}/|m| \leq -50 \qquad (15)$$

In the aforesaid expression, fi represents a focal length (mm) of $i^{th}$ lens group (i=1 or 2) (which, however, is a focal length (mm) of the total system of $i^{th}$ lens group wherein a focal length as a refracting lens and a focal length of the diffractive structure are combined, when $i^{th}$ lens group has a diffractive structure), and m represents a lateral magnification of the objective lens defined by $NA_{OBJ}/NA_{IMG}$ when $NA_{OBJ}$ represents an object-side numerical aperture of the objective lens and $NA_{IMG}$ represents an image-side numerical aperture.

In the objective lens of the invention, the greater the lateral magnification is, the smaller is the ratio (f1/f2) of the focal length of the first lens group to that of the second lens group, though it is preferable that the objective lens mentioned above satisfies the expression (15). However, when f1/f2 becomes to small, namely, when power of the second lens group becomes too great, a radius of curvature of the surface of the second lens group on the light source side becomes small and aberration deterioration caused by deviation between an optical axis of the first lens group and that of the second lens group is increased. In addition, an error sensitivity for the central lens thickness of the second lens group grows greater. On the other hand, when f1/f2 becomes to large, namely, when power of the first lens group becomes too great, image height characteristics such as coma and astigmatism cannot be corrected properly. From the foregoing, a value of $(f1/f2)/|m|$ needs to be with in a certain range, for obtaining on objective lens which is easy to manufacture and is excellent in efficiency. When the upper limit of the expression (15) is not exceeded, a lens can be made easily and its lateral magnification is not too small, which makes it possible to obtain a compact optical pickup device. When the lower limit is not exceeded, a lens can be made to be excellent in terms of image height characteristics and its lateral magnification is not too large, which makes it possible to arrange optical elements such as a beam forming element, a polarized beam splitter and a wave plate easily.

The range of the following expression (15') is especially preferable for further attainment of the aforesaid effect.

$$6 \leq \sqrt{(f1/f2)/|m|} \leq 40 \quad (15')$$

Further, it is preferable that the following expression (16) is satisfied in the first objective lens through the fourth objective lens.

$$0.5 \leq (r2+r1)/(r2-r1) \leq 4.0 \quad (16)$$

In the above expression, r1 represents a paraxial radius of curvature (mm) of the surface of the first lens group closest to the light source, and r2 represents a paraxial radius of curvature (mm) of the surface of the first lens group closest to an optical information recording medium.

The expression (16) above relates to an appropriate form of the first lens group. When the upper limit of the expression (16) is not exceeded, a degree of meniscus of the first lens group does not become too high, and aberration deterioration caused by axis deviation between the surface of the first lens group closest to the light source and the surface closest to the optical information recording medium does not become too great. When the lower limit is not exceeded, correction of spherical aberration is not insufficient.

The range of the following expression (16') is especially preferable for further attainment of the aforesaid effect.

$$0.8 \leq (r2+r1)/(r2-r1) \leq 3.0 \quad (16')$$

Further, it is preferable that the following expression (17) is satisfied in the first objective lens through the fourth objective lens.

$$-0.02 \leq NA \cdot (X2-X1)/f \leq 0.30 \quad (17)$$

In the above expression, NA represents a prescribed image-side numerical aperture necessary to conduct recording and/or reproducing for an optical information recording medium, Xi represents a difference in the direction of an optical axis between a plane that is perpendicular to the optical axis and is tangent to the vertex of the surface of the $i^{th}$ lens group closest to the light source and the surface of the $i^{th}$ lens group closest to the light source in the outermost area in the effective diameter (the position on the surface of the $i^{th}$ lens group closest to the light source where the marginal ray of light of NA enters), and it is assumed that Xi takes a positive sign when it is measured in the direction toward the optical information recording medium with the aforesaid tangent plane that serves as a reference, and it takes a negative sign when it is measured in the direction toward the light source (i=1 or 2), and f represents a focal length (mm) of the total system of the objective lens.

The expression (17) is a conditional expression relating to an amount of a sag for each of the surface of the first lens group on the light source side and the surface of the second lens group on the light source side for correcting spherical aberration properly. In the objective lens of the invention, when a lateral magnification becomes greater, a ratio of a focal length of the first lens group to a focal length of the second lens group (f1/f2) becomes smaller, and curvature of the surface of the first lens group on the light source side becomes more gentle, and curvature of the surface of the second lens group on the light source side becomes more strict. Accordingly, an amount of a sag (X1) of the surface of the first lens group on the light source side necessary for correction of spherical aberration becomes small, and an amount of a sag (X2) of the surface of the second lens group on the light source side becomes greater, as shown in FIG. 32. Incidentally, when a value of X1 takes a positive sign and its absolute value is smaller, an effect to make spherical aberration of marginal ray of light to be corrected excessively becomes greater, and therefore, X2−X1 needs to be with in a certain range for correcting spherical aberration properly. From the foregoing, the objective lens of the invention satisfies the expression (17) preferably, and correction of spherical aberration for marginal ray of light is not excessive for the lower limit of the expression (17) or more, while, correction of spherical aberration for marginal ray of light is not insufficient for the upper limit or less.

The range of the following expression (17') is especially preferable for further attainment of the aforesaid effect.

$$-0.01 \leq (X2-X1)/f \cdot NA \leq 0.20 \quad (17')$$

Further, it is preferable that the first objective lens through the fourth objective lens include lens groups formed with optical plastic materials. If at least one lens group is formed by optical plastic material as mentioned above, even a high NA objective lens composed of two lens groups each having a large lens volume is light in weight, and thereby, reduction of a load on an actuator for focusing, quick follow-up and driving by a small-sized actuator are possible, and mass production at low cost is made possible by injection molding. From the foregoing, it is more preferable that both of two lens groups are made of optical plastic materials.

Changes of refractive index and a form of a plastic lens caused by changes in temperature and humidity are greater, compared with those in a glass lens, and deterioration of efficiency caused by the changes of refractive index and a form tends to be a problem. Since this deterioration of efficiency, namely, an increase of spherical aberration grows greater, in proportion to $4^{th}$ power of NA, the problem of deterioration of efficiency is greater for the objective lens with higher NA. In general, a change of refractive index of a plastic lens for a temperature change is about $-10 \times 10^{-5}/°C$. When the objective lens with high NA of the invention is composed of two lenses each being formed of plastic material, if a working distance is small for the focal length of the objective lens, third order spherical aberration corrected insufficiently is generated in the course of temperature rise, and third order spherical aberration corrected excessively is generated in the course of temperature fall. On the contrary, if a working distance is great for the focal length of the objective lens, it is possible to generate high order spherical aberration of $5^{th}$ order or higher having the polarity opposite to that of the third order spherical aberration in the course of temperature changing. In this case, it is possible to make an amount of third order spherical aberration generated and an amount of high order spherical aberration having opposite polarity generated to be well-balanced by satisfying the aforesaid expression (3) and/or expression (4) with the objective lens, and thus, even an objective lens with high NA formed with plastic material can be made to be an objective lens wherein deterioration of wavefront aberration in the course of temperature change is less and a range of usable temperatures is broad. Correction of spherical aberration is not insufficient for the lower limit or more of the expression (3) and/or expression (4), while, correction of spherical aberration for temperature rise is not excessive for the upper limit or less.

When at least one lens group is made of optical glass material in the first objective lens through the fourth objective lens, especially when the second lens group whose radius of curvature tends to be small among two lens groups is made of optical glass material having refractive index of 1.55 or more at d line, an angle formed between a tangent surface of the surface of the second lens group on the light source side and a plane perpendicular to an optical axis is not too large, which makes it possible to machine a metal mold with a diamond tool more accurately. Further, if the first lens group is made of optical glass material whose Abbe number at d line is 65 or more, it is possible to control generation of longitudinal chromatic aberration in the case of using a light source for a short wavelength, which is preferable.

Further, it is preferable that a diaphragm that regulates a light flux is provided between a plane that is perpendicular to an optical axis and is tangent to the vertex of the surface of the $i^{th}$ lens group closest to the light source and the surface of the aforesaid $i^{th}$ lens group closest to the light source, in the first objective lens through the fourth objective lens (I=1 or 2).

When arranging a diaphragm regulating a light flux at a position immediately before the surface of $i^{th}$ lens group closest to the light source as stated above, it is preferable to arrange it between a plane that is perpendicular an optical axis and is tangent to the vertex of the surface of the first lens group closest to the light source and the surface of the first lens on the light source side. Due to this, a distance between a diaphragm and the surface of $i^{th}$ lens group closest to the light source is small, which prevents that a ray of light passes through a portion that is higher than the area where aberration correction is assured, thus, even when divergent light enters the objective lens, aberration is not increased.

Further, when providing a diaphragm on each of the first objective lens through the fourth objective lens, it is preferable to regulate a diameter of a light-converging light flux by providing a portion where the direction of a normal line on the surface changes discontinuously at the position corresponding to the image-side numerical aperture necessary for conducting recording and/or reproducing of information for an optical information recording medium on at least one surface. Due to this, it is possible to converge a light flux that passes through the surface which is outside the portion where the direction of a normal line on the surface changes discontinuously on the point which is different from the light flux passing through the surface that is closer to an optical axis than a portion where the direction of a normal line on the refracting interface changes discontinuously. By forming solidly the portion where the direction of a normal line on the surface changes discontinuously and a lens on which the portion where the direction of a normal line on the surface changes discontinuously is provided, a diaphragm representing a separate member does not need to be mounted on the objective lens, and thereby, reduction of manufacturing time and cost reduction can be attained. Further, since a diaphragm is not necessary for forming a bobbin, the total weight of a driven portion including the objective lens and the bobbin can be reduced.

The first light-converging optical system of the invention is represented by a light-converging optical system for conducting recording and/or reproducing of information for an optical information recording medium which includes an objective lens of a finite conjugated type that is composed of a first lens group with positive refracting power and a second lens group with positive refracting power both arranged in this order from the light source side and converges a divergent light flux emitted from a light source on an information recording surface of the optical information recording medium, wherein a means that corrects fluctuations of spherical aberration generated on the light-converging optical system is provided between the light source and the information recording surface, and the following expression (18) is satisfied.

$$NA \geq 0.65 \tag{18}$$

In the expression above, NA represents an image-side numerical aperture of the prescribed objective lens necessary for conducting recording and/or reproducing for an optical information recording medium.

As stated above, the first objective lens through the fourth objective lens make it possible to obtain a high NA objective lens that is composed of two positive lenses and has a small diameter and a large working distance, and a high NA objective lens composed of two positive lenses wherein longitudinal chromatic aberration caused by mode hop of a laser light source is effectively corrected despite a short wavelength used, and when trying to make recording density to be high by using this high NA objective lens and a light source with a shorter wavelength, fluctuations of spherical aberration caused by various errors cannot be ignored.

With the aforesaid background, if a means to correct fluctuations of spherical aberration is provided between the light source and the information recording surface of the optical information recording medium as in the first light-converging optical system stated above, it is possible to obtain a light-converging optical system capable of maintaining excellent light-converging characteristics despite various errors.

As causes for fluctuations of spherical aberration, there are concretely given dispersion of oscillation wavelength for each individual laser light source, changes in refractive index of optical plastic material caused by changes of temperature and humidity, fluctuations of thickness of a transparent base board of an optical information recording medium, and manufacturing errors for objective lenses (surface form errors, errors of thickness on optical axis and errors of an air distance between lenses). By providing a means to correct spherical aberration ($3^{rd}$ order spherical aberration in particular) caused by various causes, it is possible to obtain the following advantages 1) –4) and yet to obtain a light-converging optical system capable of maintaining excellent light-converging characteristics constantly.

1) A laser light source does not need to be selected, and a requirement for accuracy of manufacturing of laser light sources is not too strict accordingly, which makes it possible to enhance productivity of laser light sources. Further, man-hour for manufacturing optical pickup devices can be reduced.
2) Constituent elements included in the light-converging optical system can be make of plastic materials and substantial cost reduction can be attained accordingly.
3) Required accuracy for manufacturing errors for optical information recording media is not too strict, which makes it possible to enhance productivity of optical information recording media.
4) A requirement for manufacturing accuracy for an objective lens is not too strict, which makes it possible to enhance productivity of objective lenses.

The second light-converging optical system of the invention is represented by a light-converging optical system for conducting recording and/or reproducing of information for an optical information recording medium which includes an objective lens of a finite conjugated type that is composed of a first lens group with positive refracting power and a second lens group with positive refracting power both arranged in this order from the light source side and converges a divergent light flux that is emitted from a light source and has a wavelength of not more than 600 nm on an information recording surface of the optical information recording medium, wherein a ring-shaped diffractive structure is provided on at least one surface of an optical element constituting the light-converging optical system.

When providing on at least one surface of an optical element constituting a light-converging optical system a diffractive structure having a wavelength characteristic wherein a back focus of an objective lens is shortened when a wavelength of a light source is shifted slightly to the long wavelength side, as in the aforesaid light-converging optical system, it is possible to correct effectively longitudinal chromatic aberration which is caused on an objective lens and is problematic when a short wavelength light source such as a violet semiconductor laser is used. By providing an optical element to be provided with the aforesaid diffractive structure between the light source and the objective lens separately from the objective lens, even an objective lens wherein longitudinal chromatic aberration is not corrected strictly can also be applied to the light-converging optical system in the invention.

In this case, it is preferable that the wavelength fluctuation generated by the light source is not more than ±10 nm, and the diffractive structure has a function to control longitudinal chromatic aberration caused by refractive index dispersion of optical material of an optical element that constitutes the light-converging optical system, the refractive index dispersion being caused by wavelength fluctuations of the light source.

The diffractive structure stated above has longitudinal chromatic aberration characteristics which generate longitudinal chromatic aberration having polarity opposite to that of longitudinal chromatic aberration caused by refractive index dispersion of optical material of an optical element constituting the light-converging optical system, the refractive index dispersion being caused by wavelength fluctuations of the light source in about ±10 nm. Namely, when the light source fluctuates in terms of wavelength toward the longer wavelength side, the longitudinal chromatic aberration caused by refractive index dispersion of optical material of the optical element constituting the light-converging optical system is in the direction where the back focus of the light-converging optical system becomes longer compared with the moment before the wavelength fluctuation, however, when the light source fluctuates in terms of wavelength toward the longer wavelength side, the longitudinal chromatic aberration caused by the diffractive structure is in the direction where the back focus of the light-converging optical system becomes shorter compared with the moment before the wavelength fluctuation. To obtain the state wherein longitudinal chromatic aberration of the wave surface converged on the information recording surface through the light-converging optical system is properly corrected, a size of longitudinal chromatic aberration caused by the diffractive structure can be made almost equal to longitudinal chromatic aberration caused by refractive index dispersion of optical materials, by combining power of diffraction and power of refraction appropriately. Incidentally, in the explanation above, the light-converging optical system is assumed to be one positive lens having a light-converging function.

When a diffraction function as a diffracting lens and a refraction function as a refracting lens are combined in the objective lens in the second light-converging optical system stated above, it is preferable to have longitudinal chromatic aberration characteristics for changing in the direction where a back focus becomes shorter when the wavelength of the light source fluctuates to the longer wavelength side, and to satisfy the following expression (19).

$$-1 < \Delta CA/\Delta SA < 0 \tag{19}$$

In the expression above, $\Delta CA$ represents an amount of change (mm) of longitudinal chromatic aberration for the change of the wavelength, and $\Delta SA$ represents an amount of change (mm) of spherical aberration of marginal ray of light for the change of the wavelength.

When a diffraction function as a diffracting lens and a refraction function as a refracting lens are combined in the light-converging optical system of the invention, it is preferable to have longitudinal chromatic aberration characteristics for changing in the direction where a back focus in the case of fluctuation of the wavelength of the light source toward the longer wavelength side becomes shorter compared with a back focus before the wavelength fluctuation, and to satisfy the following expression (19). By making a spherical aberration curve of the reference wavelength and spherical aberration curves on the longer and shorter wavelength sides (which is also called spherical aberration of a color) to cross with excessive correction of longitudinal chromatic aberration of the total light-converging optical system by the diffraction function, it is possible to control a shift of an optimum writing position in the case of fluctuation of a wavelength of the light source to be small, and thereby to achieve the light-converging optical system wherein deterioration of wavefront aberration in the case of mode hop phenomenon of the light source and of high frequency superposition is small.

Further, owing to the diffraction function, an interval of diffracting rings can be made larger on the light-converging optical system where chromatic aberration is corrected as stated above, compared with a light-converging optical system where both longitudinal chromatic aberration and spherical aberration of a color are corrected. It is therefore possible to reduce machining time for metal molds and to prevent deterioration of diffraction efficiency caused by manufacturing errors for ring shapes. Incidentally, in the explanation above, the light-converging optical system is assumed to be a positive lens having a light-converging function.

Further, it is preferable that an amount of $n^{th}$ order diffraction light generated by the aforesaid diffractive structure is greater than that of any other order diffraction light, and $n^{th}$ order diffraction light generated by the aforesaid diffractive structure for recording and/or reproducing of information for the optical information recording medium can be converged on an information recording surface of the optical information recording medium. In this case, n represents integers excepting ±1.

This structure relates to a light-converging optical system conducting recording and/or reproducing of information for an optical information recording medium by the use of diffracted light at high order of $2^{nd}$ order or higher. If a ring-shaped diffractive structure is formed so that diffraction efficiency of the light at high order of $2^{nd}$ order or higher may be the maximum, a step between adjoining rings and a distance between adjoining rings are great, and required accuracy for diffractive structure forms is not too strict. When a light source that is close to a single wavelength is used, a fall of the diffraction efficiency caused by wavelength changes is negligibly small, although a fall of the diffraction efficiency caused by wavelength changes is generally great when the diffracted light at $2^{nd}$ order or higher is used, compared with an occasion of using the diffracted light at $1^{st}$ order. It is therefore possible to obtain a light-converging optical system having the diffractive structure which can be manufactured easily and has sufficient diffraction efficiency.

It is preferable that a means to correct fluctuations of spherical aberration caused in the light-converging optical system is provided between the light source and the information recording surface in the second light-converging optical system, and the following expression (20) is satisfied.

$$NA \geq 0.65 \quad (20)$$

In the expression above, NA represents an image-side numerical aperture of the prescribed objective lens necessary for conducting recording and/or reproducing for an optical information recording medium.

When the objective lens having a large NA satisfying the expression (20) is used in the light-converging optical system of the invention as stated above, fluctuations of spherical aberration caused by various errors become unable to be ignored. In that case, if a means to correct fluctuations of spherical aberration is provided between the light source and the information recording surface of an optical information recording medium, it is possible to obtain a light-converging optical system wherein excellent light-converging characteristics can be maintained in spite of various errors, and yet, longitudinal chromatic aberration is corrected properly by a diffraction function of the diffractive structure. As concrete causes for fluctuations of spherical aberration, there are given dispersion of oscillation wavelengths of light sources, refractive index changes in optical plastic materials caused by changes in temperature and humidity, fluctuations in thickness of a transparent base board of an optical information recording medium, and manufacturing errors (surface form errors, errors in thickness on an optical axis, and errors of air distance between lenses) for objective lenses.

In the first and second light-converging optical systems stated above, it is preferable that the spherical aberration correcting means includes at least one optical element which can change a degree of divergence of an emerging light flux by moving along an optical axis. The structure that includes at least one optical element like this can correct fluctuations of spherical aberration properly through the simple structure.

To be more concrete, it is either possible to make a lens group on one side of an objective lens of a type of two lens groups to be capable of moving in the direction of an optical axis, or possible to make an optical element provided between a light source and an objective lens to be capable of moving in the direction of an optical axis. In either case, it is possible to correct properly the spherical aberration caused by changes of temperature and humidity, fluctuations in thickness of a transparent base board of an optical information recording medium, minute fluctuations in oscillation wavelengths of a light source, or manufacturing errors for objective lenses.

When the optical element movable along an optical axis is made of optical plastic material which is light in weight, it is possible to reduce a load on an actuator and to respond quickly to fluctuations of spherical aberration.

It is further preferable that the means for correcting fluctuations of spherical aberration is an element arranged between the light source and the information recording surface on which the distribution of refractive index in the direction perpendicular to an optical axis is changeable. By correcting fluctuations of spherical aberration with a device to generate, through impression of voltage, the distribution of refractive indexes in the direction perpendicular to an optical axis, as in the foregoing, it is possible to obtain a light-converging optical system which has no movable parts and has a mechanically simple structure.

The means for correcting fluctuations of spherical aberration may also be an element arranged between the objective lens and the optical information recording medium on which the refractive index is changeable. When the means is arranged between the objective lens and the optical information recording medium, spherical aberration can be corrected if the refractive index in place of the distribution of refractive indexes is changed.

Further, the first objective lens through the fourth objective lens mentioned above can be applied to the first and second light-converging optical systems.

Further, it is preferable that each light-converging optical system is a light-converging optical system wherein recording and/or reproducing of information from the same light flux incident surface side to plural information recording layers is possible, and fluctuations of spherical aberration caused by differences in transparent base board thickness from the light flux incident surface to each information recording layer in the case of focus jump between information recording layers are corrected by a means to correct fluctuations of the spherical aberration.

This structure relates to a light-converging optical system used for an optical pickup device capable of recording and/or reproducing information for an optical information recording medium of a multi-layer recording type having a structure wherein a transparent base board and an information recording layer are laminated plural times in this order from the incident surface side for the light flux. Since fluctuations of spherical aberration caused by differences in thickness of transparent base boards from light flux incident surface in the case of focus jump between information recording layers up to each information recording layer are corrected by a spherical aberration correcting means, it is possible to conduct recording and/or reproducing of information for an optical information recording medium of a multi-layer recording type even for an advanced optical pickup device employing an objective lens having a high numerical aperture of 0.65 or more.

The first optical pickup device of the invention is an optical pickup device that converges a light flux emitted from a light source on an information recording surface of an optical information recording medium with a light-converging optical system including an objective lens of a finite conjugated type that is composed of the first lens group with positive refracting power and the second lens group with positive refracting power arranged in this order from the light source side and records information on the information recording surface and/or reproduce information on the image recording surface, wherein the light source is structured to be capable of changing a degree of divergence of a light flux entering the objective lens by moving in the direction of an optical axis, and there are provided a detecting means for detecting fluctuations of spherical aberration caused on the light-converging optical system by detecting reflected light coming from the information recording surface, and a driving means that moves the light source in the direction of an optical axis for reducing fluctuations of the spherical aberration in accordance with the results of detection of the detecting means.

Owing to the optical pickup device stated above, fluctuations of spherical aberration caused by dispersion of oscillation wavelength in laser light sources, changes of refractive index of optical plastic material caused by changes of temperature and humidity, fluctuations of thickness of transparent base boards of optical information recording media, and manufacturing errors for objective lenses (surface form errors, errors of thickness on optical axis and errors of an air distance between lenses) are corrected by moving the light source in the direction of an optical axis, in an optical pickup device having an objective lens of a finite conjugated type composed of two lens groups. To be concrete, a driving means which moves a light source in the direction of an optical axis is operated so that spherical aberration caused on the light-converging optical system may be corrected on an optimum basis, which monitoring signals on a detecting means that detects how the light flux converged on an information recording surface is converged by detecting reflected light coming from the information recording surface. Incidentally, as a driving means moving the light source in the direction of an optical axis, a piezo-actuator and an actuator of a voice coil type can be used.

The first objective lens through the fourth objective lens mentioned above can be applied to the aforesaid optical pickup device.

The second optical pickup device of the invention is an optical pickup device that converges a light flux emitted from a light source on an information recording surface of an optical information recording medium with a light-converging optical system including an objective lens of a finite conjugated type that is composed of the first lens group with positive refracting power and the second lens group with positive refracting power arranged in this order from the light source side and a means to correct fluctuations of spherical aberration, and records information on the information recording surface and/or reproduce information on the image recording surface, wherein any one of the light-converging optical systems abovementioned is provided as a light-converging optical system, and there are provided a detecting means to detect fluctuations of spherical aberration caused on the light-converging optical system by detecting reflected light coming from the information recording surface and a driving means to drive a means that corrects fluctuations of the spherical aberration for reducing fluctuations of the spherical aberration based on the results of detection of the detecting means.

Owing to the optical pickup device stated above, when the aforesaid light-converging optical system is provided, fluctuations of spherical aberration caused by dispersion of oscillation wavelength in laser light sources, changes of refractive index of optical plastic material caused by changes of temperature and humidity, fluctuations of thickness of transparent base boards of optical information recording media, and manufacturing errors for objective lenses (surface form errors, errors of thickness on optical axis and errors of an air distance between lenses) are corrected and thereby an optical pickup device which is constantly excellent in terms of the state of light-converging can be obtained, even in the case of an optical pickup device equipped with an objective lens having high NA. To be concrete, a driving means which moves a light source in the direction of an optical axis is operated so that spherical aberration caused on the light-converging optical system may be corrected on an optimum basis, which monitoring signals on a detecting means that detects how the light flux converged on an information recording surface is converged by detecting reflected light coming from the information recording surface. Incidentally, as a driving means moving the light source in the direction of an optical axis, a piezo-actuator and an actuator of a voice coil type can be used.

Being equipped with the optical pickup device mentioned above, a recording apparatus for voices and images and a reproducing apparatus for voices and images of the invention can conduct recording or reproducing of voices and images properly for advanced optical information recording media which are higher in density and greater in capacity than DVD.

DETAILED DESCRIPTION OF THE PREFERRED EMBODIMENT

EXAMPLES OF THE INVENTION

Figure 1:
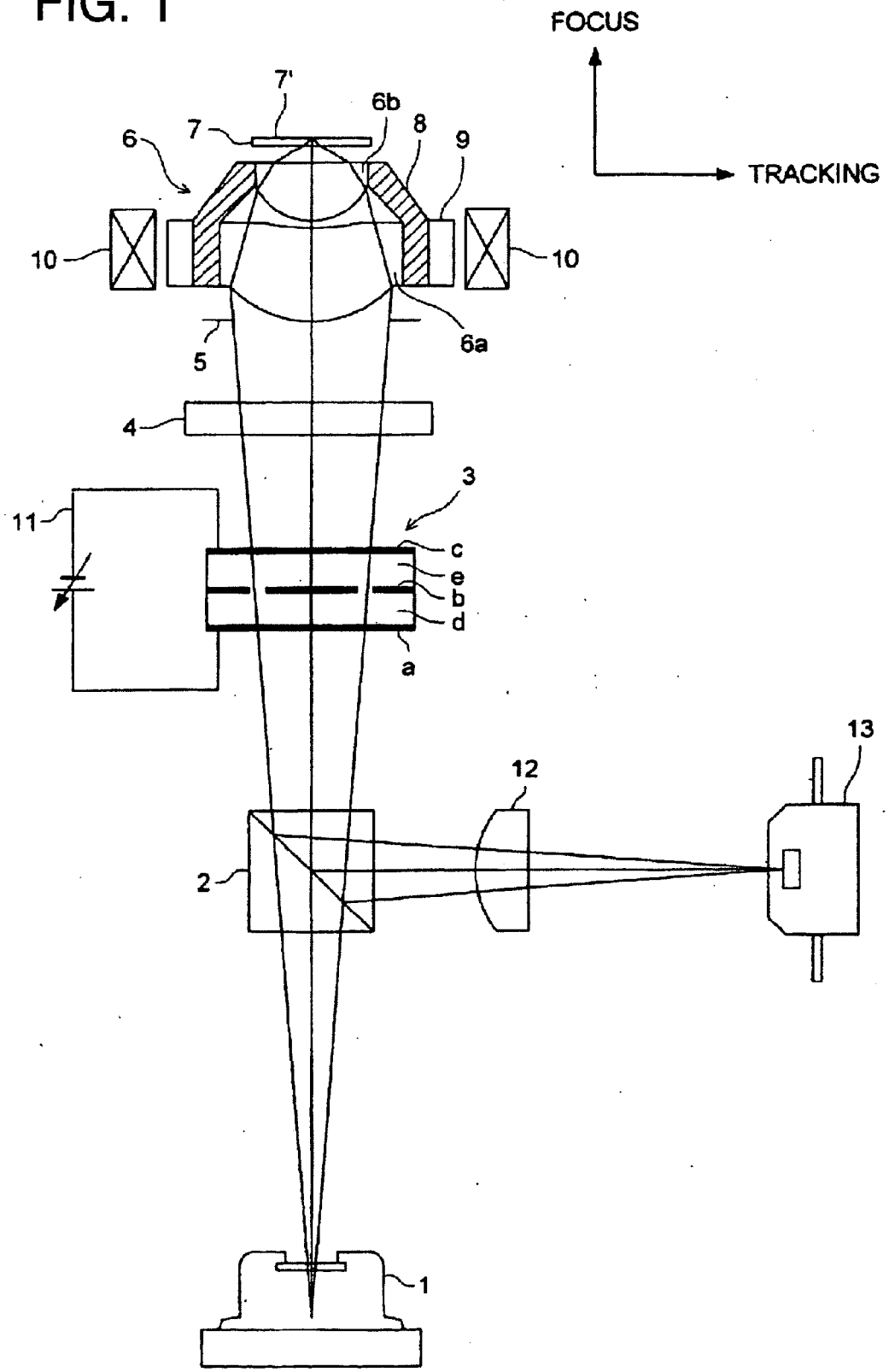
FIG. 1 is a schematic diagram of an optical pickup device in the First Example of the invention.

Optical pickup devices in the first through sixth Examples of the invention will be explained as follows, referring to the drawings.

First Example

FIG. 1 is a diagram showing schematically the optical pickup device in the First Example of the invention.

The optical pickup device in FIG. 1 is constructed so that a light flux emitted from light source 1 composed of a semiconductor laser may pass through polarized beam splitter 2, refractive index distribution changeable element 3 driven by driving means 11 representing a correcting means for spherical aberration fluctuations, ¼ wavelength plate and diaphragm 5, and may be converged by two-group objective lens 6 composed of first lens 6a and second lens 6b on information recording surface 7' through transparent base board 7 of an optical information recording medium. The optical pickup device is further constructed so that reflected light from information recording surface 7' may pass through the two-group objective lens 6 and the refractive index distribution changeable element 3 again, and then, may be reflected by the polarized beam splitter 2 to advance toward optical detector 13 after passing through light-converging lens 12.

Further, in the two-group objective lens 6, the first lens 6a and the second lens 6b are united solidly by holding member 8, and the two-group objective lens 6 is mounted accurately on the optical pickup device by flange section 9. Further, the optical pickup device in FIG. 1 is equipped with biaxial actuator 10 which drives objective lens 6 in the biaxial directions for tracking/focusing as a driving means for the objective lens.

In the optical pickup device in FIG. 1, an element capable of changing refractive index distribution is used as a spherical aberration fluctuation correcting means, and in this refractive index distribution changeable element 3, electrode layers a, b and c which are connected electrically each other and are transparent optically and refractive index distribution changeable layers d and e which are insulated electrically from the electrode layers a, b and c and change refractive index distribution based on voltage impressed are laminated alternately, and the electrode layers a, b and c which are optically transparent are divided into plural areas.

When fluctuations of spherical aberration are detected by optical detector 13, voltage is impressed by driving means 11 on each of electrode layers a, b and c on the refractive index distribution changeable element 3 to change refractive index on each of refractive index distribution changeable layers d and e depending on the place and thereby to generate distribution of refractive index in the direction perpendicular to the optical axis, and a phase of light emerged from the refractive index distribution changeable element 3 is controlled so that fluctuations of spherical aberration may be made zero.

In the optical pickup device of the present example, a light flux emitted from light source 1 is converged on information recording surface 7' of the optical information recording medium by two-group objective lens 6 through the refractive index distribution changeable element 3, and reflected light modulated by the foregoing is received by the optical detector 13, thereby, reproduction can be carried out. Incidentally, it is possible to record on the information recording surface of the optical information recording medium in the same way.

Since the driving means 11 controls a phase of the light emerged for the refractive index distribution changeable element 3 based on the results of detection of fluctuations of spherical aberration by impressing voltage so that fluctuations of spherical aberration may be made zero, in the course of the recording or the reproduction mentioned above, it is possible to record or reproduce while correcting fluctuations of spherical aberration caused by dispersion of oscillation wavelengths in laser light sources, changes of refractive index of an optical plastic material caused by changes in temperature and humidity, fluctuations of a thickness of the transparent base board of the optical information recording medium, and manufacturing errors When distribution of refractive index in the direction perpendicular to an optical axis is generated by impression of voltage as stated above, and thereby fluctuations of spherical aberration are corrected, a light-converging optical system having no movable parts and having a mechanically simple structure can be obtained.

Second Example

Figure 2:
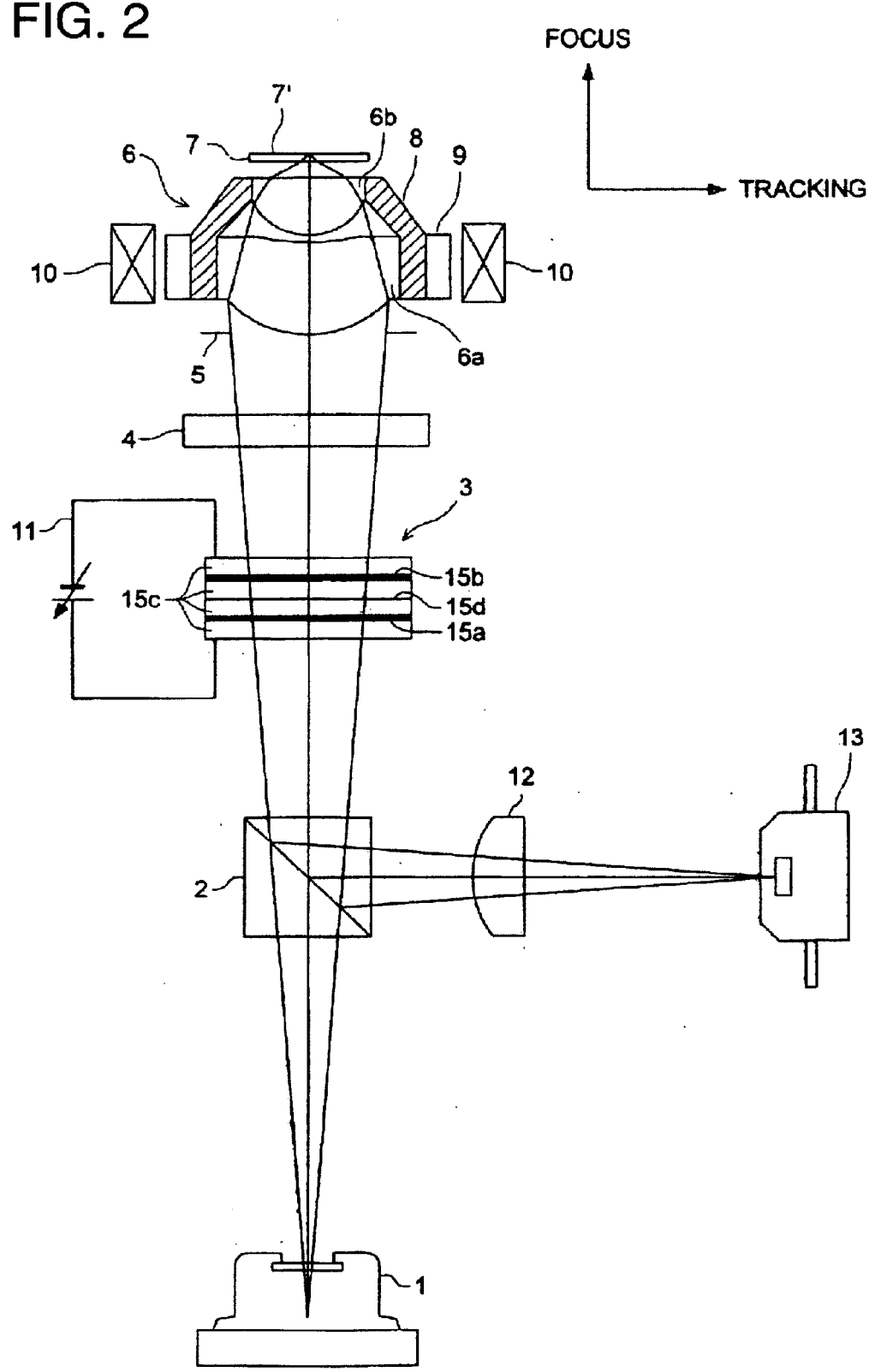
FIG. 2 is a schematic diagram of an optical pickup device in the Second Example of the invention.

FIG. 2 is a diagram showing schematically the optical pickup device in the Second Example of the invention.

The optical pickup device shown in FIG. 2 is basically of the same structure as in FIG. 1 excepting that a crystal element is used as an element on which the distribution of refractive index is changeable, and the same portions as those in FIG. 1 are given the same symbols and explanation thereof will be omitted.

In FIG. 2, liquid crystal element 15a in which liquid crystal molecules are arranged in the optional X direction in a plane perpendicular to the optical axis and liquid crystal element 15b in which liquid crystal molecules are arranged in the Y direction perpendicular to the X direction in a plane perpendicular to the optical axis are used as refractive index distribution changeable element 3. By laminating the liquid crystal element 15a and the liquid crystal element 15b alternatively with glass base board 15c between, and by impressing voltage on the liquid crystal element 15a and the liquid crystal element 15b from driving means 11, a component in the X direction and a component in the Y direction of the phase of emerged light can be controlled independently, and fluctuations of spherical aberration can be corrected. The optical pickup device in FIG. 2 makes it possible to obtain the same effect as in FIG. 1.

Third Example

Figure 3:
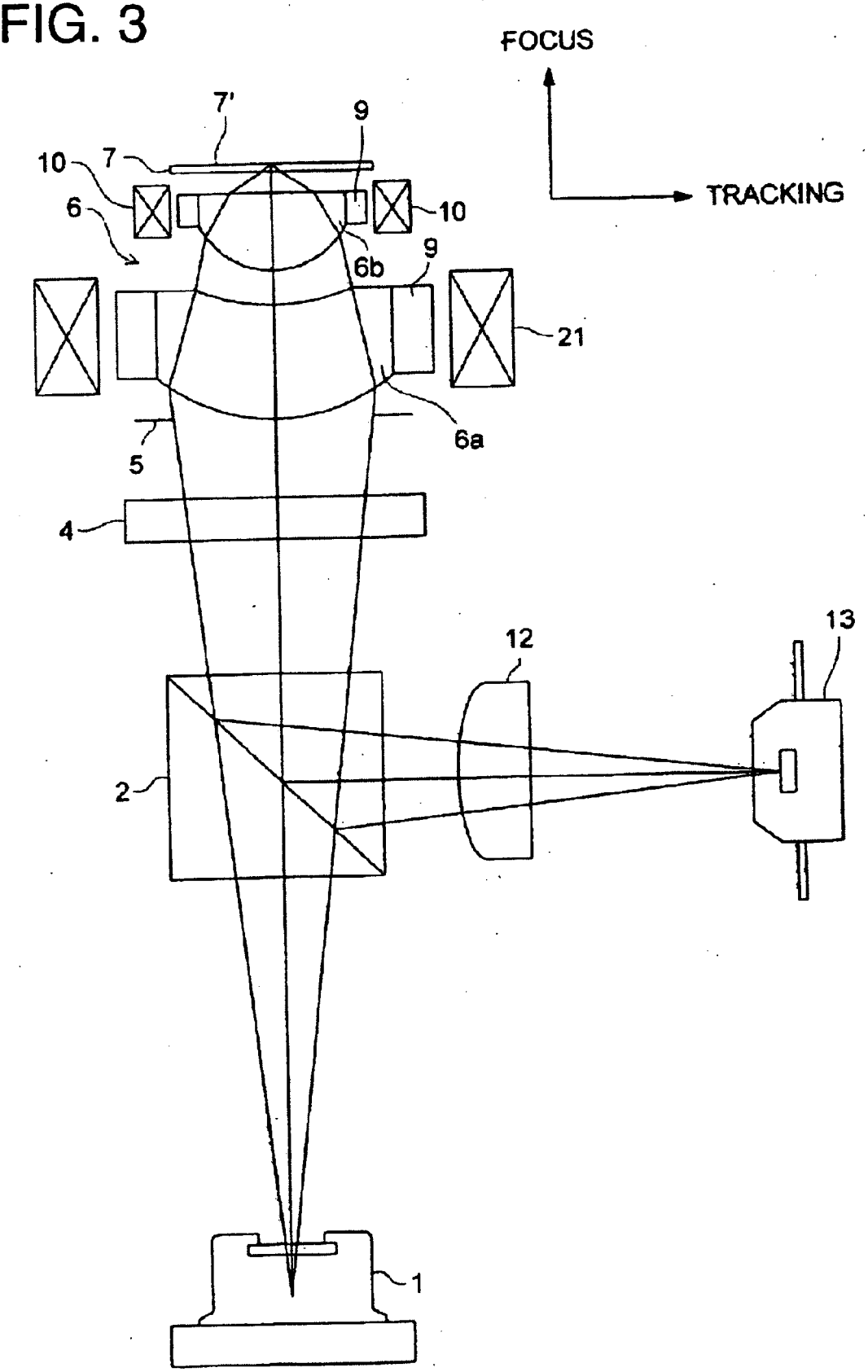
FIG. 3 is a schematic diagram of an optical pickup device in the Third Example of the invention.

FIG. 3 is a diagram showing schematically the optical pickup device in the Third Example of the invention.

The optical pickup device shown in FIG. 3 is basically of the same structure as in FIG. 1 excepting that a lens on one side of the two-group objective lens is made to be capable of moving in the optical axis direction for correction of fluctuation of spherical aberration in place of the refractive index distribution changeable element, and the same portions as those in FIG. 1 are given the same symbols and explanation thereof will be omitted.

As shown in FIG. 3, first lens 6a representing a two-group objective lens is structured to be moved by uniaxial actuator 21 in the optical axis direction, for correction of fluctuation of spherical aberration, and second lens 6b is driven in the biaxial direction by biaxial actuator 10 for tracking/focusing. If fluctuations of spherical aberration are detected by optical detector 13, first lens 6a of the two-group objective lens is moved in the optical axis direction so that spherical aberration may become zero. The optical pickup device in FIG. 3 makes it possible to obtain the same effect as in FIG. 1.

Fourth Example

Figure 4:
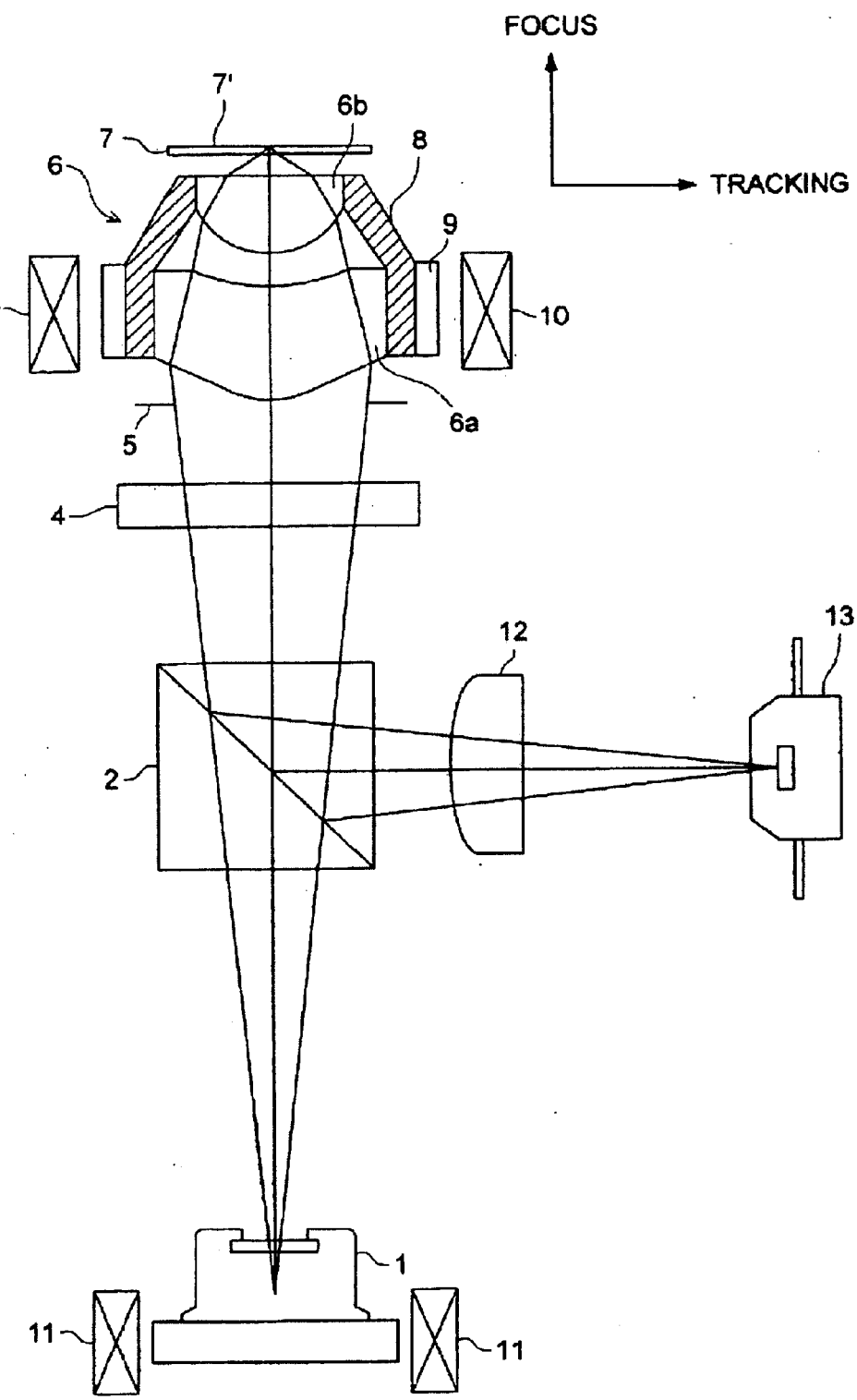
FIG. 4 is a schematic diagram of an optical pickup device in the Fourth Example of the invention.

FIG. 4 is a diagram showing schematically the optical pickup device in the Fourth Example of the invention.

The optical pickup device shown in FIG. 4 is basically of the same structure as in FIG. 1 excepting that a light source is made to be capable of moving in the optical axis direction for correction of fluctuation of spherical aberration in place of the refractive index distribution changeable element, and the same portions as those in FIG. 1 are given the same symbols and explanation thereof will be omitted.

As shown in FIG. 4, the light source 1 is structured to be capable of being moved in the optical axis direction by uniaxial actuator 21 for correction of fluctuation of spherical aberration. If fluctuations of spherical aberration are detected by optical detector 13, the light source is moved in the optical axis direction so that spherical aberration may become zero. The optical pickup device in FIG. 4 makes it possible to obtain the same effect as in FIG. 1.

Fifth Example

Figure 5:
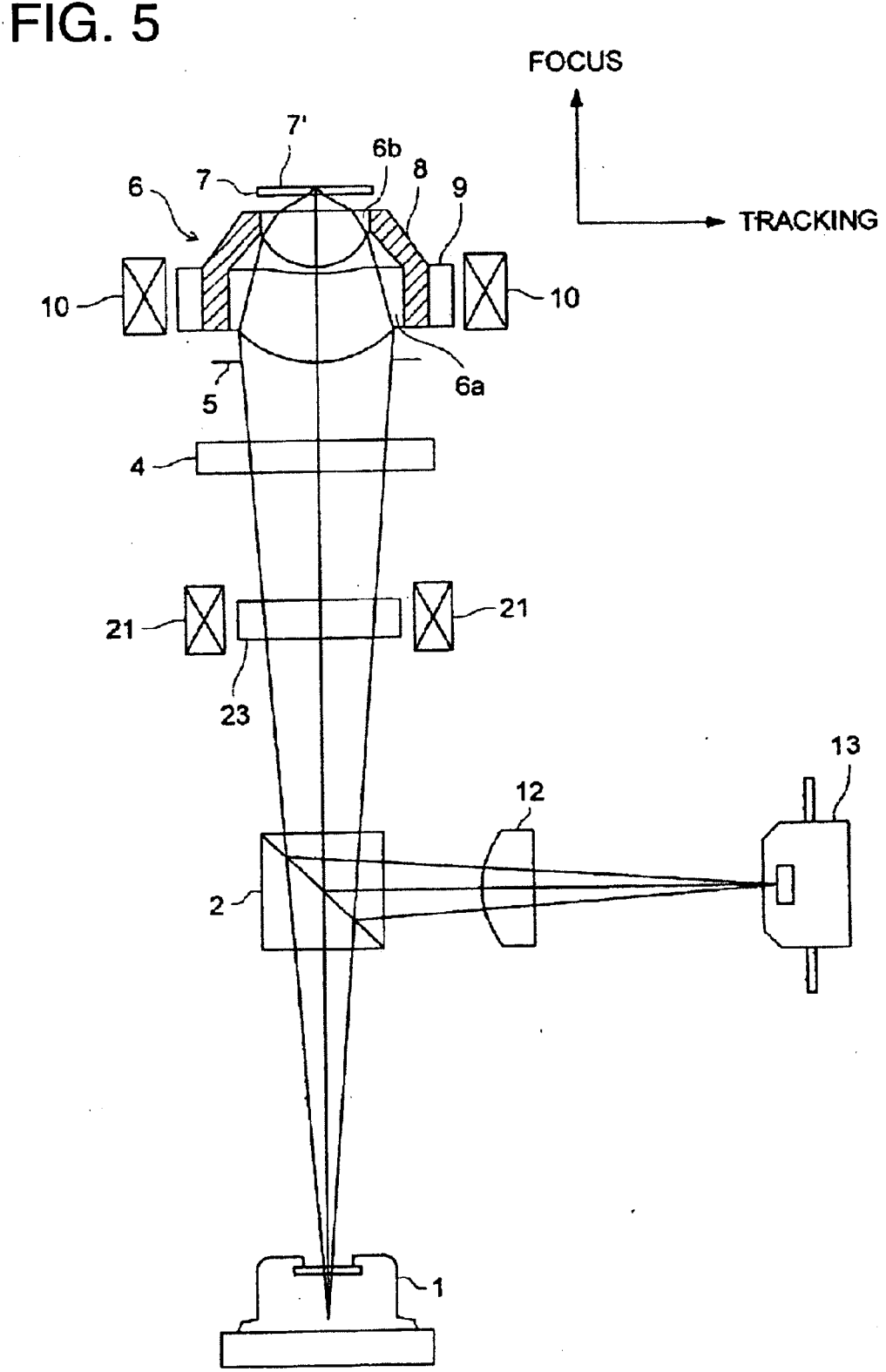
FIG. 5 is a schematic diagram of an optical pickup device in the Fifth Example of the invention.

FIG. 5 is a diagram showing schematically the optical pickup device in the Fifth Example of the invention.

The optical pickup device shown in FIG. 5 is basically of the same structure as in FIG. 1 excepting that a lens is made to be capable of moving in the optical axis direction for correction of fluctuation of spherical aberration in place of the refractive index distribution changeable element, and the same portions as those in FIG. 1 are given the same symbols and explanation thereof will be omitted.

As shown in FIG. 5, lens 23 is structured to be capable of being moved by uniaxial actuator 21 for correction of fluctuation of spherical aberration. If fluctuations of spherical aberration are detected by optical detector 13, the lens 23 is moved in the optical axis direction so that spherical aberration may become zero. The optical pickup device in FIG. 5 makes it possible to obtain the same effect as in FIG. 1.

Sixth Example

Figure 6:
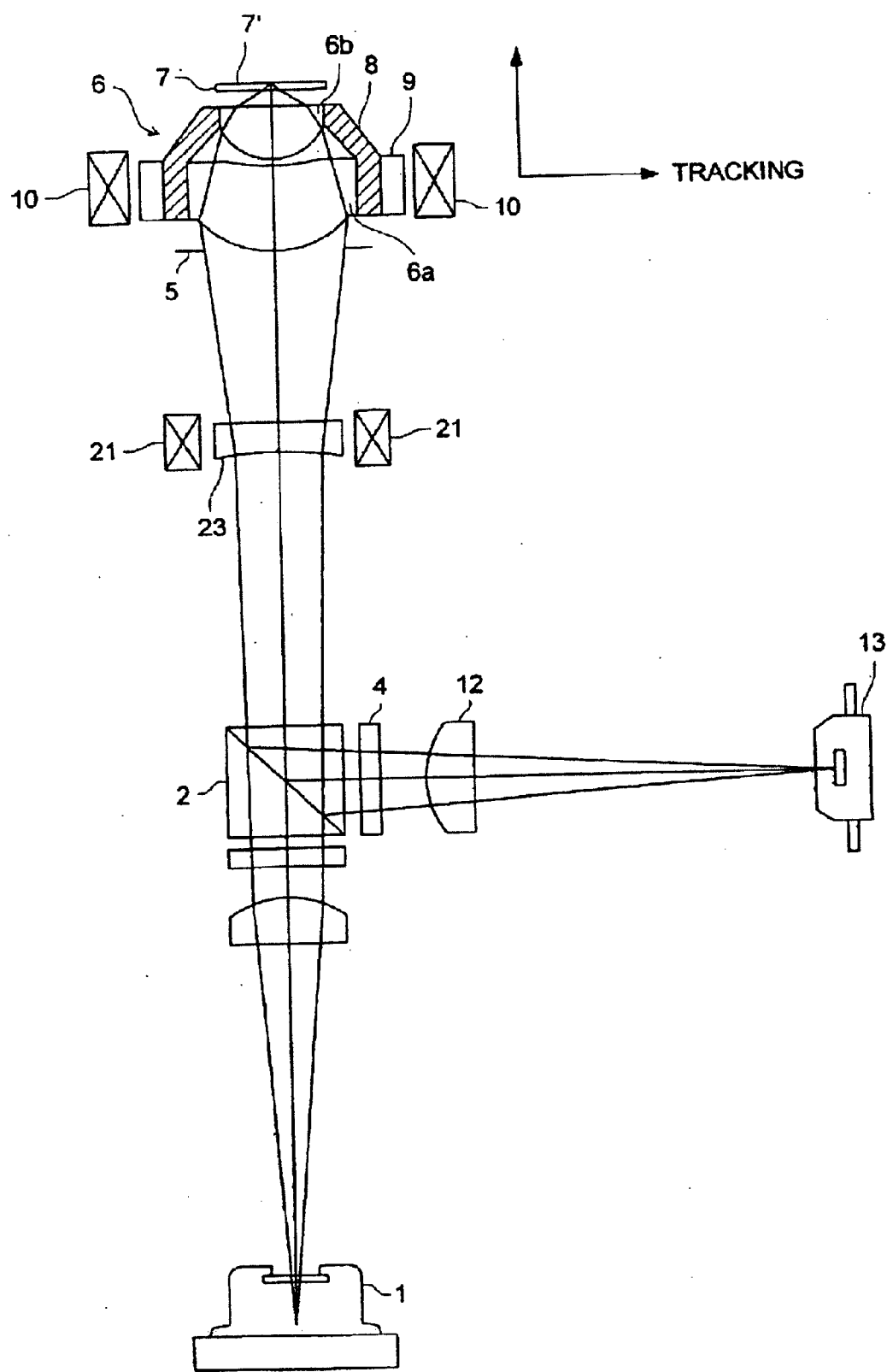
FIG. 6 is a schematic diagram of an optical pickup device in the Sixth Example of the invention.

FIG. 6 is a diagram showing schematically the optical pickup device in the Sixth Example of the invention.

The optical pickup device shown in FIG. 6 is basically of the same structure as in FIG. 5 excepting that coupling lens 14 and ¼ wavelength plate 4 are arranged between light source 1 and polarized beam splitter 2, and ¼ wavelength plate 4 is arranged between the polarized beam splitter 2 and optical detector 13, and the same portions as those in FIG. 5 are given the same symbols and explanation thereof will be omitted.

As shown in FIG. 6, if fluctuations of spherical aberration are detected by optical detector 13, the lens 23 is moved by uniaxial actuator 21 in the optical axis direction so that spherical aberration may become zero, and an angle of divergence of parallel light is changed to correct fluctuations of spherical aberration. The optical pickup device in FIG. 6 makes it possible to obtain the same effect as in FIG. 1.

Seventh Example

Figure 7:
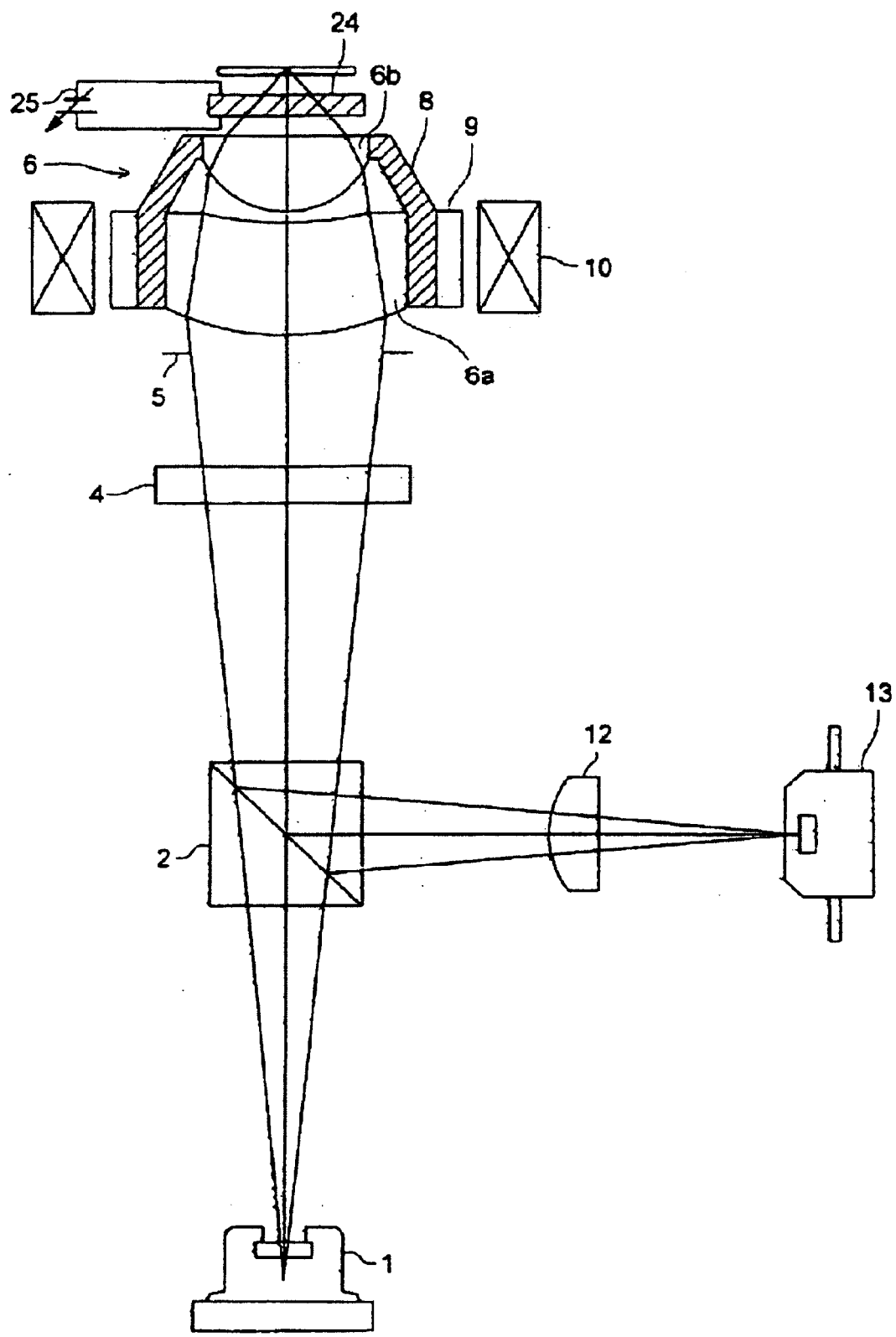
FIG. 7 is a schematic diagram of an optical pickup device in the Seventh Example of the invention.
Figure 8:
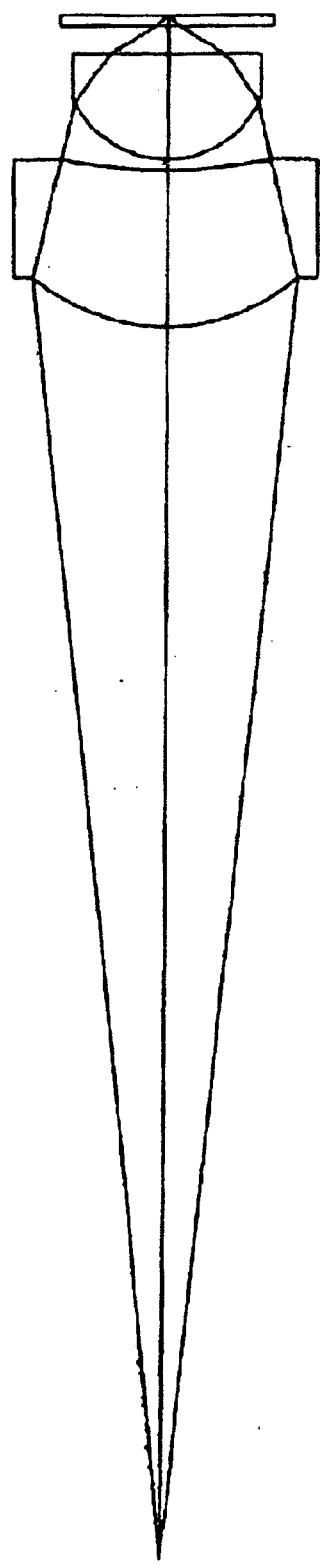
FIG. 8 is an optical path diagram in Example 1.
Figure 9:
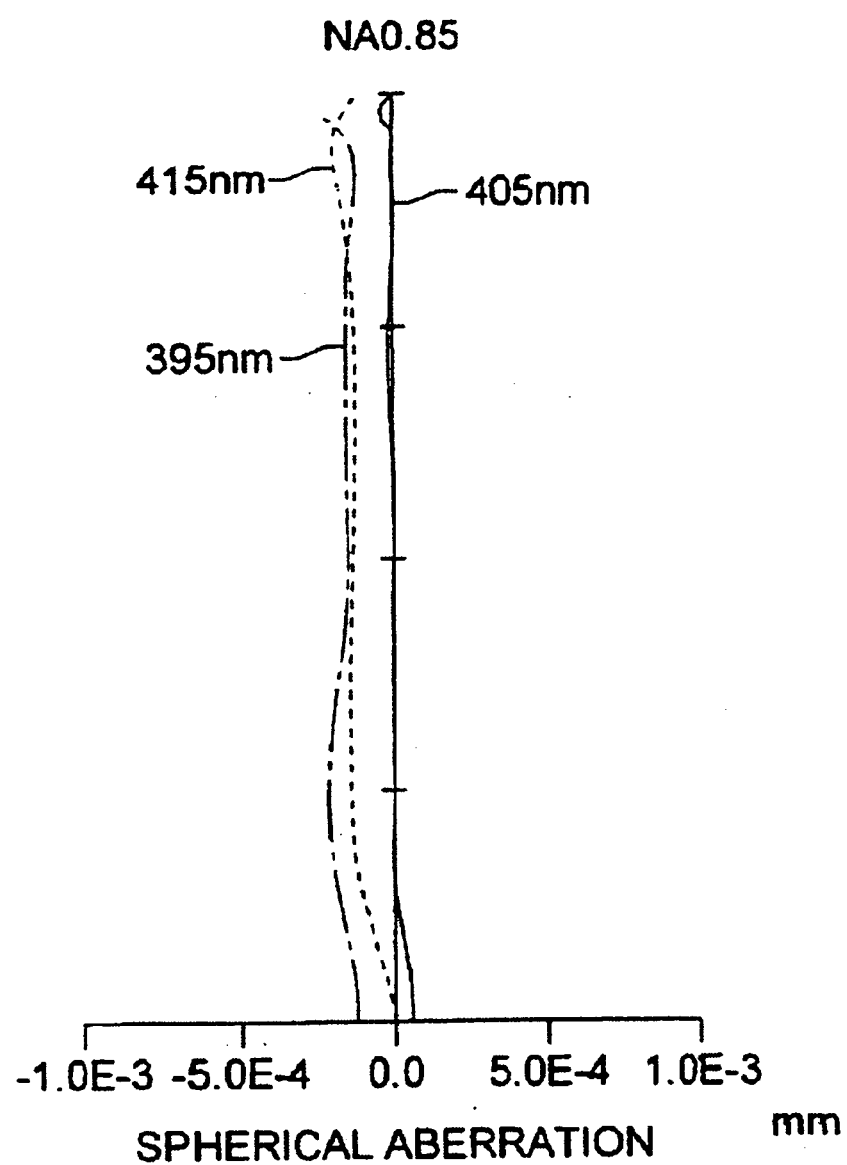
FIG. 9 is a spherical aberration diagram in Example 1.
Figure 10:
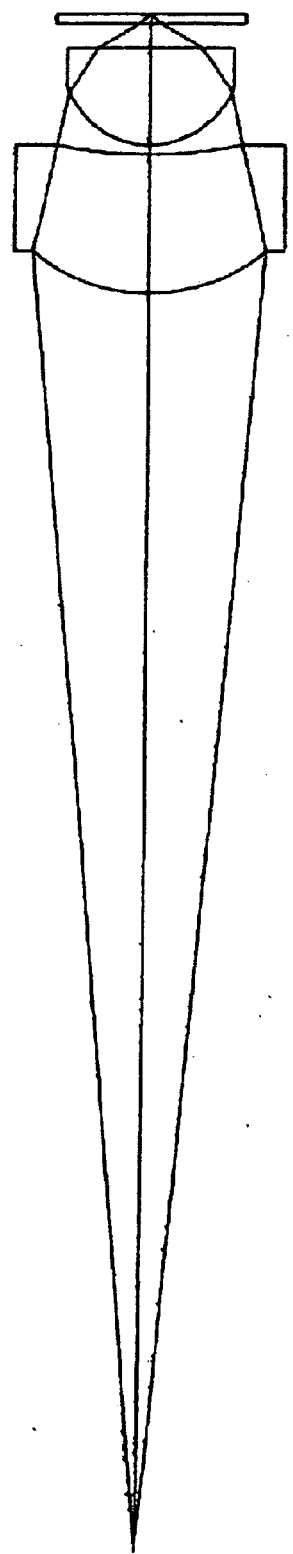
FIG. 10 is an optical path diagram in Example 2.
Figure 11:
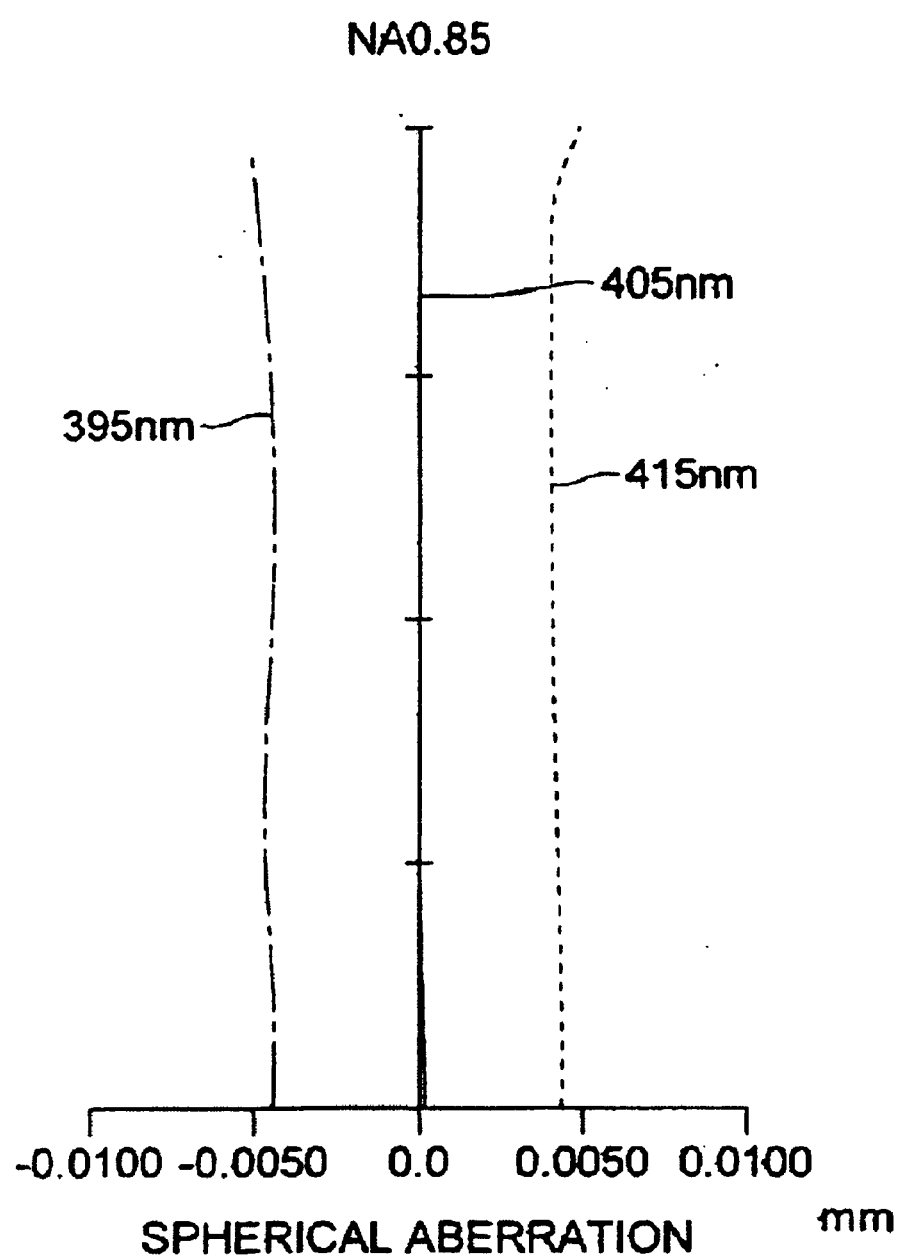
FIG. 11 is a spherical aberration diagram in Example 2.
Figure 12:
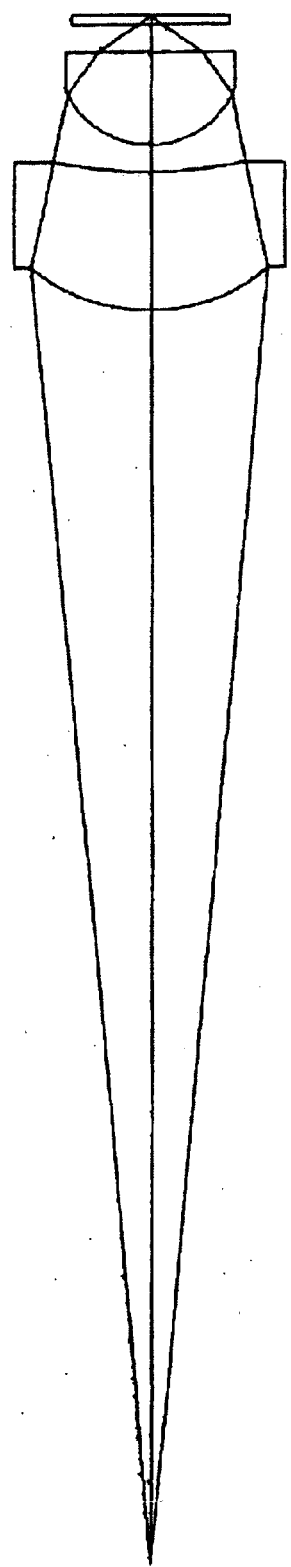
FIG. 12 is an optical path diagram in Example 3.
Figure 13:
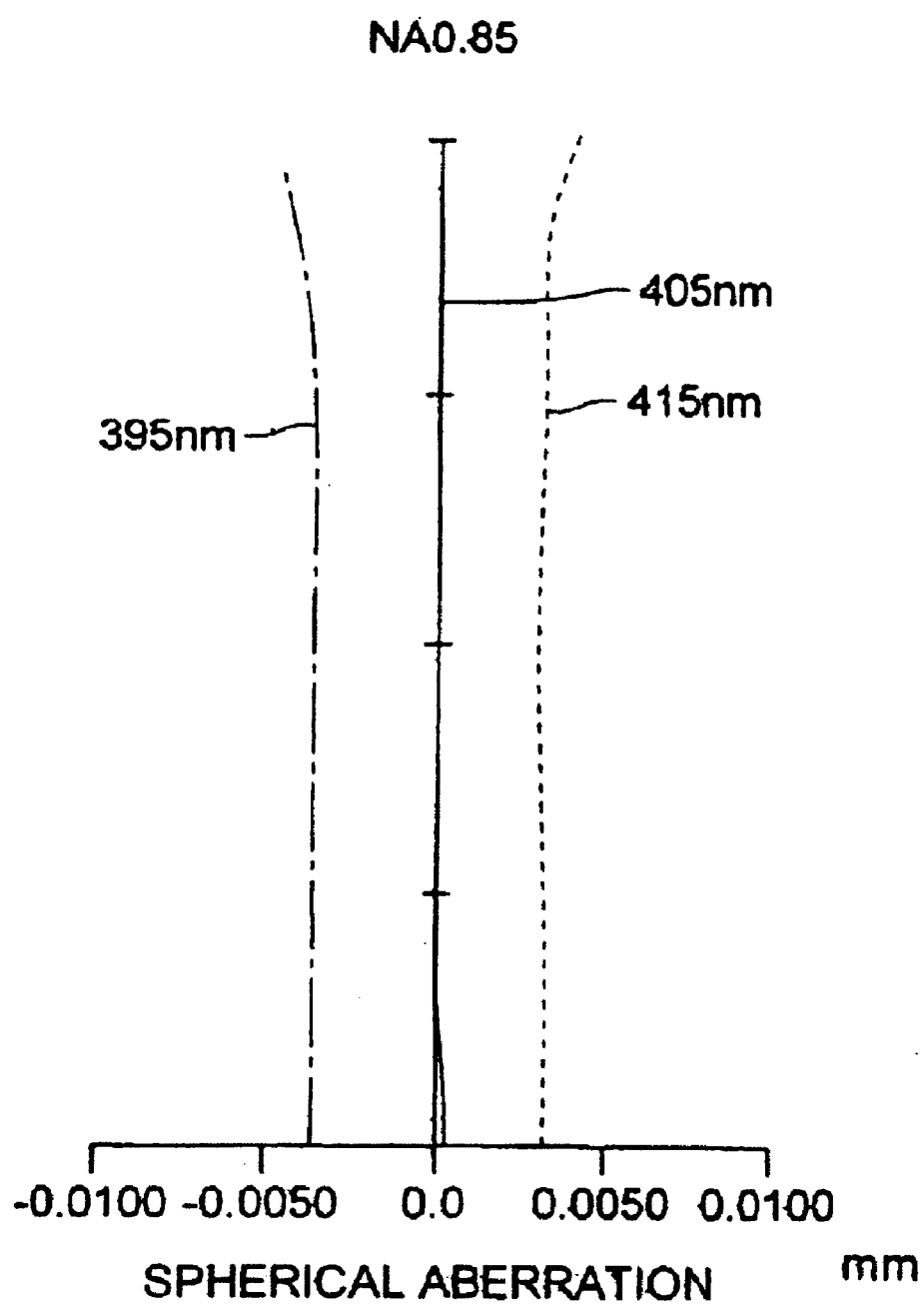
FIG. 13 is a spherical aberration diagram in Example 3.
Figure 14:
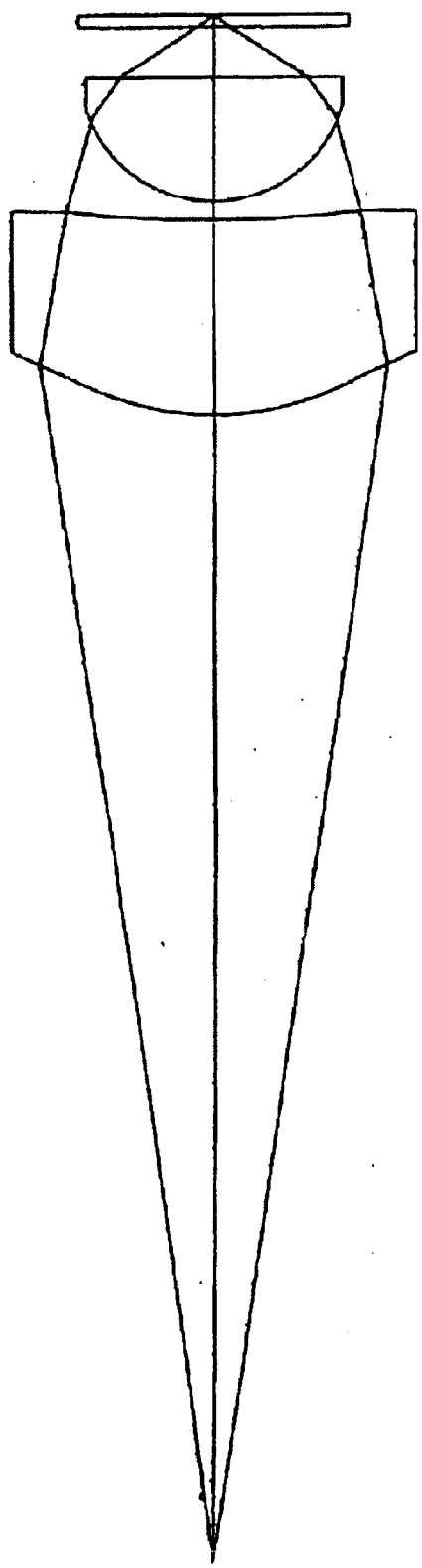
FIG. 14 is an optical path diagram in Example 4.
Figure 15:
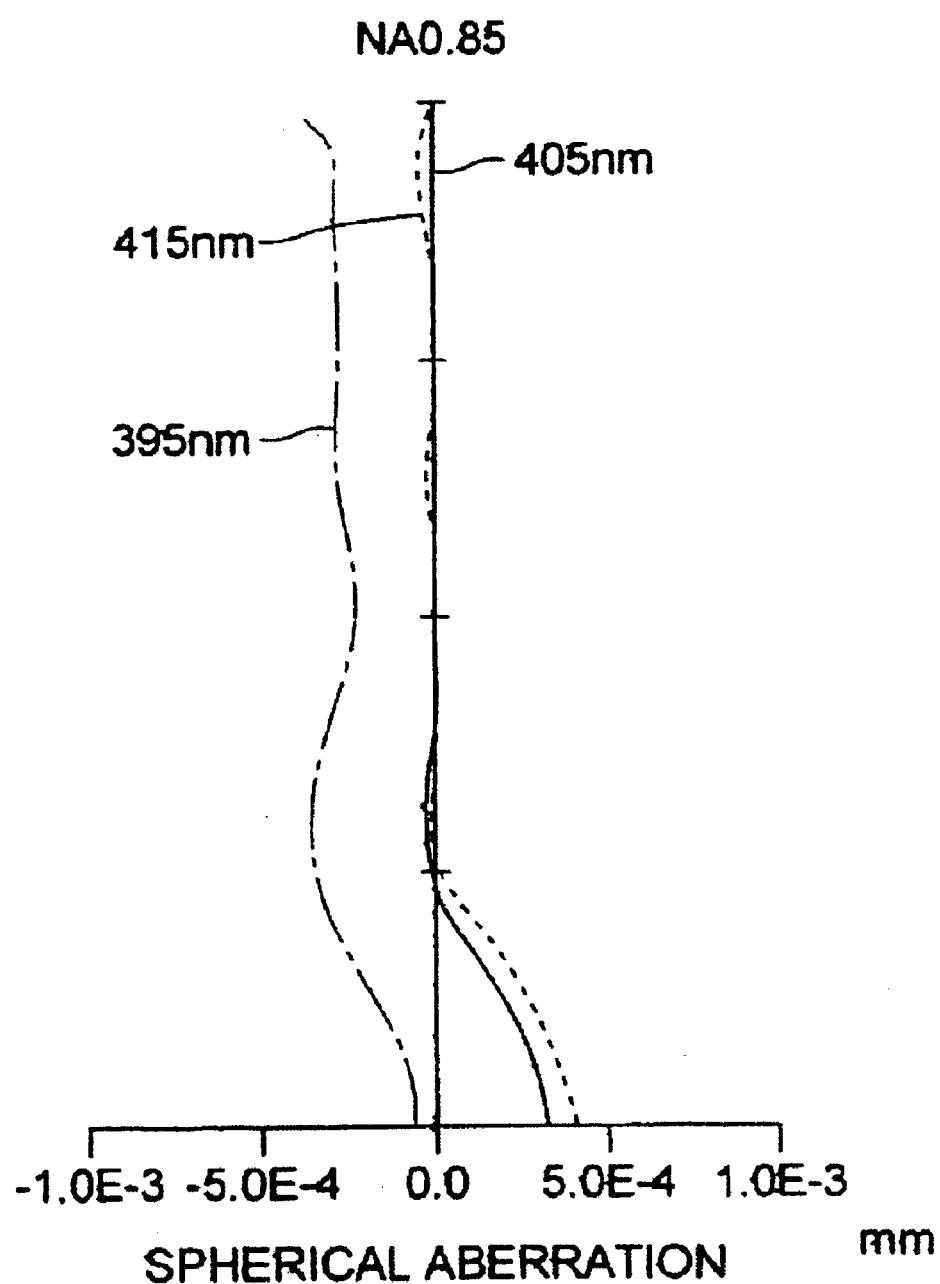
FIG. 15 is a spherical aberration diagram in Example 4.
Figure 16:
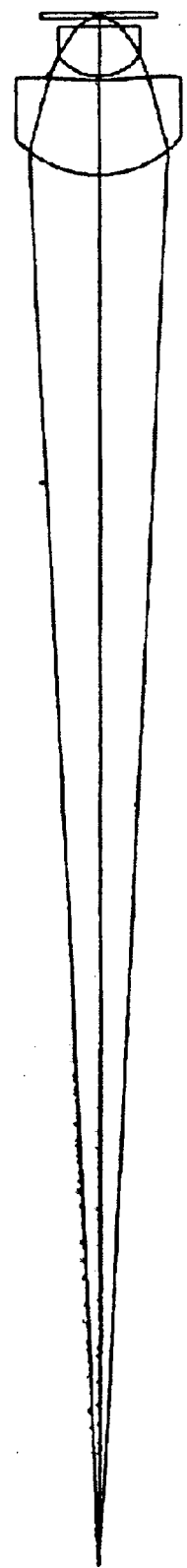
FIG. 16 is an optical path diagram in Example 5.
Figure 17:
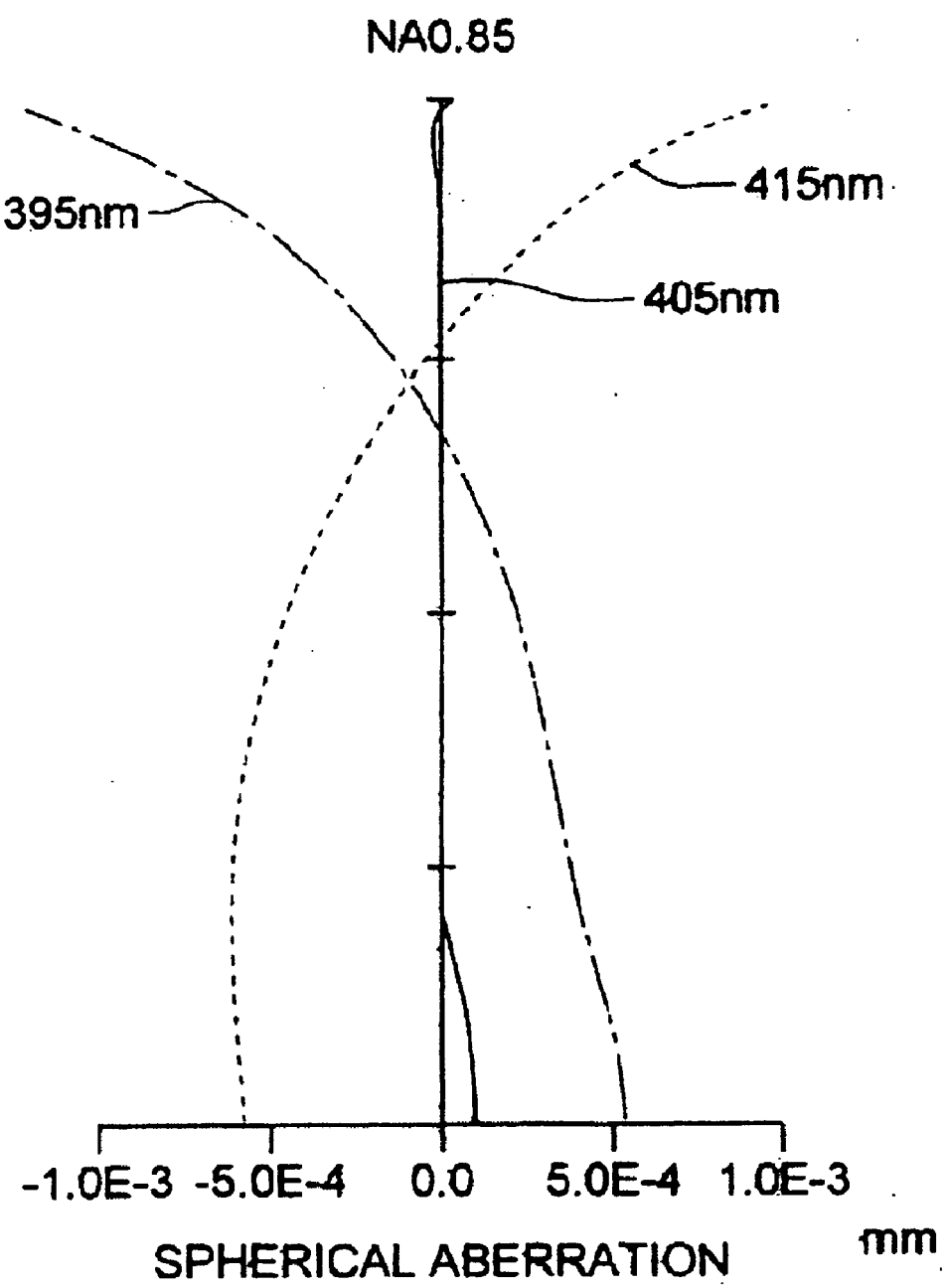
FIG. 17 is a spherical aberration diagram in Example 5.
Figure 18:
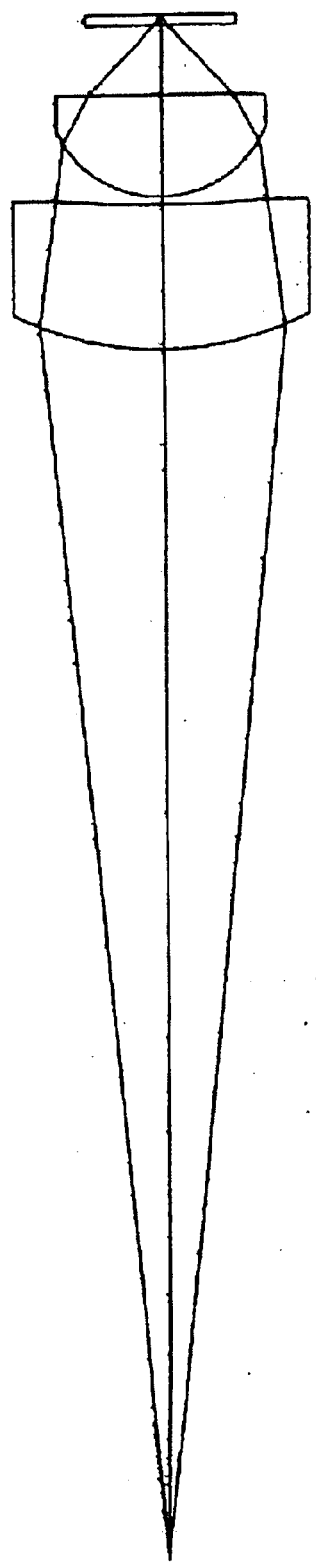
FIG. 18 is an optical path diagram in Example 6.
Figure 19:
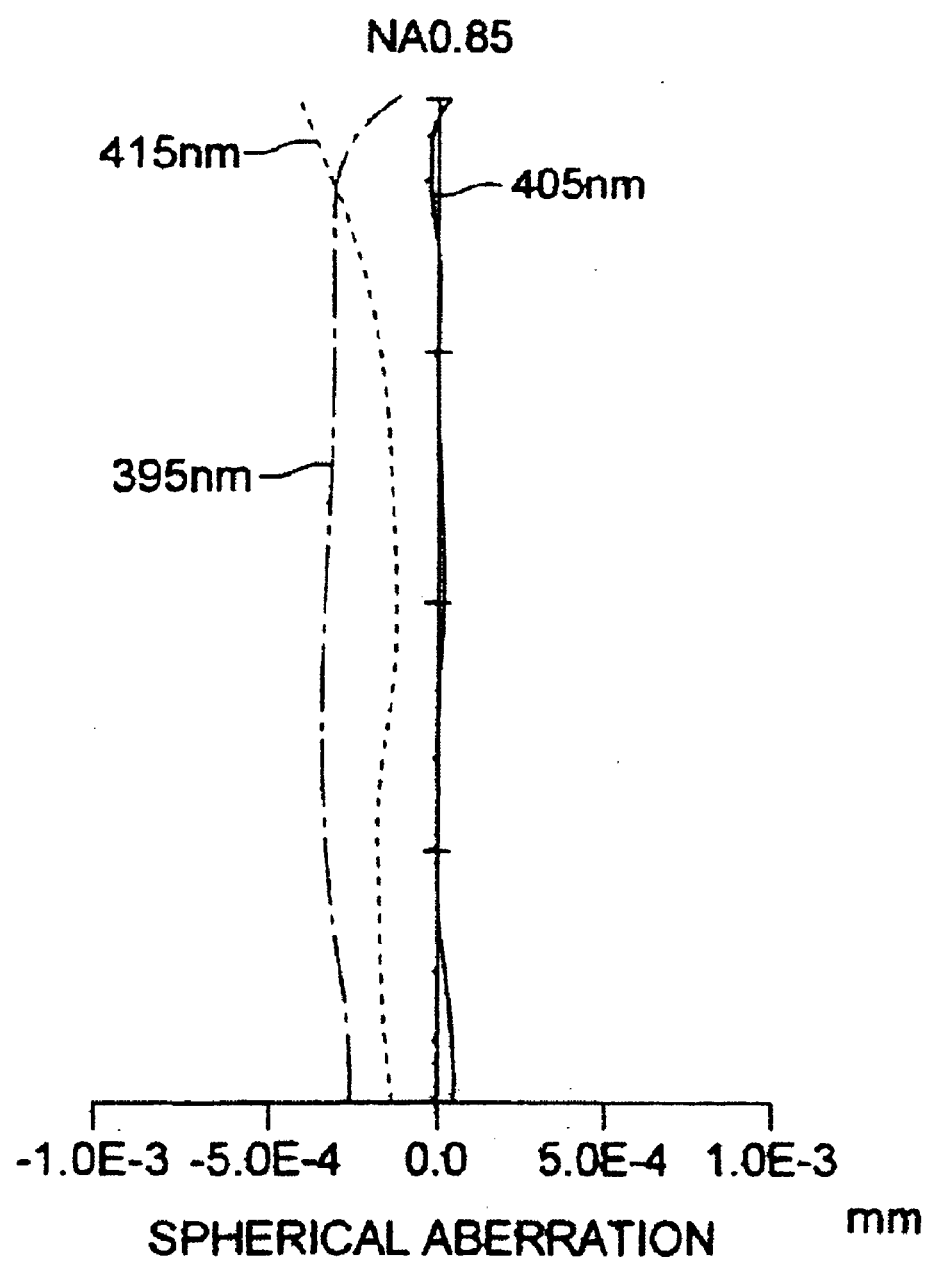
FIG. 19 is a spherical aberration diagram in Example 6.

FIG. 7 is a diagram showing schematically the optical pickup device in the Seventh Example of the invention.

The optical pickup device shown in FIG. 7 is basically of the same structure as in FIG. 1 excepting that an element having changeable refractive index is arranged between an objective lens and an optical information recording medium in place of a refractive index distribution changeable element, and the same portions as those in FIG. 1 are given the same symbols and explanation thereof will be omitted.

In the optical pickup device shown in FIG. 7, there is arranged element 24 whose refractive index is changeable for correcting fluctuations of spherical aberration between the objective lens and the optical information recording medium. As refractive index changeable element 24, an optical element whose refractive index is changed depending on voltage to be impressed, for example, can be used. After fluctuations of spherical aberration are detected by optical detector 13, refractive index of the refractive index changeable element 24 is changed by driving means 25 for the refractive index changeable element 24 so that fluctuations of spherical aberration may become zero. Since the image-side numerical aperture of the objective lens used for the optical pickup device in the present example is as great as 0.65 or more, it is possible to correct greater fluctuations of spherical aberration with a slight change of refractive index, when arranging the refractive index changeable element 24 between the objective lens and the optical information recording medium, and thereby to achieve reduction of driving voltage for the refractive index changeable element 24 and miniaturization of the refractive index changeable element 24. The optical pickup device shown in FIG. 7 makes it possible to obtain the same effect as in FIG. 1.

EXAMPLE

Next, Examples 1–11 of the invention will be explained as follows. Table 1 shows a list of data relating to objective lenses in the Examples 1–11.

TABLE 1

List of Examples

| | Example | | | | | | | | | | | |
|---|---|---|---|---|---|---|---|---|---|---|---|---|
| | 1 | 2 | 3 | 4 | 5 | 6 | 7 | 8 | 9 | 10 (Note 2) | 11 (Note 2) | 11 |
| λ (nm) | 405 | 405 | 405 | 405 | 405 | 405 | 405 | 405 | 405 | 405 | 405 | 405 |
| Image-side numerical aperture | 0.85 | 0.85 | 0.85 | 0.85 | 0.85 | 0.70 | 0.85 | 0.85 | 0.85 | 0.85 | 0.85 | 0.85 |
| Object-side numerical aperture | 0.10 | 0.08 | 0.08 | 0.14 | 0.04 | 0.10 | 0.08 | 0.10 | 0.04 | 0.08 | 0.10 | 0.09 |
| f (mm) | 1.76 | 2.20 | 2.20 | 1.76 | 1.76 | 2.60 | 2.20 | 1.76 | 1.76 | 2.20 | 1.76 | 1.76 |
| First surface effective diameter (mm) (Note 1) | 3.24 | 3.96 | 3.88 | 3.32 | 3.08 | 3.96 | 3.96 | 3.11 | 3.08 | 3.96 | 3.24 | 3.13 |
| WD (mm) | 0.40 | 0.50 | 0.50 | 0.50 | 0.30 | 1.20 | 0.50 | 0.35 | 0.30 | 0.50 | 0.40 | 0.27 |

TABLE 1-continued

List of Examples

| | Example | | | | | | | | | | | |
|---|---|---|---|---|---|---|---|---|---|---|---|---|
| | 1 | 2 | 3 | 4 | 5 | 6 | 7 | 8 | 9 | 10 (Note 2) | 11 (Note 2) | 11 |
| First lens material | Plastic | Plastic | Glass | Plastic | Plastic | Plastic | Plastic | Plastic | Plastic | Plastic | Plastic | Plastic |
| Second lens material | Plastic | Plastic | Glass | Plastic | Plastic | Plastic | Plastic | Glass | Plastic | Plastic | Plastic | Plastic |
| NA · WD/f | 0.19 | 0.19 | 0.19 | 0.24 | 0.14 | 0.32 | 0.19 | 0.17 | 0.14 | 0.19 | 0.19 | 0.13 |
| \|m\| | 0.12 | 0.09 | 0.10 | 0.16 | 0.05 | 0.14 | 0.09 | 0.12 | 0.05 | 0.09 | 0.12 | 0.10 |
| f λ · Σ (ni/(Mi · Pi$^2$)) | 0.38 | — | — | 0.37 | 0.15 | 0.27 | — | 0.33 | 0.32 | — | 0.38 | 0.36 |
| PD/PT | 0.07 | — | — | 0.07 | 0.07 | 0.08 | — | 0.07 | 0.06 | — | 0.07 | 0.17 |
| \|(Ph/Pf) − 2\| | 1.8 | — | — | 1.5 | 0.0 | 0.7 | — | 1.5 | 1.4 | — | 1.8 | 2.9 |
| ΔCA (μm) | −0.1 | 4.3 | 3.4 | 0.1 | −0.7 | −0.2 | 4.3 | −0.2 | −0.2 | 4.3 | −0.1 | −0.3 |
| ΔCA/ΔSA (provided that Δλ = +10 nm) | 1.1 | 0.1 | 0.2 | −1.0 | −0.4 | 0.7 | 0.1 | −0.6 | −2.1 | 0.1 | 1.1 | −0.3 |
| ΔSAG | −0.034 | −0.030 | −0.065 | −0.040 | −0.031 | −0.054 | −0.030 | −0.116 | −0.031 | −0.030 | −0.034 | −0.012 |
| √(f1/f2)/\|m\| | 12.5 | 16.4 | 18.4 | 8.9 | 30.6 | 11.7 | 16.4 | 15.0 | 31.3 | 16.4 | 12.5 | 12.6 |
| (r2 + r1)/(r2 − r1) | 1.3 | 1.1 | 1.4 | 1.1 | 2.0 | 1.4 | 1.1 | 2.3 | 1.9 | 1.1 | 1.3 | 2.3 |
| NA · (X2 − X1)/f | 0.08 | 0.07 | 0.10 | 0.15 | 0.00 | 0.14 | 0.07 | 0.00 | 0.01 | 0.07 | 0.08 | −0.07 |
| Minimum value (μm) of ring-shaped zones in effective diameter (Note 3) | 3.4 | — | — | 3.3 | 6.3 | 4.7 | — | 3.9 | 4.1 | — | 3.4 | 3.9 |

(Note 1)
The surface of the objective lens closest to the light source was assumed to be the first surface.
(Note 2)
Only Examples 9 and 10 have values in the system of only the objective lens.
(Note 3)
In the case of using the first ordered diffracted light A diffracting surface provided on an objective lens in each Example is expressed by optical path difference function Φb expressed by the above-mentioned expression (A). Further, an aspherical surface on an objective lens in each Example is expressed by the following expression (B) wherein x axis represents a direction of an optical axis, and h represents a height in the direction perpendicular to the optical axis.

$$x = (h^2/r)/\{1 + \sqrt{1 - (1+\kappa)(h^2/r^2)}\} + A_4 h^4 + A_6 h^6 + \quad (B)$$

In the expression above, $A_4$, $A_6$, ... represent an aspherical coefficient, κ represents a constant of the cone, r represents a paraxial radius of curvature, and r, d and n represent respectively a radius of curvature, a distance between surfaces and refractive index.

Examples 1–7

Lens data of objective lenses in Examples 1–7 are shown in Tables 2–8. Optical path diagrams concerning Examples 1–7 are shown respectively in FIG. 8, FIG. 10, FIG. 12, FIG. 14, FIG. 16, FIG. 18 and FIG. 20, and spherical aberration diagrams concerning Examples 1–7 are shown respectively in FIG. 9, FIG. 11, FIG. 13, FIG. 15, FIG. 17, FIG. 19 and FIG. 21.

TABLE 2

Example 1

| Surface No. | | r(mm) | d(mm) | Nλ | vd |
|---|---|---|---|---|---|
| 0 | Light source | | 15.8391 | | |
| 1 | Objective Lens | 2.349 | 2.000 | 1.52491 | 56.5 |
| 2 | | 19.283 | 0.100 | | |
| 3 | | 1.030 | 1.300 | 1.52491 | 56.5 |

TABLE 2-continued

Example 1

| | | | | | |
|---|---|---|---|---|---|
| 4 | | ∞ | 0.400 | | |
| 5 | Transparent | ∞ | 0.100 | 1.61949 | 30.0 |
| 6 | base board | ∞ | | | |

| Aspherical coefficient | | |
|---|---|---|
| First surface | κ | −1.5667E−02 |
| | A4 | −3.6984E−03 |
| | A6 | 1.7039E−03 |
| | A8 | −1.7142E−03 |
| | A10 | 1.8060E−04 |
| | A12 | 4.5570E−05 |
| | A14 | −4.8235E−05 |
| | A16 | 4.9762E−06 |
| Second surface | κ | −3.2106E+02 |
| | A4 | 2.7754E−02 |
| | A6 | −3.4469E−03 |
| | A8 | −8.3604E−04 |
| | A10 | −2.3182E−03 |
| | A12 | 7.1632E−04 |
| Third surface | κ | −8.4037E−01 |
| | A4 | 7.5655E−02 |
| | A6 | 1.0791E−02 |
| | A8 | 3.1367E−02 |
| | A10 | −9.2534E−03 |
| Diffractive surface coefficient | | |
| First surface | b2 | −2.0157E−02 |
| | b4 | −8.5533E−04 |
| | b6 | 4.6105E−05 |
| | b8 | −6.0832E−06 |
| | b10 | −5.2809E−05 |

TABLE 3

Example 2

| Surface No. | | r(mm) | d(mm) | Nλ | νd |
|---|---|---|---|---|---|
| 0 | Light source | | 24.268 | | |
| 1 | Objective lens | 2.786 | 2.650 | 1.52491 | 56.5 |
| 2 | | 45.061 | 0.100 | | |
| 3 | | 1.254 | 1.650 | 1.52491 | 56.5 |
| 4 | | ∞ | 0.500 | | |
| 5 | Transparent | ∞ | 0.100 | 1.61949 | 30.0 |
| 6 | base board | ∞ | | | |

Aspherical coefficient

| First surface | κ | −1.4800E−04 |
|---|---|---|
| | A4 | −1.2642E−03 |
| | A6 | 5.5444E−04 |
| | A8 | −3.8059E−04 |
| | A10 | 2.4148E−05 |
| | A12 | 4.8724E−06 |
| | A14 | −1.6683E−06 |
| | A16 | −4.9150E−08 |
| Second surface | κ | −5.9845E+02 |
| | A4 | 1.4445E−02 |
| | A6 | −6.2224E−04 |
| | A8 | −2.6103E−04 |
| | A10 | −4.3621E−04 |
| | A12 | 8.9519E−05 |
| Third surface | κ | −8.2467E−01 |
| | A4 | 4.2113E−02 |
| | A6 | 2.8430E−03 |
| | A8 | 7.7512E−03 |
| | A10 | −1.2357E−03 |

TABLE 4

Example 3

| Surface No. | | r(mm) | d(mm) | Nλ | νd |
|---|---|---|---|---|---|
| 0 | Light source | | 23.008 | | |
| 1 | Objective lens | 2.989 | 2.700 | 1.50718 | 81.6 |
| 2 | | 18.494 | 0.350 | | |
| 3 | | 1.269 | 1.702 | 1.59959 | 59.5 |
| 4 | | ∞ | 0.500 | | |
| 5 | Transparent | ∞ | 0.100 | 1.61949 | 30.0 |
| 6 | base board | ∞ | | | |

Aspherical coefficient

| First surface | κ | −3.7000E−05 |
|---|---|---|
| | A4 | −9.0189E−04 |
| | A6 | 2.1017E−04 |
| | A8 | −3.6928E−04 |
| | A10 | 5.030E−05 |
| | A12 | 5.4278E−06 |
| | A14 | −3.4816E−06 |
| | A16 | 2.3457E−07 |
| Second surface | κ | 0.0000E+00 |
| | A4 | 8.4648E−03 |
| | A6 | −9.8523E−04 |
| | A8 | 1.9797E−04 |
| | A10 | −3.4273E−04 |
| | A12 | 5.5100E−05 |
| Third surface | κ | −8.7218E−01 |
| | A4 | 3.7652E−02 |
| | A6 | 2.5422E−03 |
| | A8 | 6.9480E−03 |
| | A10 | −2.0513E−03 |

TABLE 5

Example 4

| Surface No. | | r(mm) | d(mm) | Nλ | νd |
|---|---|---|---|---|---|
| 0 | Light source | | 11.589 | | |
| 1 | Objective lens | 2.520 | 2.000 | 1.52491 | 56.5 |
| 2 | | 83.574 | 0.120 | | |
| 3 | | 1.0515 | 1.300 | 1.52491 | 56.5 |
| 4 | | ∞ | 0.500 | | |
| 5 | Transparent | ∞ | 0.100 | 1.61949 | 30.0 |
| 6 | base board | ∞ | | | |

Aspherical coefficient

| First surface | κ | −3.7059E−02 |
|---|---|---|
| | A4 | −3.9311E−03 |
| | A6 | 1.4973E−03 |
| | A8 | −1.6751E−03 |
| | A10 | 2.6060E−04 |
| | A12 | 5.3668E−05 |
| | A14 | −5.3027E−05 |
| | A16 | 6.3700E−06 |
| Second surface | κ | 0.0000E+00 |
| | A4 | 1.7099E−02 |
| | A6 | −2.6805E−03 |
| | A8 | 1.0966E−03 |
| | A10 | −1.8559E−03 |
| | A12 | 4.0100E−04 |
| Third surface | κ | −8.9254E−01 |
| | A4 | 7.2931E−02 |
| | A6 | 5.5725E−03 |
| | A8 | 2.8662E−02 |
| | A10 | −8.7671E−03 |

Diffractive surface coefficient

| First surface | b2 | −2.1000E−02 |
|---|---|---|
| | b4 | 1.1817E−03 |
| | b6 | 1.2229E−04 |
| | b8 | 1.4982E−05 |
| | b10 | −5.0998E−05 |

TABLE 6

Example 5

| Surface No. | | r(mm) | d(mm) | Nλ | νd |
|---|---|---|---|---|---|
| 0 | Light source | | 34.474 | | |
| 1 | Objective lens | 2.198 | 2.250 | 1.52491 | 56.5 |
| 2 | | 6.720 | 0.100 | | |
| 3 | | 0.890 | 1.100 | 1.52491 | 56.5 |
| 4 | | ∞ | 0.300 | | |
| 5 | Transparent | ∞ | 0.100 | 1.61949 | 30.0 |
| 6 | base board | ∞ | | | |

Aspherical coefficient

| First surface | κ | 8.9000E−02 |
|---|---|---|
| | A4 | −4.6001E−03 |
| | A6 | 4.1896E−04 |
| | A8 | −1.6469E−03 |
| | A10 | 2.7538E−04 |
| | A12 | 5.6064E−05 |
| | A14 | −5.2587E−05 |
| | A16 | 4.0517E−06 |
| Second surface | κ | −4.6352E+01 |
| | A4 | 3.3839E−02 |
| | A6 | −6.8521E−03 |
| | A8 | −4.1543E−03 |
| | A10 | −3.3475E−03 |
| | A12 | 1.9621E−03 |
| Third surface | κ | −7.2180E−01 |
| | A4 | 9.9218E−02 |
| | A6 | 1.9692E−02 |

TABLE 6-continued

Example 5

| | | |
|---|---|---|
| | A8 | 1.2231E−01 |
| | A10 | −6.6312E−02 |
| Diffractive surface coefficient | | |
| First surface | b2 | −2.1000E−02 |

TABLE 7

Example 6

| Surface No. | | r(mm) | d(mm) | Nλ | vd |
|---|---|---|---|---|---|
| 0 | Light source | | 20.186 | | |
| 1 | Objective lens | 4.647 | 2.400 | 1.52491 | 56.5 |
| 2 | | 28.422 | 0.150 | | |
| 3 | | 1.555 | 1.600 | 1.52491 | 56.5 |
| 4 | | ∞ | 1.200 | | |
| 5 | Transparent | ∞ | 0.100 | 1.61949 | 30.0 |
| 6 | base board | ∞ | | | |

Aspherical coefficient

| | | |
|---|---|---|
| First surface | κ | 3.5726E−01 |
| | A4 | −2.2069E−05 |
| | A6 | −1.7879E−04 |
| | A8 | −1.2455E−04 |
| | A10 | 7.0347E−06 |
| | A12 | 2.8199E−06 |
| | A14 | −8.9861E−07 |
| | A16 | 9.5058E−08 |
| Second surface | κ | −2.9356E+02 |
| | A4 | 5.8017E−03 |
| | A6 | −8.6181E−04 |
| | A8 | 7.9231E−06 |
| | A10 | −4.8810E−05 |
| | A12 | 1.1295E−05 |
| Third surface | κ | −8.2895E−01 |
| | A4 | 1.6265E−02 |
| | A6 | 1.1728E−03 |
| | A8 | 6.6030E−04 |
| | A10 | −7.7737E−05 |

Diffractive surface coefficient

| | | |
|---|---|---|
| First surface | b2 | −1.6000E−02 |
| | b4 | −1.7778E−04 |
| | b6 | −1.0019E−04 |

TABLE 8

Example 7

| Surface No. | | r(mm) | d(mm) | Nλ | vd |
|---|---|---|---|---|---|
| 0 | Light source | | 24.268 | | |
| 1 | Objective lens | 2.786 | 2.650 | 1.52491 | 56.5 |
| 2 | | 45.061 | 0.100 | | |
| 3 | | 1.254 | 1.650 | 1.52491 | 56.5 |
| 4 | | ∞ | 0.500 | | |
| 5 | Transparent | ∞ | 0.100 | 1.61949 | 30.0 |
| 6 | base board | ∞ | | | |

Aspherical coefficient $0 \leq h \leq 1.98$ (provided that h represents height of lens surface from optical axis)

| | | |
|---|---|---|
| First surface (1) | κ | −1.4800E−04 |
| | A4 | −1.2642E−03 |
| | A6 | 5.5444E−04 |
| | A8 | −3.8059E−04 |

TABLE 8-continued

Example 7

| | | |
|---|---|---|
| | A10 | 2.4148E−05 |
| | A12 | 4.8724E−06 |
| | A14 | −1.6683E−06 |
| | A16 | −4.9150E−08 |

$h > 1.98$ (provided that h represents height of lens surface from optical axis)

| | | |
|---|---|---|
| First surface (1') | κ | −1.4800E−04 |
| | A4 | 1.0000E−03 |
| | A6 | 5.0000E−04 |
| | A8 | −5.0000E−04 |
| | A10 | 5.0000E−05 |
| | A12 | 2.0000E−06 |
| | A14 | 0.0000E+00 |
| | A16 | 0.0000E+00 |
| Second surface | κ | −5.9845E+02 |
| | A4 | 1.4445E−02 |
| | A6 | −6.2224E−04 |
| | A8 | −2.6103E−04 |
| | A10 | −4.3621E−04 |
| | A12 | 8.9519E−05 |
| Third surface | κ | −8.2467E−01 |
| | A4 | 4.2113E−02 |
| | A6 | 2.8430E−03 |
| | A8 | 7.7512E−02 |
| | A10 | −1.2357E−03 |

In the Examples 1–7 stated above, the two-group and two-element objective lens having image-side numerical aperture of 0.7 or more and used wavelength of 405 nm is made to be of a finite conjugated type, and thereby, its working distance is secured to be as great as 0.30 mm or more.

Each objective lens of Examples 1, 2, 4, 5, 6 and 7 can be manufactured at low cost on a mass production basis, because both of the first group and the second group are made of optical plastic material. Among them, in objective lenses of Examples 1, 4, 5 and 6, longitudinal chromatic aberration generated on the objective lens was corrected by making the surface of the first lens closer to the light source to be the diffracting surface.

In particular, in the objective lens in Example 5, longitudinal chromatic aberration was over-corrected and the above expression (14) was satisfied, and thereby, it was possible to make the minimum value of the distance between diffractive ring-shaped zones to be greater than those of objective lenses in Examples 1, 4 and 6 in which longitudinal chromatic aberration and spherical aberration of a color are corrected, in spite of the objective lens having less deterioration of wavefront aberration in the case of mode hop phenomenon. Incidentally, amount of change ΔCA of longitudinal chromatic aberration in expression (14) is indicated by the movement width of a bottom end of the spherical aberration curve of 405 nm and 415 nm in a spherical aberration diagram for the objective lens in Example 5, when a wavelength of the light source is shifted by 10 nm toward the longer wavelength side, while, the direction of the movement is a direction wherein a back focus becomes shorter, with a wavelength of the light source which is shifted toward the longer wavelength side. Further, amount of change ΔSA of spherical aberration of a marginal ray of light is indicated by a width between a top end of a spherical aberration curve in the case where the spherical aberration curve of 405 nm is moved in parallel to the position at which its bottom end overlaps with a bottom end of a spherical aberration curve of 415 nm and a top end of the spherical aberration curve of 415 nm.

In each objective lens in Examples 1, 2, 5, 6 and 7, it was possible to control deterioration of wavefront aberration caused by temperature changes to be small, by making an amount of generation of third order spherical aberration caused by temperature changes and an amount of generation of high order spherical aberration of $5^{th}$ order or higher generated in the direction opposite to that of the third order spherical aberration to be balanced, even for the objective lens with high NA made of optical plastic material having larger refractive index change compared with optical glass materials.

Figure 20A:
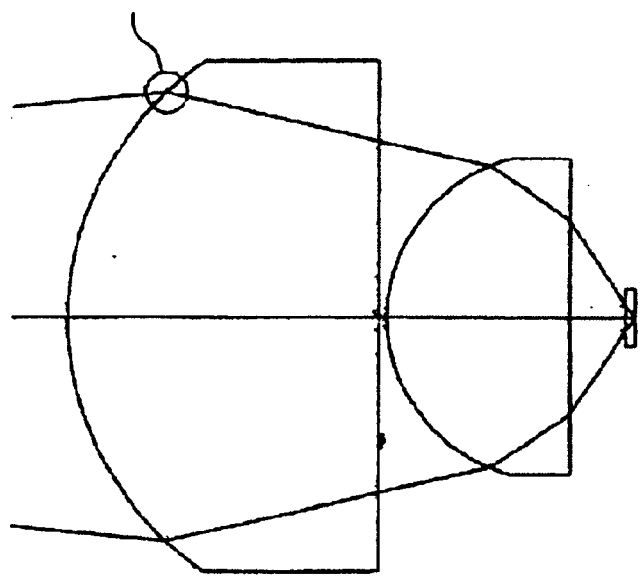
FIG. 20(a) is an optical path diagram in Example 7.
Figure 20B:
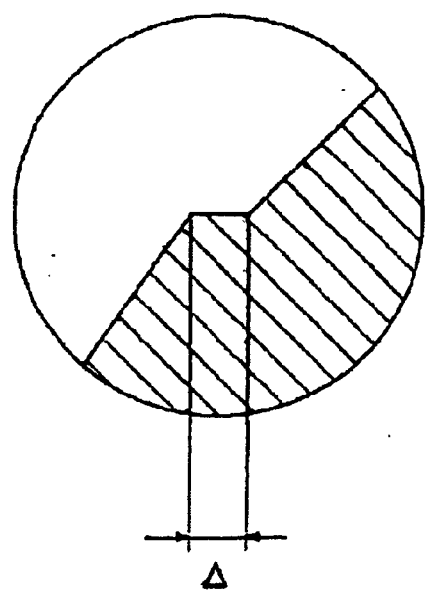
FIG. 20(b) is an enlarged view of section A in FIG. 20(a).
Figure 21:
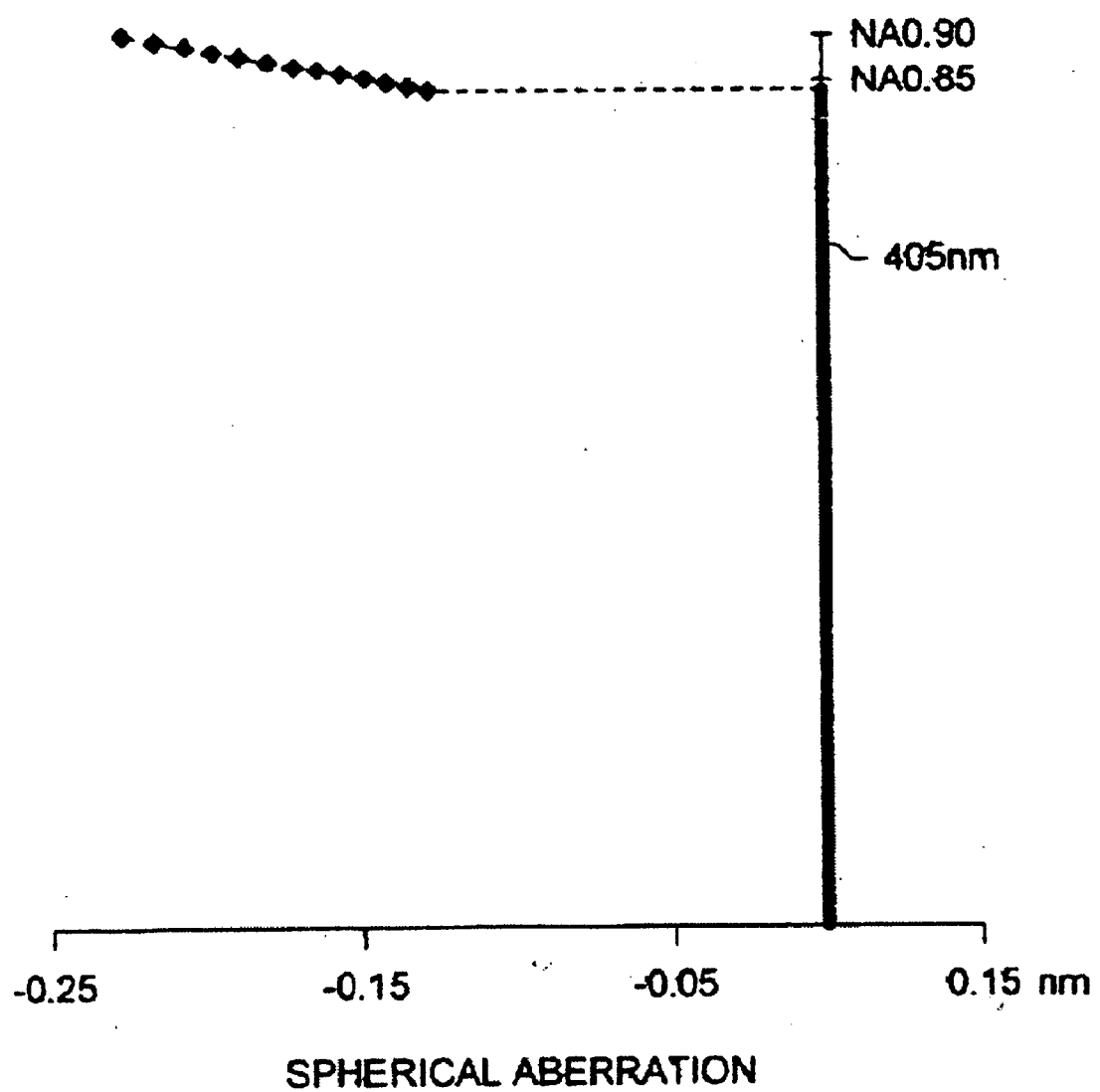
FIG. 21 is a spherical aberration diagram in Example 7.
Figure 22:
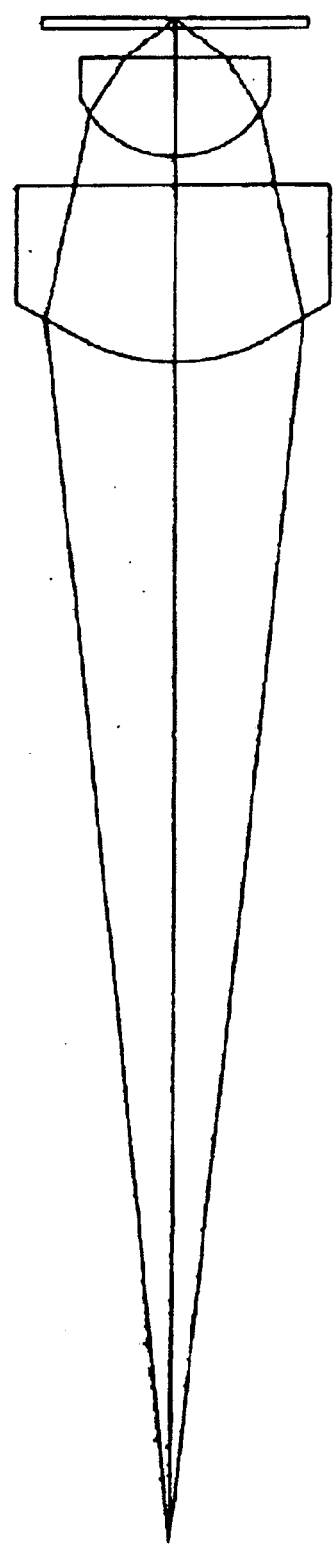
FIG. 22 is an optical path diagram in Example 8.
Figure 23:
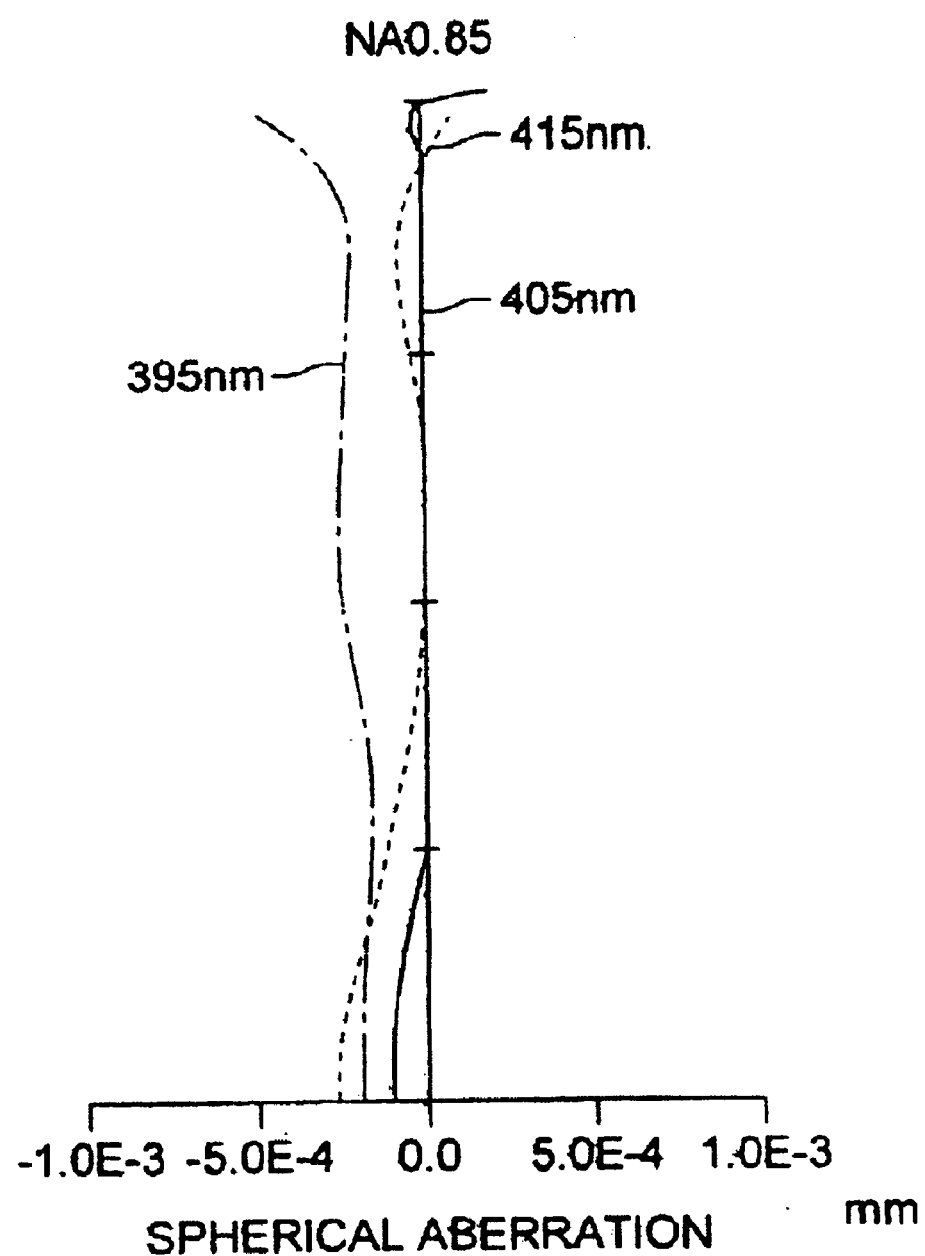
FIG. 23 is a spherical aberration diagram in Example 8.
Figure 24:
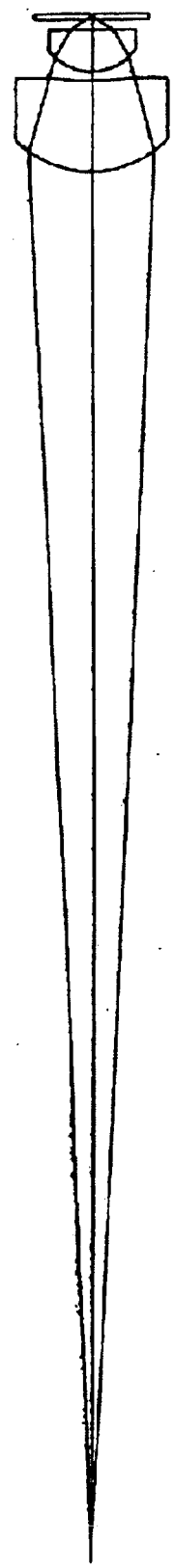
FIG. 24 is an optical path diagram in Example 9.
Figure 25:
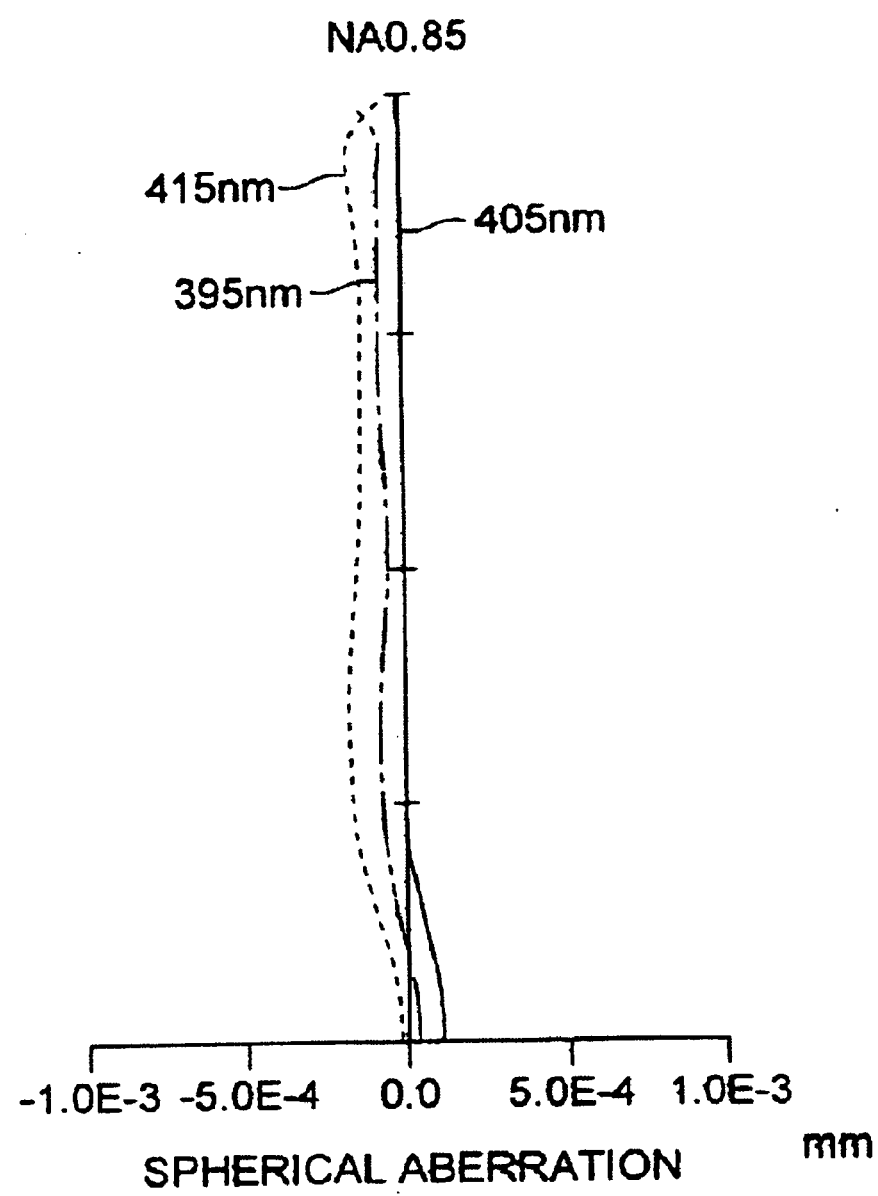
FIG. 25 is a spherical aberration diagram in Example 9.
Figure 26:
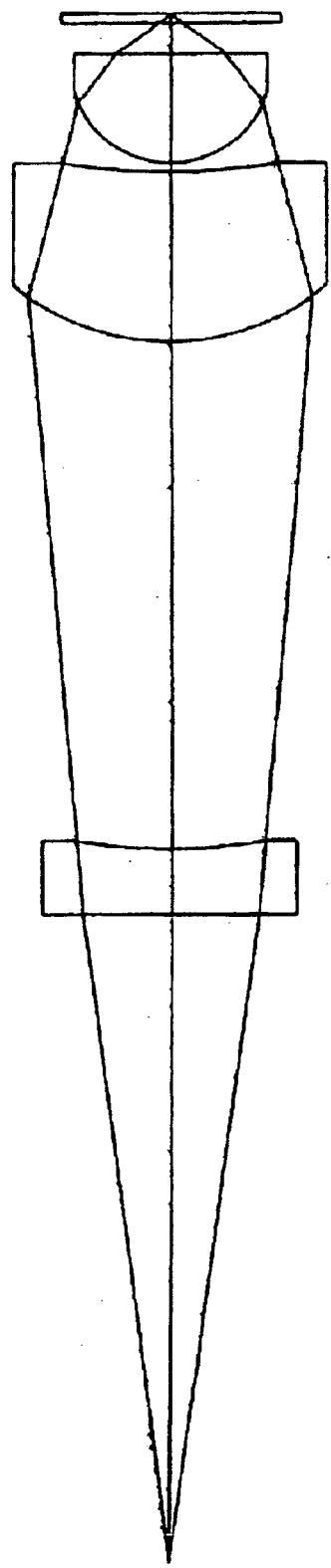
FIG. 26 is an optical path diagram in Example 10.
Figure 27:
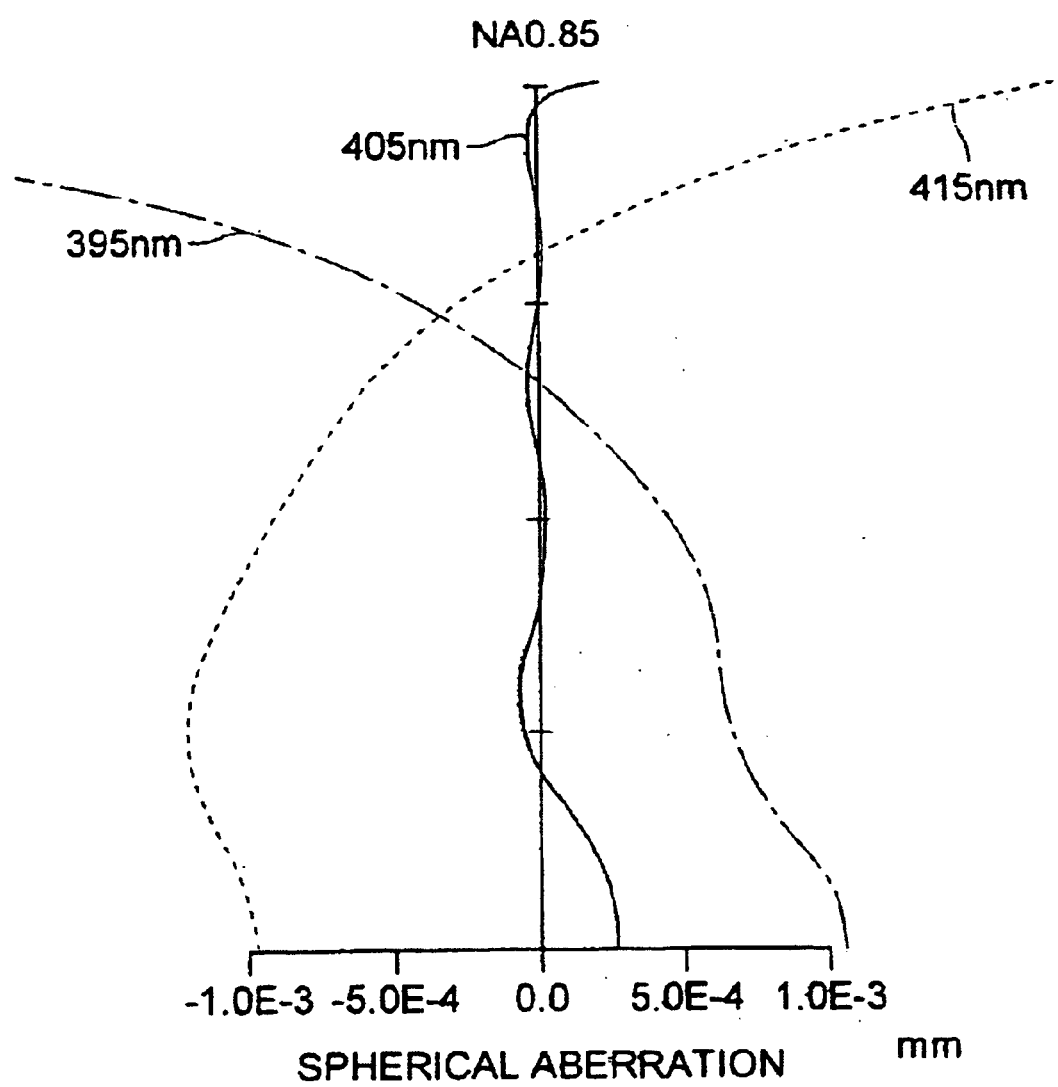
FIG. 27 is a spherical aberration diagram in Example 10.
Figure 28:
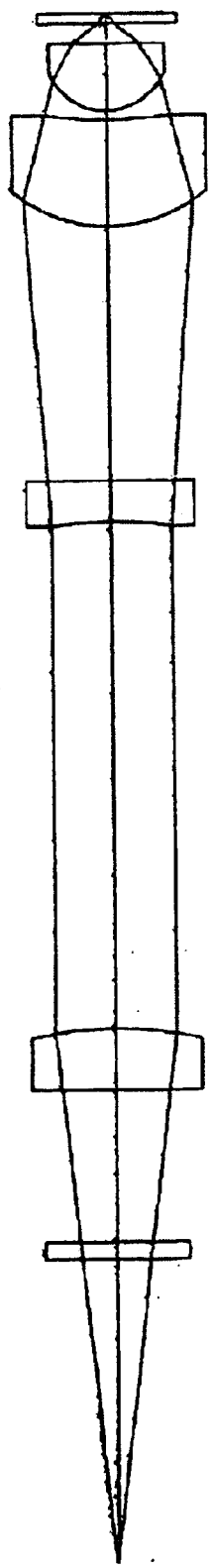
FIG. 28 is an optical path diagram in Example 11.
Figure 29:
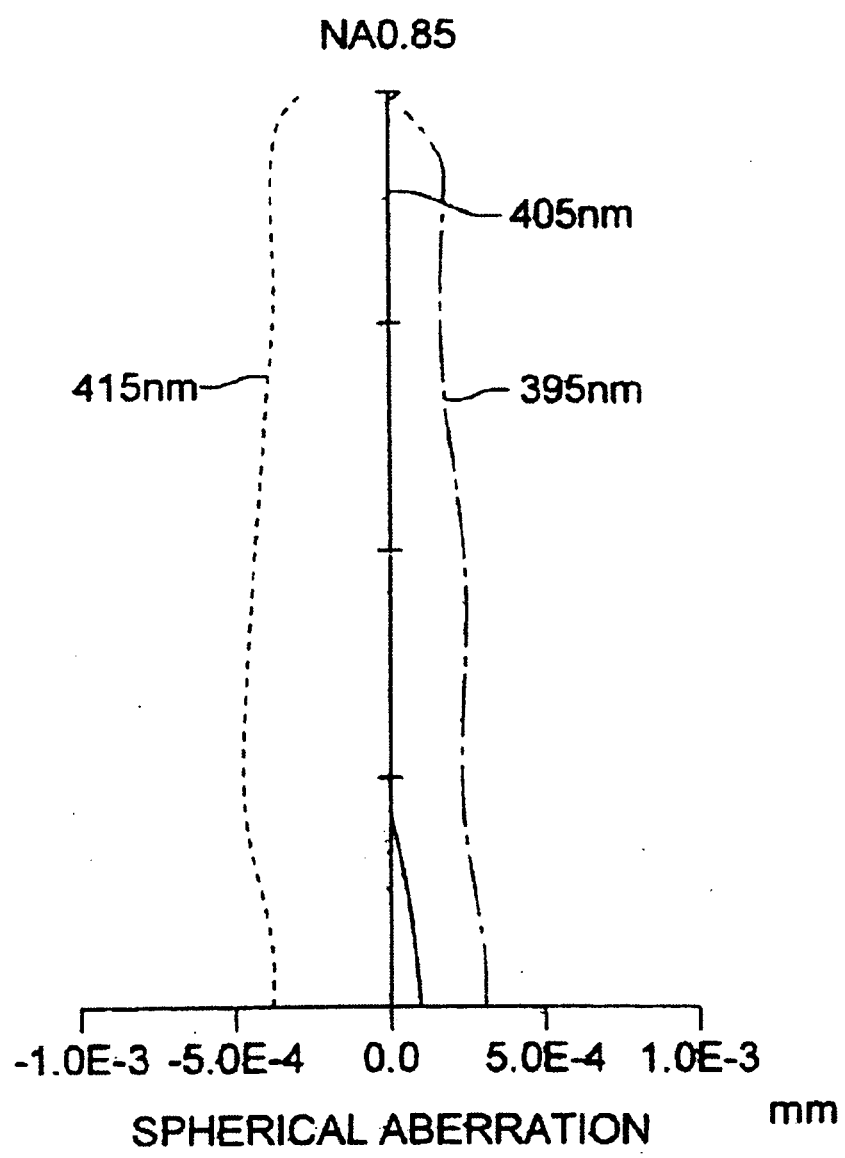
FIG. 29 is a spherical aberration diagram in Example 11.

In the objective lens of Example 7, a step shown in FIG. 20(b) was formed at the position (position A in FIG. 20(a)) corresponding to image-side numerical aperture 0.85 on a refracting interface of the first lens on the light source side. In the case of h representing a height from an optical axis, when f (h) represents a function indicating a shape of the surface closer to the optical axis than the step, and g (h) represents a shape of the surface that is outside the step, a light flux passing through the surface that is outside the step is made to be converged on the point which is different from the point on which a light flux passing through the surface closer to the optical axis is converged, by determining a form of g (h) so that differential function f' (h) and g' (h) may satisfy f' (h)≠g' (h).

In the objective lens of Example 3, both the first lens and the second lens were made of optical glass material. By forming the second lens whose radius of curvature tends to be small with optical glass material (SK12) having refractive index of 1.55 or more at d line, an angle formed between a tangent surface of the surface on the light source side and a plane perpendicular to an optical axis was made not to become too large, which makes it possible to machine a metal mold with a diamond tool more accurately. Further, generation of longitudinal chromatic aberration was controlled by forming the first lens with optical glass material (FK01) whose Abbe number at d line is 65 or more.

Examples 8–11

Lens data of objective lenses in Examples 8–11 are shown in Tables 9–12. Optical path diagrams concerning Examples 8–11 are shown respectively in FIG. 22, FIG. 24, FIG. 26 and FIG. 28, and spherical aberration diagrams concerning Examples 8–11 are shown respectively in FIG. 23, FIG. 25, FIG. 27 and FIG. 29.

TABLE 9

Example 8

| Surface No. | | r(mm) | d(mm) | Nλ | vd |
|---|---|---|---|---|---|
| 0 | Light source | | d0 (Variable) | | |
| 1 | Objective lens | 2.226 | 2.000 | 1.52491 | 56.5 |
| 2 | | 5.616 | d2 (Variable) | | |
| 3 | | 1.082 | 1.250 | 1.71548 | 53.3 |
| 4 | | ∞ | 0.350 | | |
| 5 | Transparent base board | ∞ | 0.100 | 1.61949 | 30.0 |
| 6 | | ∞ | | | |

Aspherical coefficient

| First surface | κ | 9.1671E−02 |
|---|---|---|
| | A4 | 3.6046E−04 |
| | A6 | −3.3393E−03 |
| | A8 | −1.1195E−03 |
| | A10 | 2.1300E−04 |
| | A12 | −3.1780E−05 |
| | A14 | −2.3777E−05 |

TABLE 9-continued

Example 8

| | A16 | 2.2428E−06 |
|---|---|---|
| Second surface | κ | 1.3514E+01 |
| | A4 | 2.2835E−02 |
| | A6 | −1.3347E−02 |
| | A8 | −3.9662E−03 |
| | A10 | 1.3557E−03 |
| | A12 | 7.1233E−04 |
| Third surface | κ | −9.8208E−01 |
| | A4 | 7.1701E−02 |
| | A6 | 8.4351E−03 |
| | A8 | 8.3402E−03 |
| | A10 | −1.0952E−02 |

Diffractive surface coefficient

| First surface | b2 | −2.0000E−02 |
|---|---|---|
| | b4 | 6.7379E−04 |
| | b6 | −9.3312E−04 |

TABLE 10

Example 9

| Surface No. | | r(mm) | d(mm) | Nλ | vd |
|---|---|---|---|---|---|
| 0 | Light source | | d0 (Variable) | | |
| 1 | Objective lens | 2.153 | 2.250 | 1.52492 | 56.5 |
| 2 | | 6.839 | 0.100 | | |
| 3 | | 0.891 | 1.100 | 1.52491 | 56.5 |
| 4 | | ∞ | 0.301 | | |
| 5 | Transparent base board | ∞ | 0.100 | 1.61949 | 30.0 |
| 6 | | ∞ | | | |

Aspherical coefficient

| First surface | κ | −8.8839E−02 |
|---|---|---|
| | A4 | −5.0934E−03 |
| | A6 | 1.0934E−03 |
| | A8 | −1.6999E−03 |
| | A10 | 1.8722E−04 |
| | A12 | 4.0500E−05 |
| | A14 | −4.7141E−05 |
| | A16 | 2.99525-06 |
| Second surface | κ | −5.45605+01 |
| | A4 | 3.6726E−02 |
| | A6 | −4.9947E−03 |
| | A8 | −5.9365E−03 |
| | A10 | −4.5267E−03 |
| | A12 | 2.5116E−03 |
| Third surface | κ | −7.1847E−01 |
| | A4 | 9.9717E−02 |
| | A6 | 1.7865E−02 |
| | A8 | 1.2109E−01 |
| | A10 | −6.5251E−02 |

Diffractive surface coefficient

| First surface | b2 | −1.8000E−02 |
|---|---|---|
| | b4 | −1.0364E−03 |
| | b6 | 2.1743E−05 |
| | b8 | −2.6100E−05 |
| | b10 | −5.2376E−05 |

TABLE 11

Example 10

| Surface No. | | r(mm) | d(mm) | Nλ | vd |
|---|---|---|---|---|---|
| 0 | Light source | | d0 (Variable) | | |

TABLE 11-continued

Example 10

| | | | | | |
|---|---|---|---|---|---|
| 1 | Spherical | ∞ | 1.000 | 1.52491 | 56.5 |
| 2 | aberration correcting means | 9.087 | d2 (Variable) | | |
| 3 | Objective lens | 2.786 | 2.650 | 1.52491 | 56.5 |
| 4 | | 45.061 | 0.100 | | |
| 5 | | 1.254 | 1.650 | 1.52491 | 56.5 |
| 6 | | ∞ | 0.500 | | |
| 7 | Transparent base board | ∞ | 0.100 | 1.61949 | 30.0 |
| 8 | | ∞ | | | |

Aspherical coefficient

| | | |
|---|---|---|
| Second surface | κ | 1.2336E−01 |
| | A4 | −1.4808E−04 |
| | A6 | −2.1572E−05 |
| | A8 | 1.3154E−05 |
| Third surface | κ | −1.4800E−04 |
| | A4 | −1.2642E−03 |
| | A6 | 5.5444E−04 |
| | A8 | −3.8059E−04 |
| | A10 | 2.4148E−05 |
| | A12 | 4.8724E−06 |
| | A14 | −1.6683E−06 |
| | A16 | −4.9150E−08 |
| Fourth surface | κ | −5.9845E+02 |
| | A4 | 1.4445E−02 |
| | A6 | −6.2224E−04 |
| | A8 | −2.6103E−04 |
| | A10 | −4.3621E−04 |
| | A12 | 8.9519E−05 |
| Fifth surface | κ | −8.2467E−01 |
| | A4 | 4.2113E−02 |
| | A6 | 2.8430E−03 |
| | A8 | 7.7512E−03 |
| | A10 | −1.2357E−03 |

Diffractive surface coefficient

| | | |
|---|---|---|
| First surface | b2 | −2.4000E−02 |
| Second surface | b2 | −2.3287E−02 |

TABLE 12

Example 11

| Surface No. | | r (mm) | d (mm) | Nλ | vd |
|---|---|---|---|---|---|
| 0 | Light source | | 6.050 | | |
| 1 | Transparent base board | ∞ | 0.250 | 1.61950 | 64.2 |
| 2 | | ∞ | 3.000 | | |
| 3 | Collimator lens | ∞ | 1.200 | 1.52491 | 56.5 |
| 4 | | −5.832 | d4 (Variable) | | |
| 5 | Spherical aberration correcting means | −5.414 | 0.800 | 1.52491 | 56.5 |
| 6 | | ∞ | d6 (Variable) | | |
| 7 | Objective lens | 2.349 | 2.000 | 1.52491 | 56.5 |
| 8 | | 19.283 | 0.100 | | |
| 9 | | 1.030 | 1.300 | 1.52491 | 56.5 |
| 10 | | ∞ | 0.400 | | |
| 11 | Transparent base board | ∞ | 0.100 | 1.61949 | 30.0 |
| 12 | | ∞ | | | |

Aspherical coefficient

| | | |
|---|---|---|
| Fourth surface | κ | −9.6468E−01 |
| | A4 | −1.3857E−04 |
| | A6 | −2.5732E−05 |
| Fifth | κ | −2.9737E−01 |

TABLE 12-continued

Example 11

| | | |
|---|---|---|
| surface | A4 | 2.5474E−04 |
| | A6 | −1.0204E−05 |
| Seventh surface | κ | −1.5667E−02 |
| | A4 | −3.6984E−03 |
| | A6 | 1.7039E−03 |
| | A8 | −1.7142E−03 |
| | A10 | 1.8060E−04 |
| | A12 | 4.5570E−05 |
| | A14 | −4.8235E−05 |
| | A16 | 4.9762E−06 |
| Eighth surface | κ | −3.2106E+02 |
| | A4 | 2.7754E−02 |
| | A6 | −3.4469E−03 |
| | A8 | −8.3604E−04 |
| | A10 | −2.3182E−03 |
| | A12 | 7.1632E−04 |
| Ninth surface | κ | −8.4037E−01 |
| | A4 | 7.8655E−02 |
| | A6 | 1.0791E−02 |
| | A8 | 3.1367E−02 |
| | A10 | −9.2534E−03 |

Diffractive surface coefficient

| | | |
|---|---|---|
| Fourth surface | b2 | −5.0000E−03 |
| | b4 | −7.7926E−05 |
| | b6 | 1.2856E−05 |
| Seventh surface | b2 | −2.0157E−02 |
| | b4 | −5.5533E−04 |
| | b6 | 4.6105E−05 |
| | b8 | −6.0832E−06 |
| | b10 | −5.2809E−05 |

Each of Examples 8–11 is a light-converging optical system having a two-group objective lens of a finite conjugated type and a means to correct fluctuations of spherical aberration, in which wavelength to be used is 405 nm and image-side numerical aperture of the objective lens is 0.85.

In the light-converging optical system of Example 8, fluctuations of spherical aberration were corrected by moving the first lens of the objective lens in the direction of an optical axis, as shown in FIG. 3. Since the first lens was made of light optical plastic material, reduction of the load on an actuator and quick response to fluctuation of spherical aberration are possible. Further, longitudinal chromatic aberration was corrected by making the surface on the light source side to be a diffracting surface. In addition, an angle formed between a tangent surface of the surface on the light source side and a plane perpendicular to an optical axis was made not to be too large, by forming the second lens with optical glass material (LaK13) whose refractive index at d line is 1.55 or more.

Table 13 shows results of the correction of wavefront aberration caused by fluctuations of wavelength of the light source, temperature changes and by thickness errors of the transparent base board in Example 8, and the correction is satisfactory in any case.

TABLE 13

Example 8

| Causes of spherical aberration fluctuations | Wavefront aberration (before correction) | Wavefront aberration (after correction) | d0 (variable) | d2 (variable) |
|---|---|---|---|---|
| Standard state (λ = 405 nm, T = 25° C., t = 0.1 mm) | 0.001λ | 0.001λ | 15.000 | 0.500 |

TABLE 13-continued

Example 8

| Causes of spherical aberration fluctuations | | Wavefront aberration (before correction) | Wavefront aberration (after correction) | d0 (variable) | d2 (variable) |
|---|---|---|---|---|---|
| Fluctuations in wavelength of the light source | Δλ = +10 nm | 0.003λ | 0.003λ | 15.000 | 0.500 |
| | Δλ = −10 nm | 0.003λ | 0.003λ | 15.000 | 0.500 |
| | | 0.006λ | 0.006λ | | |
| Temperature changes | ΔT = +30° C. | 0.071λ | 0.003λ | 14.927 | 0.576 |
| | ΔT = −30° C. | 0.073λ | 0.002λ | 15.069 | 0.431 |
| Thickness errors of transparent base board | Δt = +0.02 mm | 0.206λ | 0.006λ | 15.228 | 0.272 |
| | Δt = −0.02 mm | 0.205λ | 0.004λ | 14.808 | 0.692 |

(Note 1)
(Amount of change in refractive index of lens material caused by temperature change) ΔN = −1.2 E−4/° C.
(Note 2)
(Amount of change in oscillation wavelength of light source caused by temperature change) Δλ = +0.05 nm/° C.

In the light-converging optical system of Example 9, fluctuations of spherical aberration were corrected by moving the first lens of the objective lens in the direction of an optical axis, as shown in FIG. 4. Further, longitudinal chromatic aberration was corrected by making the surface on the light source side to be a diffracting surface.

Table 14 shows results of the correction of wavefront aberration caused by fluctuations of wavelength of the light source, temperature changes and by thickness errors of the transparent base board in Example 9, and the correction is satisfactory in any case.

TABLE 14

Example 9

| Causes of spherical aberration fluctuations | Wavefront aberration (before correction) | Wavefront aberration (after correction) | d0 (variable) |
|---|---|---|---|
| Standard state (λ = 405 nm, T = 25° C., t = 0.1 mm) Fluctuations in wavelength of the light source | 0.001λ | 0.001λ | 35.000 |
| Δλ = +10 nm | 0.001λ | 0.001λ | 35.000 |
| Δλ = −10 nm | 0.002λ | 0.002λ | 35.000 |
| Temperature changes | | | |
| ΔT = +30° C. | 0.016λ | 0.015λ | 34.977 |
| ΔT = −30° C. | 0.017λ | 0.016λ | 35.041 |
| Thickness errors of transparent base board | | | |
| Δt = +0.02 mm | 0.208λ | 0.014λ | 31.518 |
| Δt = −0.02 mm | 0.208λ | 0.012λ | 39.420 |

(Note 1) (Amount of change in refractive index of lens material caused by temperature change) ΔN = −1.2 E − 4/° C.
(Note 2) (Amount of change in oscillation wavelength of light source caused by temperature change) Δλ = +0.05 nm/° C.

In the light-converging optical system of Example 10, fluctuations of spherical aberration were corrected by moving the lens arranged between the light source and the objective lens in the direction of an optical axis, as shown in FIG. 5. Further, by making this lens to be a diffracting lens, longitudinal chromatic aberration caused on the total system of the light-converging optical system was corrected. In this case, the longitudinal chromatic aberration was overcorrected and the expression (19) was satisfied, and thereby, an interval of the diffractive ring-shaped zones was made not to be too small.

Table 15 shows results of the correction of wavefront aberration caused by fluctuations of wavelength of the light source, temperature changes and by thickness errors of the transparent base board in Example 10, and the correction is satisfactory in any case.

TABLE 15

Example 10

| Causes of spherical aberration fluctuations | | Wavefront aberration (before correction) | Wavefront aberration (after correction) | d0 (variable) | d2 (variable) |
|---|---|---|---|---|---|
| Standard state (λ = 405 nm, T = 25° C., t = 0.1 mm) | | 0.002λ | 0.002λ | 10.000 | 8.000 |
| Fluctuations in wavelength of the light source | Δλ = +10 nm | 0.127λ | 0.008λ | 9.570 | 8.430 |
| | Δλ = −10 nm | 0.136λ | 0.011λ | 10.479 | 7.521 |
| Temperature changes | ΔT = +30° C. | 0.068λ | 0.021λ | 9.778 | 8.222 |
| | ΔT = −30° C. | 0.072λ | 0.023λ | 10.215 | 7.785 |
| Thickness errors of transparent base board | Δt = +0.02 mm | 0.196λ | 0.002λ | 9.291 | 8.709 |
| | Δt = −0.02 mm | 0.197λ | 0.003λ | 10.676 | 7.324 |

(Note 1)
(Amount of change in refractive index of lens material caused by temperature change) ΔN = −1.2 E−4/° C.
(Note 2)
(Amount of change in oscillation wavelength of light source caused by temperature change) Δλ = +0.05 nm/° C.

In the light-converging optical system of Example 11, fluctuations of spherical aberration were corrected by moving the lens arranged between the collimator lens and the objective lens in the direction of an optical axis, as shown in FIG. 6. In this case, since a ray of light emerging from the collimator lens is a parallel light flux, optical elements such as a polarized beam splitter, a beam forming element and a wavelength plate can easily be arranged in this parallel light flux. Further, longitudinal chromatic aberration caused on the objective lens was corrected by making the surface of the first lens on the light source side to be a diffracting surface. Further, by making the collimator lens to be a diffracting lens, a ray of light emerging from the collimator lens was made mostly to be a parallel light flux even when wavelength fluctuation of the light source and changes in temperature and humidity are caused.

Table 16 shows results of the correction of wavefront aberration caused by fluctuations of wavelength of the light source, temperature changes and by thickness errors of the transparent base board in Example 11, and the correction is satisfactory in any case.

TABLE 16

Example 11

| Causes of spherical aberration fluctuations | | Wavefront aberration (before correction) | Wavefront aberration (after correction) | d4 (variable) | d6 (variable) |
|---|---|---|---|---|---|
| Standard state ($\lambda$ = 405 nm, T = 25° C., t = 0.1 mm) | | 0.001$\lambda$ | 0.001$\lambda$ | 10.000 | 5.000 |
| Fluctuations in wavelength of the light source | $\Delta\lambda$ = +10 nm | 0.004$\lambda$ | 0.002$\lambda$ | 10.016 | 4.984 |
| | $\Delta\lambda$ = −10 nm | 0.008$\lambda$ | 0.001$\lambda$ | 9.974 | 5.026 |
| Temperature changes | $\Delta T$ = +30° C. | 0.028$\lambda$ | 0.017$\lambda$ | 10.084 | 4.916 |
| | $\Delta T$ = −30° C. | 0.031$\lambda$ | 0.018$\lambda$ | 9.924 | 5.076 |
| Thickness errors of transparent base board | $\Delta t$ = +0.02 mm | 0.198$\lambda$ | 0.009$\lambda$ | 10.692 | 4.308 |
| | $\Delta t$ = −0.02 mm | 0.200$\lambda$ | 0.008$\lambda$ | 9.229 | 5.771 |

(Note 1)
(Amount of change in refractive index of lens material caused by temperature change) $\Delta N$ = −1.2 E−4/° C.
(Note 2)
(Amount of change in oscillation wavelength of light source caused by temperature change) $\Delta\lambda$ = +0.05 nm/° C.

Since the lens in the light-converging optical system in Examples 10 and 11 capable of moving in the direction of an optical axis was made of light optical plastic material, reduction of the load on an actuator and quick response to fluctuation of spherical aberration are possible.

In the light-converging optical system in Examples 8–11, it is possible to correct generation of spherical aberration caused by fluctuations exceeding 0.02 mm in thickness of transparent base board of optical information recording medium. It is therefore possible to record and/or reproduce information for a multi-layer type optical information recording medium having the structure in which transparent base boards and information recording layers are laminated in this order from the obverse side.

Examples 12

Figure 30:
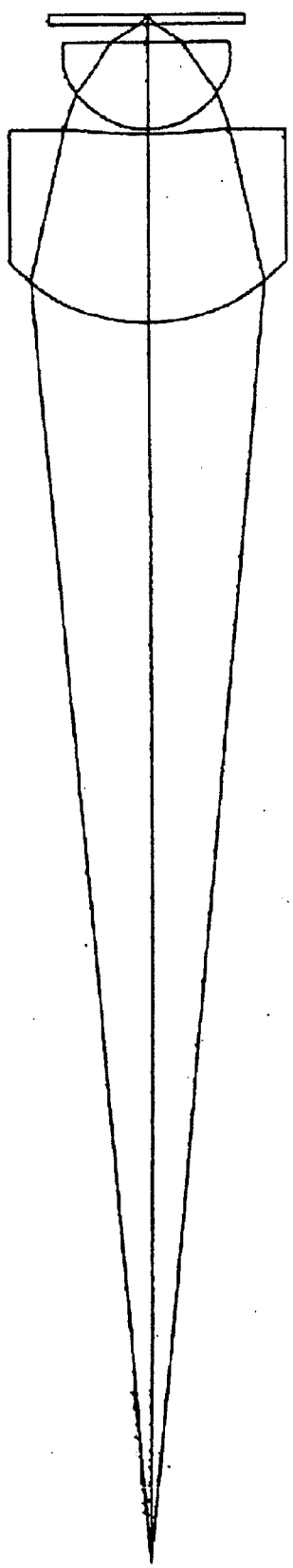
FIG. 30 is an optical path diagram in Example 12.
Figure 31:
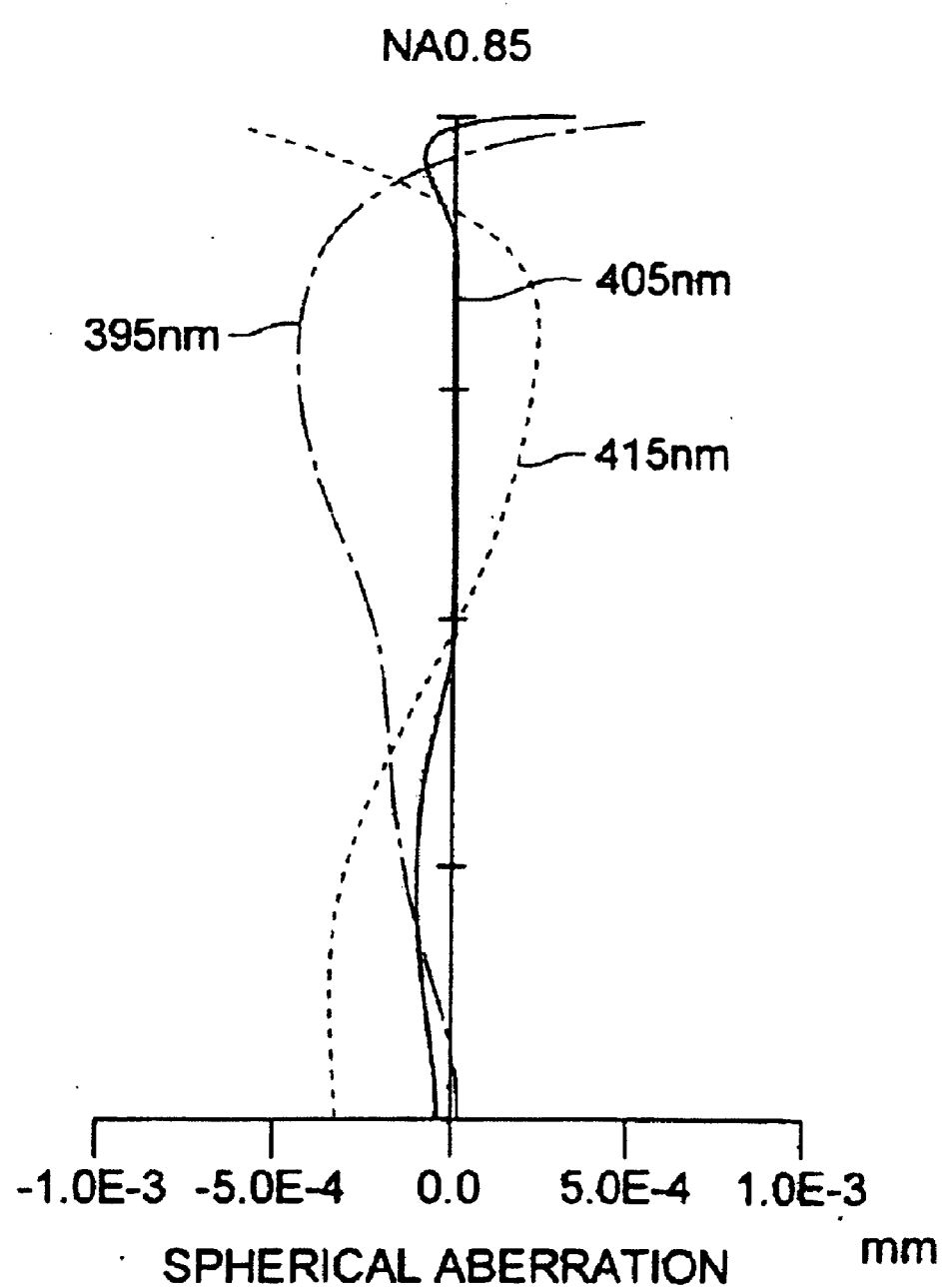
FIG. 31 is a spherical aberration diagram in Example 12.
Figure 32:
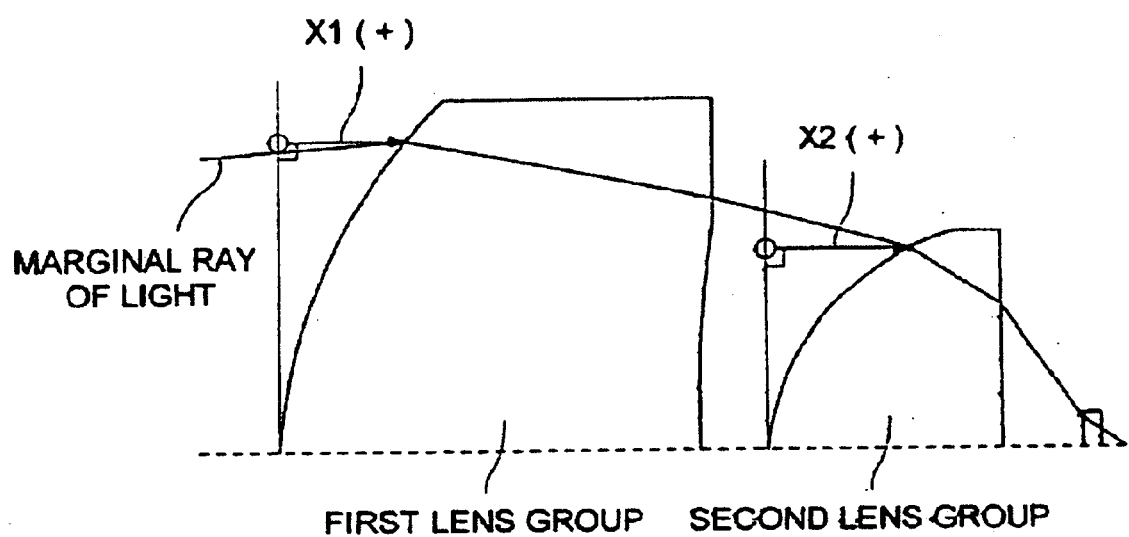
FIG. 32 is a diagram for illustrating a definition of X1 and X2 in the expression (17).

Lens data of objective lenses in Example 12 is shown in Table 17. Optical path diagrams concerning Example 12 is shown respectively in FIG. 30, and spherical aberration diagram concerning Example 12 is shown respectively in FIG. 31.

TABLE 17

Example 12

| Surface No. | | r(mm) | d(mm) | N$\lambda$ | vd |
|---|---|---|---|---|---|
| 0 | Light source | | 17.000 | | |
| 1 | Objective lens | 1.966 | 2.600 | 1.52491 | 56.5 |
| 2 | | 12.148 | 0.050 | | |
| 3 | | 1.027 | 1.200 | 1.52491 | 56.5 |
| 4 | | ∞ | 0.270 | | |
| 5 | Transparent base board | ∞ | 0.100 | 1.61949 | 30.0 |
| 6 | | ∞ | | | |

Aspherical coefficient

| First surface | $\kappa$ | −4.5487E−01 |
| | A4 | −3.6752E−03 |
| | A6 | 1.1124E−03 |
| | A8 | −1.6305E−03 |

TABLE 17-continued

Example 12

| | A10 | 5.8786E−04 |
| | A12 | −1.4419E−04 |
| | A14 | 2.3611E−05 |
| | A16 | −6.8025E−06 |
| Third surface | $\kappa$ | −8.4478E−01 |
| | A4 | 9.2575E−02 |
| | A6 | 3.6454E−03 |
| | A8 | 7.0404E−02 |
| | A10 | −3.6008E−02 |
| Diffractive surface coefficient | | |
| Second surface | b2 | −4.8000E−02 |
| | b4 | 1.2345E−02 |
| | b6 | −4.2750E−03 |
| | b8 | −2.8804E−05 |
| | b10 | 1.3965E−03 |
| | b12 | −2.4146E−03 |
| | b14 | 7.9486E−04 |

An objective lens of Example 12 is one that is composed of two plastic lenses and has NA 0.85. Longitudinal chromatic aberration that causes a problem when a semiconductor laser light source with a short wavelength is used is corrected, by making the first lens to be a diffractive lens. In this case, an angle of a tip of each sawtoothed diffractive ring-shaped zone is made not to be sharp, compared with an occasion of forming a diffractive structure on a convex surface, by making the surface representing a concave surface on the optical information recording medium side to be a diffractive surface. When the first lens is formed through molding, diffractive ring-shaped zones can be transferred satisfactorily. Further, in the objective lens of Example 12, an amount of change of aspheric aberration in the course of temperature changes is extremely small in spite of a plastic lens with high NA, because the objective lens is arranged to satisfy the conditional expression in the Structure (21). For the longitudinal wavefront aberration 0.002 $\lambda$rms at design basis temperature 25°, the longitudinal wavefront aberration at 55° that means an increase of temperature by 30° is 0.003 $\lambda$rms which means that a change of spherical aberration caused by temperature changes is almost zero. Incidentally, when calculating the wavefront aberration stated above, a change of refractive index of the plastic lens caused by temperature changes (−12×10$^{-5}$/ degree) and a change of wavelength of light source caused by temperature changes (+0.05 nm/degree) are taken into consideration, but a change in shape of the plastic lens caused by temperature changes is not considered because an influence on the change of wavefront aberration is small, compared with a change of refractive index.

Incidentally, in each of Tables and FIGURES, there sometimes is an occasion where E (or e) is used for expression of the exponent for 10, exemplifying, for example, E−02 (−10$^{-2}$).

Further, let it be assumed that the optical information recording medium includes not only one having therein a protective layer on the light flux entering side but also one having no protective layer, in the present specification. When the optical information recording medium has a protective layer, it is preferable that the objective lens used in the optical pickup device of the invention is corrected in terms of aberration so that spherical aberration may be minimum under the condition of the combination with a protective layer having the specific thickness.

Let it be assumed that minute fluctuations in oscillation wavelengths of the light source means wavelength fluctuation within a range of ±10 nm, for the oscillation wavelength of the light source, in the present specification. With regard to (satisfactory) correction of various aberrations in the present specification, it is preferable that wavefront aberration obtained is not more than 0.07 λrms (here, λ represents oscillation wavelength of the light source used) which is the so-called critical diffracting power, and it is more preferable that the wavefront aberration is not more than 0.05 λrms, taking accuracy for assembling an optical pickup device into consideration.

As a short wavelength light source preferably used for an objective lens, a light-converging optical system and an optical pickup device all of the invention, there is given, in addition to the violet semiconductor laser stated above, a light source wherein a wavelength conversion element that converts a wavelength of light emitted from a semiconductor laser into a half, namely, the so-called SHG (Second Harmonic Generation) element is formed to precede the semiconductor laser.

The invention makes it possible to provide an objective lens for recording and/or reproducing information for an optical information recording medium which has a small diameter and a large working distance even when it is composed of two positive lenses and has high NA. It further makes it possible to provide an objective lens which is composed of two positive lenses and has high NA, and still has a small diameter and a large working distance, and is for recording and/reproducing of information for the optical information recording medium which has been corrected in terms of longitudinal chromatic aberration that is a problem when a short wavelength light source is used.

It is possible to provide a light-converging optical system for recording and/or reproducing information for an optical information recording medium wherein fluctuations of spherical aberration caused on each optical surface of the light-converging optical system by fluctuations of oscillation wavelength of the laser light source, changes of temperature and humidity and errors in thickness of a transparent base board of the optical information recording medium can be corrected effectively with a simple structure. It is further possible to provide a light-converging optical system wherein longitudinal chromatic aberration that is a problem when a short wavelength light source is used has been corrected.

Further, an optical pickup device equipped with the objective lens and/or a light-converging optical system, and a recording/reproducing apparatus equipped with the aforesaid optical pickup device can be provided.

What is claimed is:

1. An objective lens for recording and/or reproducing information of an optical information recording medium, comprising:
    a first lens group having a positive refractive power and a second lens group having a positive refractive power;
    wherein the first lens group and the second lens group are arranged in this order from a light source side, and
    wherein the objective lens is a finite conjugate type to converge a divergent light flux having a wavelength of 600 nm or less from a light source onto an information recording plane of the optical information recording medium and satisfies the following formula:

$$NA \geq 0.65$$

wherein NA is an image-side numerical aperture necessary for conducting recording and/or reproducing information of the optical information recording medium, wherein the following formula is satisfied:

$$0.01 \leq |m| \leq 0.30$$

wherein m is a lateral magnification of the objective lens defined by the formula: $NA_{OBJ}/NA_{IMG}$, where $NA_{OBJ}$ is an object-side numerical aperture of the objective lens and $NA_{IMG}$ is an image-side numerical aperture, wherein the following formula is satisfied:

$$0.10 \leq NA \cdot WD/f \leq 0.35$$

where WD is a working distance (mm) of the objective lens, and f is a focal length (mm) of a total system of the objective lens.

2. The objective lens of claim 1, wherein the following formula is satisfied:

$$NA \geq 0.75.$$

3. The objective lens of claim 1, wherein the objective lens is made of an optical material having an internal transmittance of 85% or more in the thickness of 3 mm in a used wavelength region of 600 nm or less.

4. The objective lens of claim 1, wherein the following formula is satisfied:

$$0.03 \leq |m| \leq 0.20.$$

5. An objective lens for recording and/or reproducing information of an optical information recording medium, comprising:
    a first lens group having a positive refractive power and a second lens group having a positive refractive power;
    wherein the first lens group and the second lens group are arranged in this order from a light source side, and
    wherein the objective lens is a finite conjugate type to converge a divergent light flux from a light source onto an information recording plane of the optical information recording medium and satisfies the following formula:

$$0.10 \leq NA \cdot WD/f \leq 0.35$$

where NA is an image-side numerical aperture necessary for conducting recording and/or reproducing information of the optical information recording medium, WD is a working distance (mm) of the objective lens, and f is a focal length (mm) of the total system of the objective lens, wherein the following formula is satisfied:

$$0.01 \leq |m| \leq 0.30$$

where m is a lateral magnification of the objective lens defined by the formula: $NA_{OBJ}/NA_{IMG}$, where $NA_{OBJ}$ is an object-side numerical aperture of the objective lens and $NA_{IMG}$ is an image-side numerical aperture.

6. The objective lens of claim 5, wherein the objective lens is made of an optical material having an internal transmittance of 85% or more in the thickness of 3 mm in a used wavelength region of 600 nm or less.

7. The objective lens of claim 5, wherein the following formula is satisfied:

$$0.03 \leq |m| \leq 0.20.$$

8. An objective lens for recording and/or reproducing information of an optical information recording medium, comprising:

a first lens group having a positive refractive power and a second lens group having a positive refractive power;
wherein the first lens group and the second lens group are arranged in this order from a light source side, and
wherein the objective lens is a finite conjugate type to converge a divergent light flux having a wavelength of 600 nm or less from a light source onto an information recording plane of the optical information recording medium and satisfies the following formula:

$$0.01 \leq |m| \leq 3.30$$

wherein m is a lateral magnification of the objective lens defined with the formula of $NA_{OBJ}/NA_{IMG}$, where $NA_{OBJ}$ is an object-side numerical aperture of the objective lens and $NA_{IMG}$ is an image-side numerical aperture,
wherein the following formula is satisfied:

$$0.10 \leq NA \cdot WD/f \leq 0.35$$

where WD is a working distance (mm) of the objective lens, and f is a focal length (mm) of the objective lens.

9. The objective lens of claim 8, wherein the objective lens is made of an optical material having an internal transmittance of 85% or more in a thickness of 3 mm in a used wavelength region of 600 nm or less.

10. An objective lens for recording and/or reproducing information of an optical information recording medium, comprising:
a first lens group having a positive refractive power; and
a second lens group having a positive refractive power;
wherein the first lens group and the second lens group are arranged in this order from a light source side,
wherein the objective lens is a finite conjugate type to converge a divergent light flux from a light source onto an information recording plane of the optical information recording medium and a used wavelength is 600 nm or less and satisfies the following formula:

$$NA \geq 0.65$$

where NA is an image-side numerical aperture necessary for conducting recording and/or reproducing information of the optical information recording medium, and
wherein the objective lens comprises a ring-shaped diffractive structure on at least one surface,
wherein the following formula is satisfied:

$$0.01 \leq |m| \leq 0.30$$

wherein m is a lateral magnification of the objective lens defined by the formula: $NA_{OBJ}/NA_{IMG}$, where $NA_{OBJ}$ is an object-side numerical aperture of the objective lens and $NA_{IMG}$ is an image-side numerical aperture,
wherein the following formula is satisfied:

$$0.10 \leq NA \cdot WD/f \leq 0.35$$

where WD is a working distance (mm) of the objective lens, and f is a focal length (mm) of a total system of the objective lens.

11. The objective lens of claim 10, wherein when the light source generates a wavelength fluctuation within ±10 nm, the diffractive structure has a function to suppress a longitudinal chromatic aberration caused by a refractive index dispersion of an optical material of the objective lens due to the wavelength fluctuation of the light source.

12. The objective lens of claim 10, wherein the following formula is satisfied:

$$0.01 \leq PD/PT \leq 0.15$$

where PD is a power ($mm^{-1}$) of only a diffractive structure defined by the formula of $PD = \Sigma(-2 \cdot b_{2i})$ when the diffractive structure formed on $i^{th}$ surface is represented by an optical path difference function defined by the formula of $\Phi b = b_{2i}h^2 + b_{4i}h^4 + b_{6i}h^6 + \ldots$ (here, h is a height (mm) from an optical axis and $b_{2i}, b_{4i}, b_{6i}, \ldots$ are 2nd order, $4^{th}$ order, $6^{th}$ order, ... optical path difference function coefficients respectively), and PT is a power ($mm^{-1}$) of the total system of the objective lens including a power as a refractive lens and a power of the diffractive structure.

13. The objective lens of claim 10, wherein the first lens group has a meniscus shape in which a convex surface faces toward the light source side and comprises a ring-shaped diffractive structure on a lens surface placed closest to the optical information recording medium side in the first lens group, and the following formula is satisfied:

$$0.05 \leq PD/PT \leq 0.25$$

where PD is a power ($mm^{-1}$) of only a diffractive structure defined by the formula of $PD = \Sigma(-2 \cdot b_{2i})$ when the diffractive structure formed on $i^{th}$ surface is represented by an optical path difference function defined by the formula of $\Phi b = b_{2i}h^2 + b_{4i}h^4 + b_{6i}h^6 + \ldots$ (here, h is a height (mm) from an optical axis and $b_{2i}, b_{4i}, b_{6i}, \ldots$ are 2nd order, $4^{th}$ order, $6^{th}$ order, optical path difference function coefficients respectively), and PT is a power ($mm^{-1}$) of the total system of the objective lens including a power as a refractive lens and a power of the diffractive structure.

14. The objective lens of claim 10, wherein the following formula is satisfied:

$$0.04 \leq f \cdot \lambda \cdot \Sigma(ni/(Mi \cdot Pi^2)) \leq 0.50$$

where $\lambda$ is a standard wavelength (mm), f is a focal length (mm) of the total system of the objective lens, ni is an order of a diffracted light ray having the maximum diffracted light amount among diffracted light rays generated by the diffractive structure formed on the $i^{th}$ surface, Mi is the number of ring-shaped zones of diffractive structure within an effective diameter of the $i^{th}$ surface and Pi is the minimum value (mm) of the distance between adjoining ring-shaped zones of the diffractive structure within an effective diameter of the $i^{th}$ surface.

15. The objective lens of claim 10, wherein the following formula is satisfied:

$$0.2 \leq |(Ph/Pf - 2| \leq 3.0$$

where Pf is a distance (mm) between adjoining ring-shaped diffractive zones at an image-side numerical aperture necessary for conducting recording and/or reproducing for an optical information recording medium, and Ph is a distance (mm) between adjoining ring-shaped diffractive zones at a numerical aperture half of the image-side numerical aperture necessary for conducting recording and/or reproducing for an optical information recording medium.

16. The objective lens of claim 10, wherein in the case of combining a diffractive action as the diffractive lens and a refractive action as a refractive lens, the objective lens has a longitudinal chromatic aberration characteristic in which a back focal distance changes so as to become shorter when the wavelength of the light source changes toward a longer wavelength side and the following formula is satisfied:

$$-1 < \Delta CA/\Delta SA < 0$$

where $\Delta CA$ represents an amount of a change (mm) of a longitudinal chromatic aberration for a change of a wavelength, and $\Delta SA$ represents an amount of a change (mm) of a spherical aberration of a marginal ray for a change of a wavelength.

17. The objective lens of claim 10, wherein an amount of a $ni^{th}$ ordered diffracted light ray generated by the diffractive structure formed at the $i^{th}$ surface is largest among any other ordered diffracted light rays and the objective lens converges the $ni^{th}$ ordered diffracted light ray generated by the diffractive structure onto an information recording plane of the optical information recording medium, where n is an integer other than 0 and ±1.

18. A converging optical system for recording and/or reproducing information of an optical information recording medium, comprising:
a finite conjugate type objective lens to converge a divergent light flux having a wavelength of 600 nm or less from a light source onto an information recording plane of the optical information recording medium; the objective lens comprising a first lens group having a positive refractive power and a second lens group having a positive refractive power; wherein the first lens group and the second lens group are arranged in this order from a light source side;
wherein the following formula is satisfied:

$$NA \geq 0.65$$

where NA is an image-side numerical aperture of the objective lens necessary for conducting recording and/or reproducing information of the optical information recording medium,
wherein the following formula is satisfied:

$$0.01 \leq |m| \leq 0.30$$

where m is a lateral magnification of the objective lens defined by the formula: $NA_{OBJ}/NA_{IMG}$, where $NA_{OBJ}$ is an object-side numerical aperture of the objective lens and $NA_{IMG}$ is an image-side numerical aperture,
wherein the following formula is satisfied:

$$0.10 \leq NA \cdot WD/f \leq 0.35$$

where WD is a working distance (mm) of the objective lens, and f is a focal length (mm) of a total system of the objective lens.

19. The converging optical system of claim 18, further comprising a correcting structure provided between the light source and the information recording plane and to correct a spherical aberration generated in the converging optical system.

20. The converging optical system of claim 19, wherein the correcting structure comprises at least one optical element displaceable along the optical axis so as to change a degree of divergence of the outgoing light flux.

21. The converging optical system of claim 20, wherein the optical element displaceable along the optical axis is one of the first and second lens groups of the objective lens.

22. The converging optical system of claim 21, wherein the optical element displaceable along the optical axis is provided between the light source and the objective lens.

23. The converging optical system of claim 20, wherein the optical element displaceable along the optical axis is made of an optical plastic material.

24. The converging optical system of claim 19, wherein the correcting structure is an element provided between the light source and the information recording plane and operable for changing a refractive index distribution in the direction perpendicular to the optical axis.

25. The converging optical system of claim 19, wherein the correcting structure is an element provided between the objective lens and the optical information recording medium and operable for changing a refractive index.

26. The converging optical system of claim 18, wherein the converging optical system conducts recording and/or reproducing information of an information recording medium which has a plurality of information recording layers on the same light flux incident side, and the correcting structure corrects a fluctuation of a spherical aberration caused by differences in thickness of transparent base boards from the light flux incident surface to respective information recording layers at the time of focus jump among the plurality of information recording layers.

27. The objective lens of claim 18, wherein the following formula is satisfied:

$$0.03 \leq |m| \leq 0.20.$$

28. An optical pickup apparatus for recording and/or reproducing information comprising:
a light source; and
a converging optical system having the converging optical system described in claim 18.

29. A voice and/or image recording and/or voice and/or image reproducing apparatus with recording or reproducing information of an optical recording medium having the optical pickup apparatus of claim 28.

30. The voice and/or image recording and/or voice and/or image reproducing apparatus of claim 29, wherein the finite conjugate type objective lens is made of an optical material having an internal transmittance of 85% or more in the thickness of 3 mm in a used wavelength region of 600 nm or less.

31. The optical pickup apparatus of claim 28, wherein the finite conjugate type objective lens is made of an optical material having an internal transmittance of 85% or more in the thickness of 3 mm in a used wavelength region of 600 nm or less.

32. A converging optical system for recording and/or reproducing information of an optical information recording medium, comprising:
an optical element including a finite conjugate type objective lens to converge a divergent light flux having a wavelength of 600 nm or less from a light source onto an information recording plane of the optical information recording medium; the objective lens comprising a first lens group having a positive refractive power and a second lens group having a positive refractive power; wherein the first lens group and the second lens group are arranged in this order from a light source side and satisfies the following formula:

$$NA \geq 0.65$$

where NA is an image-side numerical aperture of the objective lens necessary for conducting recording and/or reproducing information of the optical information recording and a ring-shaped diffractive structure provided at least one surface of the optical element, wherein the following formula is satisfied:

$$0.10 \leq NA \cdot WD/f \leq 0.35$$

where WD is a working distance (mm) of the objective lens, and f is a focal length (mm) of a total system of the objective lens.

33. The converging optical system of claim 32, wherein when the light source generates a wavelength fluctuation within ±10 nm, the diffractive structure has a function to suppress a longitudinal chromatic aberration caused by a refractive index dispersion of an optical material of the optical element due to the wavelength fluctuation of the light source.

34. The converging optical system of claim 32, wherein in the case of combining a diffractive action as the diffractive lens and a refractive action as a refractive lens, the objective lens has a longitudinal chromatic aberration characteristic in which a back focal distance changes so as to become shorter when the wavelength of the light source changes toward a longer wavelength side and the following formula is satisfied:

$$-1 < \Delta CA/\Delta SA < 0$$

where $\Delta CA$ represents an amount of a change (mm) of a longitudinal chromatic aberration for a change of a wavelength, and $\Delta SA$ represents an amount of a change (mm) of a spherical aberration of a marginal ray for a change of a wavelength.

35. The converging optical system of claim 32, wherein an amount of a $n^{th}$ ordered diffracted light ray generated by the diffractive structure is largest among any other ordered diffracted light rays and the converging optical system converges the $n^{th}$ ordered diffracted light ray generated by the diffractive structure onto an information recording plane of the optical information recording medium, where n is an integer other than 0 and ±1.

36. The converging optical system of claim 32, wherein the converging optical system comprises a correcting structure provided between the light source and the information recording plane and to correct a spherical aberration generated in the converging optical system;

wherein the following formula is satisfied:

$$NA \geq 0.65$$

where NA is an image-side numerical aperture of the objective lens necessary for conducting recording and/or reproducing information of the optical information recording medium.

37. The converging optical system of claim 36, wherein the correcting structure comprises at least one optical element displaceable along the optical axis so as to change a degree of divergence of the outgoing light flux.

38. The converging optical system of claim 37, wherein the optical element displaceable along the optical axis is one of the first and second lens groups of the objective lens.

39. The converging optical system of claim 38, wherein the optical element displaceable along the optical axis is provided between the light source and the objective lens.

40. The converging optical system of claim 37, wherein the optical element displaceable along the optical axis is made of an optical plastic material.

41. The converging optical system of claim 36, wherein the correcting structure is an element provided between the light source and the information recording plane and capable of changing a refractive index distribution in the direction perpendicular to the optical axis.

42. The converging optical system of claim 36, wherein the correcting structure is an element provided between the objective lens and the optical information recording medium and capable of changing a refractive index.

43. An optical pickup apparatus for recording and/or reproducing information of an optical information recording medium, comprising:

a light source;

a converging optical system having a finite conjugate type objective lens to converge a divergent light flux having a wavelength of 600 nm or less from the light source onto an information recording plane of the optical information recording medium; the objective lens comprising a first lens group having a positive refractive power and a second lens group having a positive refractive power; wherein the first lens group and the second lens group are arranged in this order from a light source side, the light source structured to be displaceable along the direction of the optical axis so as to change the degree of divergence of the light flux going to be incident to the objective lens;

a detector to detect a fluctuation of a spherical aberration generated in the converging optical axis; and a driver to displace the light source along the direction of the optical axis so as to reduce the fluctuation of the spherical aberration in accordance with a detection result of the detector, wherein the following formula is satisfied:

$$0.10 \leq NA \cdot WD/f \leq 0.35$$

where WD is a working distance (mm) of the objective lens, and f is a focal length (mm) of a total system of the objective lens.

44. A voice and/or image recording and/or voice and/or image reproducing apparatus, an optical pickup apparatus for recording and/or reproducing information of an optical information recording medium, which comprises:

a light source;

a converging optical system having a finite conjugate type objective lens to converge a divergent light flux having a wavelength of 600 nm or less from the light source onto an information recording plane of the optical information recording medium; the objective lens comprising a first lens group having a positive refractive power and a second lens group having a positive refractive power; wherein the first lens group and the second lens group are arranged in this order from a light source side, the light source structured to be displaceable along the direction of the optical axis so as to change the degree of divergence of the light flux going to be incident to the objective lens;

a detector to detect a fluctuation of a spherical aberration generated in the converging optical axis; and a driver to displace the light source along the direction of the optical axis so as to reduce the fluctuation of the spherical aberration in accordance with a detection result of the detector, wherein the following formula is satisfied:

$$0.10 \leq NA \cdot WD/f \leq 0.35$$

where WD is a working distance (mm) of the objective lens, and f is a focal length (mm) of a total system of the objective lens.

45. The objective lens of any one of claims 1, 5, 8 and 10, wherein the objective lens comprise at least two aspherical surfaces among surfaces located between a surface of the first lens group positioned closest to the light source and a surface of the second lens group positioned closest to the light source.

46. The objective lens of any one of claims 1, 5, 8 and 10, wherein each of the first lens and the second lens group is made of a plastic lens and the following formula is satisfied:

$$NA \geq 0.75$$

$$0.06 > \Delta SAG > -0.08$$

$$\Delta SAG = (X1' - X2')/(NA^4 \cdot f \cdot (1+/m/))$$

$$X1' = X1 \cdot (N1-1)^3/f1$$

$$X2' = X2 \cdot (N2-1)^3/f2$$

where NA is an image-side numerical aperture necessary for conducting recording and/or reproducing information of the optical information recording medium, Xi is a difference (mm) in the direction of an optical axis between a plane that is perpendicular to the optical axis and is tangent to the vertex of the surface of the $i^{th}$ lens group closest to the light source and a surface of the $i^{th}$ lens group closest to the light source in the outermost periphery in the effective diameter (the position on the surface of the $i^{th}$ lens group closest to the light source where the marginal ray at the above NA enters), and it is assumed that Xi takes a positive sign when it is measured in the direction toward the optical information recording medium from the tangent plane that serves as a reference point, and it takes a negative sign when it is measured in the direction toward the light source (i=1 or 2), f is a focal length (mm) of the total system of the objective lens, m is a lateral magnification of the objective lens defined by the formula of $NA_{OBJ}/NA_{IMG}$ when $NA_{OBJ}$ is an object-side numerical aperture of the objective lens and $NA_{IMG}$ is an image-side numerical aperture, N1 is a refractive index of the first lens group for a used wavelength, and N2 is a refractive index of the second lens group for a used wavelength.

47. The objective lens of any one of claims 1, 5, 8 and 10, wherein the following formula is satisfied:

$$3 \leq \sqrt{(f1/f2)}//m/ \leq 50$$

where fi is a focal length (mm) of an $i^{th}$ lens group (i=1 or 2) (provided that if the $i^{th}$ lens group comprises a diffractive structure, fi is a focal length (mm) of the total system of the $i^{th}$ lens group in which a focal length as a refractive lens and a focal length of a diffractive structure are combined), and m is a lateral magnification of the objective lens defined by the formula of $NA_{OBJ}/NA_{IMG}$ when $NA_{OBJ}$ is an object-side numerical aperture of the objective lens and $NA_{IMG}$ is an image-side numerical aperture.

48. The objective lens of any one of claims 1, 5, 8 and 10, wherein the following formula is satisfied:

$$0.5 \leq (r2+r1)/(r2-r1) \leq 4.0$$

where r1 is a paraxial radius of curvature (mm) of a surface of the first lens group closest to the light source, and r2 is a paraxial radius of curvature (mm) of the surface of the first lens group closest to an optical information recording medium.

49. The objective lens of any one of claims 1, 5, 8 and 10, wherein the following formula is satisfied:

$$-0.02 \leq NA \cdot (X2-X1)/f \leq 0.30$$

where NA is an image-side numerical aperture necessary for conducting recording and/or reproducing for an optical information recording medium, Xi is a difference in the direction of an optical axis between a plane that is perpendicular to the optical axis and is tangent to the vertex of the surface of the $i^{th}$ lens group closest to the light source and a surface of the $i^{th}$ lens group closest to the light source in the outermost periphery in the effective diameter (the position on the surface of the $i^{th}$ lens group closest to the light source where the marginal ray at the above NA enters), and it is assumed that Xi takes a positive sign when it is measured in the direction toward the optical information recording medium from the tangent plane that serves as a reference point, and it takes a negative sign when it is measured in the direction toward the light source (i=1 or 2), f is a focal length (mm) of the total system of the objective lens.

50. The objective lens of any one of claims 1, 5, 8 and 10, wherein the objective lens comprises a lens group made of an optical plastic material.

51. The objective lens of any one of claims 1, 5, 8 and 10, wherein the objective lens comprises a lens group made of an optical glass material.

52. The objective lens of any one of claims 1, 5, 8 and 10, wherein the objective lens comprises a diaphragm to regulate the light flux and the diaphragm is provided between a plane that is perpendicular to the optical axis and is tangent to the vertex of the surface of the $i^{th}$ lens group closest to the light source and a surface of the $i^{th}$ lens group closest to the light source.

53. The objective lens of any one of claims 1, 5, 8 and 10, wherein the objective lens regulates a converged light flux diameter by providing a section changing discontinuously in a vertical direction of the surface on at least one surface at a position corresponding to an image-side numerical aperture necessary for conducting recording and/or reproducing information of an optical information recording medium.

54. A converging optical system for recording and/or reproducing information of an optical information recording medium, comprising:

a finite conjugate type objective lens to converge a divergent light flux having a wavelength of 600 nm or less from a light source onto an information recording plane of the optical information recording medium; the objective lens comprising a first lens group having a positive refractive power and a second lens group having a positive refractive power; wherein the first lens group and the second lens group are arranged in this order from a light source side, and wherein the following formula is satisfied:

$$NA \geq 0.65$$

where NA is an image-side numerical aperture of the objective lens necessary for conducting recording and/or reproducing information of the optical information recording medium, wherein the following formula is satisfied:

$$0.01 \leq /m/ \leq 0.30$$

where m is a lateral magnification of the objective lens defined by the formula: $NA_{OBJ}/NA_{IMG}$, where $NA_{OBJ}$ is an object-side numerical aperture of the objective lens and $NA_{IMG}$ is an image-side numerical aperture; and wherein the converging optical system comprises the objective lens described in any one of claims 1, 5, 8, and 10.

55. A converging optical system for recording and/or reproducing information of an optical information recording medium, comprising:

an optical element including a finite conjugate type objective lens to converge a divergent light flux having a wavelength of 600 nm or less from a light source onto an information recording plane of the optical information recording medium; the objective lens comprising a first lens group having a positive refractive power and a second lens group having a positive refractive power; wherein the first lens group and the second lens group are arranged in this order from a light source side, and a ring-shaped diffractive structure provided at least one surface of the optical element; and wherein the converging optical system comprises the objective lens described in any one of claims 1, 5, 8 and 10.

56. An optical pickup apparatus for recording and/or reproducing information of an optical information recording medium, comprising:

a light source;

a converging optical system having a finite conjugate type objective lens to converge a divergent light flux from the light source onto an information recording plane of the optical information recording medium; the objective lens comprising a first lens group having a positive refractive power and a second lens group having a positive refractive power; wherein the first lens group and the second lens group are arranged in this order from a light source side, the light source structured to be displaceable along the direction of the optical axis so as to change the degree of divergence of the light flux going to be incident to the objective lens;

a detector to detect a fluctuation of a spherical aberration generated in the converging optical axis; and a driver to displace the light source along the direction of the optical axis so as to reduce the fluctuation of the spherical aberration in accordance with a detection result of the detector; and wherein the optical pickup apparatus comprises the objective lens described in any one of claims 1, 5, 8 and 10.

57. A voice and/or image recording and/or voice and/or image reproducing apparatus, comprising:

an optical pickup apparatus for recording and/or reproducing information of an optical information recording medium, which comprises:

a light source;

a converging optical system having a finite conjugate type objective lens to converge a divergent light flux from the light source onto an information recording plane of the optical information recording medium; the objective lens comprising a first lens group having a positive refractive power and a second lens group having a positive refractive power; wherein the first lens group and the second lens group are arranged in this order from a light source side, the light source structured to be displaceable along the direction of the optical axis so as to change the degree of divergence of the light flux going to be incident to the objective lens;

a detector to detect a fluctuation of a spherical aberration generated in the converging optical axis; and a driver to displace the light source along the direction of the optical axis so as to reduce the fluctuation of the spherical aberration in accordance with a detection result of the detector; and wherein the optical pickup apparatus comprises the objective lens described in any one of claims 1, 5, 8 and 10.

58. An optical pickup apparatus for recording and/or reproducing information of an optical information recording medium, comprising:

a light source;

a converging optical system having a finite conjugate type objective lens to converge a divergent light flux from the light source onto an information recording plane of the optical information recording medium and a correcting structure to correct a fluctuation of a spherical aberration; the objective lens comprising a first lens group having a positive refractive power and a second lens group having a positive refractive power; wherein the first lens group and the second lens group are arranged in this order from a light source side, the converging optical system having the converging optical system described in any one of claims 18 and 32, a detector to detect a fluctuation of a spherical aberration generated in the converging optical axis; and a driver to drive the correcting structure so as to reduce the fluctuation of the spherical aberration in accordance with a detection result of the detector, wherein the following formula is satisfied:

$$0.01 \leq /m/ \leq 0.30$$

where m is a lateral magnification of the objective lens defined by the formula: $NA_{OBJ}/NA_{IMG}$, where $NA_{OBJ}$ is an object-side numerical aperture of the objective lens and $NA_{IMG}$ is an image-side numerical aperture.

59. The objective lens of claim 58, wherein the following formula is satisfied:

$$0.03 \leq /m/ \leq 0.20.$$

60. A voice and/or image recording and/or voice and/or image reproducing apparatus, comprising:

an optical pickup apparatus for recording and/or reproducing information of an optical information recording medium, which comprises:

a light source;

a converging optical system having a finite conjugate type objective lens to converge a divergent light flux from the light source onto an information recording plane of the optical information recording medium and a correcting structure to correct a fluctuation of a spherical aberration; the objective lens comprising a first lens group having a positive refractive power and a second lens group having a positive refractive power; wherein the first lens group and the second lens group are arranged in this order from a light source side, the converging optical system having the converging optical system described in any one of claims 18 and 32, a detector to detect a fluctuation of a spherical aberration generated in the converging optical axis; and a driver to drive the correcting structure so as to reduce the fluctuation of the spherical aberration in accordance with a detection result of the detector, wherein the following formula is satisfied:

$$0.01 \leq |m| \leq 0.30$$

where m is a lateral magnification of the objective lens defined with the formula of $NA_{OBJ}/NA_{IMG}$, when $NA_{OBJ}$ is an object-side numerical aperture of the objective lens and $NA_{IMG}$ is an image-side numerical aperture.

61. The objective lens of claim 60, wherein the following formula is satisfied:

$$0.03 \leq |m| \leq 0.20.$$

62. The converging optical system of any one of claims 36 to 42, wherein the converging optical system conducts recording and/or reproducing information of an information recording medium which has a plurality of information recording layers on the same light flux incident side, and the correcting structure corrects a fluctuation of a spherical aberration caused by differences in thickness of transparent base boards from the light flux incident surface to respective information recording layers at the time of focus jump among the plurality of information recording layers.

* * * * *